United States Patent
Fialkow et al.

(10) Patent No.: US 12,099,799 B2
(45) Date of Patent: *Sep. 24, 2024

(54) SYSTEM AND METHOD PROVIDING RESPONSIVE EDITING AND VIEWING, INTEGRATING HIERARCHICAL FLUID COMPONENTS AND DYNAMIC LAYOUT

(71) Applicant: Wix.com Ltd., Tel Aviv (IL)

(72) Inventors: Roni Fialkow, Tel Aviv (IL); Idan Cohen, Givat Shmuel (IL); Na'ama Ben Oliel Ronen, Tel Aviv (IL); Batya Antebi, Tel Aviv (IL); Andrey Moiseev, Holon (IL); Yotam Barzilay, Tel Aviv (IL); Kobi Zakut, Bat Yam (IL); Nir Horesh, Hod Hasharon (IL); Bar Ehud Ulman, Ramat Gan (IL); Kfir Golan, Tel Aviv (IL)

(73) Assignee: Wix.com Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,805

(22) Filed: Apr. 30, 2023

(65) Prior Publication Data

US 2023/0334229 A1 Oct. 19, 2023

Related U.S. Application Data

(63) Continuation of application No. 17/233,575, filed on Apr. 19, 2021, now Pat. No. 11,640,492, which is a
(Continued)

(51) Int. Cl.
*G06F 40/143* (2020.01)
*G06F 8/34* (2018.01)
(Continued)

(52) U.S. Cl.
CPC .............. *G06F 40/143* (2020.01); *G06F 8/34* (2013.01); *G06F 16/986* (2019.01); *G06N 20/00* (2019.01)

(58) Field of Classification Search
None
See application file for complete search history.

(56) References Cited

U.S. PATENT DOCUMENTS

| 8,645,823 B1 | 2/2014 | Thiess |
| 9,747,258 B2 | 8/2017 | Ben-Aharon |

(Continued)

FOREIGN PATENT DOCUMENTS

WO    2018225012 A2    12/2018

OTHER PUBLICATIONS

International Search Report for corresponding PCT application PCT/IL2020/050555 dated Jul. 9, 2020.
(Continued)

*Primary Examiner* — Howard Cortes
(74) *Attorney, Agent, or Firm* — Heidi Brun Associates Ltd.

(57) ABSTRACT

A website building system includes a processor; at least one database storing at least website pages and layouts comprising fluid components, breakpoint ranges for multiple viewport sizes, dynamic layout rules and responsive editing rules for editing said fluid components according to breakpoint ranges and a responsive editing module running on the processor, the module includes a rule engine to provide layout decisions for a page of a website built by the WBS according to the dynamic layout rules and the responsive editing rules associated with at least one incoming trigger; a responsive editor to receive the at least one incoming trigger and dimensions of a current viewport, and to generate an updated fluid responsive design layout for said current
(Continued)

viewport according to the layout decision and a CSS (cascading style sheet) generator to map the features of the updated fluid responsive design layout design into a smart CSS for the current viewport.

16 Claims, 46 Drawing Sheets

Related U.S. Application Data continuation of application No. 16/879,350, filed on May 20, 2020, now Pat. No. 10,984,177.

(60) Provisional application No. 62/970,034, filed on Feb. 4, 2020, provisional application No. 62/850,244, filed on May 20, 2019.

(51) Int. Cl.
*G06F 16/958* (2019.01)
*G06N 20/00* (2019.01)

(56) References Cited

U.S. PATENT DOCUMENTS

| | | |
|---|---|---|
| 9,996,566 B2 | 6/2018 | Ben-Aharon |
| 10,073,923 B2 | 9/2018 | Koren |
| 10,146,419 B2 | 12/2018 | Geva |
| 10,176,154 B2 | 1/2019 | Ben-Aharon |
| 10,185,703 B2 | 1/2019 | Abrahami |
| 10,402,064 B1 | 9/2019 | Al-Sallami |
| 10,459,699 B2 | 10/2019 | Geva |
| 10,474,741 B1 | 11/2019 | Garg |
| 10,614,156 B1 | 4/2020 | Stansell |
| 10,776,084 B1* | 9/2020 | Lee ............ G06F 3/0481 |
| 2002/0023111 A1 | 2/2002 | Arora |
| 2012/0239598 A1 | 9/2012 | Cascaval |
| 2014/0282218 A1 | 9/2014 | Kaufman |
| 2015/0039996 A1 | 2/2015 | Kwon |
| 2015/0234798 A1 | 8/2015 | Mocanu |
| 2016/0048483 A1 | 2/2016 | Baldwin |
| 2016/0048605 A1 | 2/2016 | Baldwin |
| 2016/0162448 A1 | 6/2016 | Wang |
| 2017/0024404 A1* | 1/2017 | Tocchini ............ G06F 40/106 |
| 2017/0031574 A1 | 2/2017 | Dhawal |
| 2017/0091152 A1 | 3/2017 | Antipa |
| 2018/0174229 A1 | 6/2018 | Sherwin |
| 2018/0293323 A1 | 10/2018 | Abrahami |
| 2019/0095945 A1 | 3/2019 | Fabbri |
| 2019/0243882 A1 | 8/2019 | Fialkow |
| 2020/0125631 A1 | 4/2020 | Seel |
| 2020/0150937 A1 | 5/2020 | Smith |
| 2020/0151241 A1 | 5/2020 | Samireddy |
| 2020/0210479 A1* | 7/2020 | Bequet ............ G06F 16/90344 |
| 2020/0211050 A1 | 7/2020 | Lee |

OTHER PUBLICATIONS

Extended European Search Report issued in corresponding European application 20808749.4 on Feb. 28, 2023.

Unknown: "Introducing the Visual CCS Grid Editor: Pinegrow Web Editor", Sep. 18, 2018, pp. 1-17, XP093025000, Retrieved from the Internet: URL: https://web.archive.org/web/20180918174558/https://pinegrow.com/blog/introducing-the-visual-css-grid-editor/ [retrieved on Feb. 17, 2023].

Meyer, Eric A: "Grid layout in CSS: interface layout for the web", Jan. 1, 2016, pp. 1-83, XP093024975, Retrieved from the Internet: URL:http://159.69.3.96/ebooks/IT/WEB_PROGRAMMING/css/Grid_Layout_In_CC.pdf [retrieved on Feb. 17, 2023].

\* cited by examiner

FIG. 10A

SYSTEM AND METHOD PROVIDING RESPONSIVE EDITING AND VIEWING, INTEGRATING HIERARCHICAL FLUID COMPONENTS AND DYNAMIC LAYOUT

CROSS REFERENCE TO RELATED APPLICATIONS

This application is a continuation application of U.S. patent application Ser. No. 17/233,575, filed Apr. 19, 2021 which is a continuation of U.S. patent application Ser. No. 16/879,350, filed May 20, 2020, which claims priority from U.S. provisional patent applications 62/850,244, filed May 20, 2019, and 62/970,034, filed Feb. 4, 2020, all of which are incorporated herein by reference.

FIELD OF THE INVENTION

The present invention relates to website building systems generally and to responsive editing in particular.

BACKGROUND OF THE INVENTION

Website building systems (WBS) are used by both novices and professionals to create interactive websites. Existing WBSs are based on a visual editing model and most WBSs typically provide multiple templates, with a template possibly including a complete sample website, a website section, a single page or a section of a page.

WBS users (also known as designers, subscribers, subscribing users or site editors) may design the website and the website's end-users (the "users of users") may access the websites created by the users. Although end-users typically access the system in read-only mode, WBSs (and websites) may allow end-users to perform changes to the web site such as adding or editing data records, adding talkbacks to news articles, adding blog entries to blogs etc. The WBS may in fact allow multiple levels of users (i.e. more than two levels), and assign different permissions and capabilities to each level. Users of the WBS (in particular in the full or partial on-line configurations described below) may register in the WBS server which manages the users, their web sites and accesses by the end-users.

A WBS may be a standalone system, or may be embedded inside a larger editing system. It may also be on-line (i.e. applications are edited and stored on a server), off-line or partially on-line (with web sites being edited locally but uploaded to a central server for publishing). The WBS may use an internal data architecture to store WBS based sites and this architecture may organize the handled sites' internal data and elements inside the system. This architecture may be different from the external view of the site (as seen, for example, by the end-users). It is also typically different from the way the HTML pages sent to the browser are organized.

For example, the internal data architecture may contain additional properties for each element in the page (creator, creation time, access permissions, link to templates, SEO (search engine optimization) related information etc.) which are relevant for the editing and maintenance of the site in the WBS, but are not externally visible to end-users (or even to some editing users). The WBS may implement some of its functionality (including both editing and run-time functionality) on a server or server set, and some of its functionality on client elements. The WBS may also determine dynamically whether to perform some functionality on the server or on the client platform.

A WBS typically handles the creation and editing of visually designed applications (such as a website) consisting of pages, containers and components. Pages may be separately displayed and contain components. Components may include containers as well as atomic components. Reference is made to FIG. 1, which is a schematic block-diagram illustration of a website building system (WBS) 2 which may be used for building a website 3, in accordance with some demonstrative embodiments of the present invention. WBS 2 may be used to build, produce, edit and/or generate website 3, which may comprise pages 4 which may include components 5 (e.g., text, images, videos).

The WBS may also support hierarchical arrangements of components using atomic components (text, image, shape, video etc.) as well as various types of container components which contain other components (e.g. regular containers, single-page containers, multi-page containers, gallery containers etc.). The sub-pages contained inside a container component are referred to as mini-pages, and each of which may contain multiple components. Some container components may display just one of the mini-pages at a time, while others may display multiple mini-pages simultaneously.

The components may be content-less, or have internal content. An example of the first category is a star-shape component, which does not have any internal content (though it has color, size, position, attributes and other parameters). An example of the second category is a text paragraph component, whose internal content includes the internal text as well as font, formatting and layout information (which is also part of the content rather than being attributes of the component). This content may, of course, vary from one instance of the text paragraph component to another. Components which have content are often referred to as fields (e.g. a "text field").

Pages may use templates, general page templates or component templates. Specific cases for templates include the use of an application master page containing components replicated in all other regular pages, and the use of an application header or footer (which repeat on all pages). Templates may be used for the complete page or for page sections. The WBS may provide inheritance between templates, pages or components, possibly including multi-level inheritance, multiple inheritance and diamond inheritance (i.e. A inherits from B and C and both B and C inherit from D).

The visual arrangement of components inside a page is called a layout. The WBS may also support dynamic layout processing, a process whereby the editing of a given component (or other changes affecting it such as externally-driven content change) may affect other components, as further described in U.S. Pat. No. 10,185,703 entitled "Website Design System Integrating Dynamic Layout and Dynamic Content" granted 22 Jan. 2019, commonly owned by the Applicant and incorporated herein by reference.

A WBS may be extended using add-on applications such as a third party application and its components, list applications (such as discussed in US Patent Publication No. US 2014/0282218 entitled "Device, System, and Method of Website Building by Utilizing Data Lists" published 18 Sep. 2014, commonly owned by the Applicant and incorporated herein by reference.) and WBS configurable applications (such as described in in US Patent Publication No. 2020/0151226 entitled "System And Method for Creation and Handling of Configurable Applications for Web site Building Systems" published 14 May commonly owned by the Applicant and incorporated herein by reference). These third party applications and list applications may be added and integrated into designed websites.

Such third party applications and list applications may be purchased (or otherwise acquired) through a number of distribution mechanisms, such as being pre-included in the WBS design environment, from an Application Store (integrated into the WBS's market store or external to it) or directly from the third party application vendor.

The third party application may be hosted on the WBS vendor's own servers, the third party application vendor's server or on a 4th party server infrastructure.

The WBS may also allow procedural code to be added to some or all of the system's entities. Such code could be written in a standard language (such as JavaScript), an extended version of a standard language or a language proprietary to the specific WBS. The executed code may reference APIs provided by the WBS itself or external providers. The code may also reference internal constructs and objects of the WBS, such as pages, components and their attributes.

The procedural code elements may be activated via event triggers which may be associated with user activities (such as mouse move or click, page transition etc.), activities associated with other users (such as an underlying database or a specific database record being updated by another user), system events or other types of conditions.

The activated code may be executed inside the WBS's client element, on the server platform or by using a combination of the two or a dynamically determined execution platform. Such a system is described in US Patent Publication No. US 2018/0293323 entitled "System and Method for Smart Interaction Between Website Components" published 11 Oct. 2018, commonly owned by the Applicant and incorporated herein by reference.

Typical site creation may be based on a number of models, including a visual editing model (in which the user edits a previously created site) and an automatic site generation model or a combination thereof as illustrated in FIG. 2 to which reference is now made and is described in U.S. Pat. No. 10,073,923 entitled "System and Method for the Creation and Update of Hierarchical Websites Based on Collected Business Knowledge" granted 11 Sep. 2018, commonly owned by the Applicant and incorporated herein by reference.

It will be appreciated that throughout the specification, the acronym WBS may be used to represent a website building system. FIG. 2 illustrates a system 100 that comprises a typical WBS 2 in communication with client systems operated by WBS vendor staff 61, a site designer 62 (i.e. a user), a site user 63 (i.e. user of user) and with external systems 70. WBS 2 may further comprise a WBS site manager 10, an object marketplace 15, a WBS RT (runtime) server 20, a WBS editor 30, a site generator system 40 and a WBS content management system (CMS) 50. It will be appreciated that the elements of FIG. 2 may function as described in U.S. Pat. No. 10,073,923.

In the visual editing model, the user (designer) edits a site based on one or more website templates. The WBS provider may provide multiple site (or other) templates, with each template possibly including a complete sample web site, a web site section, a single page or a section of a page. Users may have the option to start with an empty site (essentially a "blank page" template) but would typically start with an actual site template.

The WBS provider may provide site templates ranging from the very generic (e.g. mobile site, e-store) through the more specific (e.g. law office, restaurant, florist) to the highly specific ones (e.g. a commercial real-estate law office or a Spanish tapas restaurant). Such templates are typically stored in a repository accessible to users of the WBS and are typically classified according to business type, sub-type or industry. Templates may also be created (and classified) according to style, color range or other parameters and not just according to business type. Site templates may be extended with additional (typically back-end) functionality, services and code in order to become full-fledged vertical solutions integrated with the WBS.

Thus, the user's first experience when creating a site using a WBS visual editor may typically be that the user chooses a template (e.g. according to style or industry type/sub-type), possibly a blank template and then edits the template in the visual editor including the editing of content, logic, layout and attributes. Such editing may include (in particular) adapting the template and its elements to the details of the user's business. The user may then publish the modified site.

Under the site generation model, the WBS generates an initial site for the user, based on a selected template, possibly modified by filling-in common elements of information, and possibly allowing follow-up editing of the generated site. This filling-in is required as various pieces of information (such as the business name or a description of the management team) are included in multiple locations in the template's pages. Thus, the user may have to change the business name (for example) in multiple places throughout the template.

Furthermore, some template elements (e.g. a generic product page) may appear multiple times, with each instance displaying the details of a different instance of an underlying entity (e.g. different products offered in the site). Such multiple instances may be manually specified (e.g. the details of different persons in the company's management team) or dynamically derived from an external database (e.g. product details from the "products on sale" database). Such an arrangement is often known as a "repeater".

The template may also include fields. For example, the WBS may allow the template designer to specify fields (also known as "placeholders") for the insertion of values inside the templates, such as {CompanyName}, {ProductName}, {ProductPrice} etc. The user may also specify the values for the fields defined in the template selected for the website.

The WBS may allow the user to enter simple or complex values (e.g. text and images), as well as additional (non-field) information such as selection of included pages or web site areas, colors, style information, links, formatting options, website display options, decoration elements (such as borders and backgrounds) etc.

The WBS may also allow the user to enter some of this additional information before selecting a template, and use this information to help in selecting a template (e.g. by narrowing the set of proposed templates). For example, the user may select a certain generic color scheme (e.g. pastel colors) or style (e.g. business/formal), and the system may then use this selection to narrow the set of proposed templates.

The system may also display a series of views or questionnaires to allow the user to enter values or selections (for both the defined fields and the additional information above). The system may further create a connection (or binding) between a multiple-instance element of the template (as described herein above) and an internal or external database which provides the data instances used to generate the displayed instances.

Once a template has been selected and its fields and additional information have been specified (e.g. through the questionnaires or through binding to data sources), the WBS may generate the website containing the combined information. The user may then publish the site (through the WBS or otherwise).

A WBS may perform semi-automatic site creation using a different model as described in U.S. Pat. No. 10,073,923. Under this model, the system gathers information on the user and his web site requirements from multiple sources which may include, for example: user-filled questionnaires; existing user presence (such as existing web sites or social media presence), industry sources (such as general trade web sites), off-line information and internal system repositories which provide information on specific business types, such as basic template information for specific business types (lawyers, restaurants, plumbers, graphic designers etc.), possibly refined for specific industries (e.g. distinguishing between real-estate lawyers and personal injury lawyers).

The system may also gather external information from other sites, both internal and external to the system. Such information may affect, for example, the selection of offered questionnaires and layout elements, proposed defaults etc. Such information may also typically be collected on a statistical or summary basis, in order not to expose information belonging to any single user, and protect users' privacy, anonymity and legal rights (such as copyrights). Such information may be located based on information provided by the user which may be direct (e.g. an existing website address) or indirect (a business name and geographical address which can be used to locate information about the business).

The gathered information is analyzed and arranged into a repository of content elements which are then mapped onto layout elements which present the content from the content elements and combine the layout elements to form the site. The layout element mapping, selection and combination process may be fully automatic or semi-automatic (i.e. including user interaction).

To support the above mentioned functionality above, a WBS will typically maintain a series of repositories, stored over one or more servers or server farms. Such repositories may typically include various related repositories such as a user information/profile repository, a WBS (WBS) component repository, a WBS site repository, a Business Intelligence (BI) repository, an editing history repository, a third party application store repository, etc. The system may also include site/content creation related repositories such as a questionnaire type repository, a content element type repository, a layout element type repository, a design kit repository, a filled questionnaires repository, a content element repository, a layout element repository, a rules repository, a family/industry repository etc. A description of these repositories may be found in U.S. Pat. No. 10,073,923.

Responsive editing for web design is known in the art. In an age of creating and viewing websites on different sized viewports such as personal computers, tablets and mobile communication devices (all of which themselves have different screens displays and windows with different viewing dimensions), responsive editing allows for the rendering of a single web page on a variety of devices and window or screen sizes. It will be appreciated that websites may be responsive i.e. may change their design when viewed and may be supported by a responsive editor. Alternatively some systems may support the functionality of a responsive site without the use of a responsive editor. Thus content, design and performance are maintained across all devices and platforms to ensure usability and satisfaction.

A site designed to comply with responsive editing typically adapts the layout to the viewing environment by using mechanisms such as proportion based grids which allow for page element sizing in relative units such as percentages rather than absolute units such as pixels or points. Elements may be docked onto the page and breakpoints may be defined to designate at what point a website page's content and design needs to be adapted in a non-continuous manner to meet the different viewport sizes. The breakpoints define the specific width points where the webpage should use a different layout or arrangement of components accordingly (rather than modifying the design in a continuous manner).

There are many ways to implement responsive web sites (both for viewing and editing). For example, responsive site behavior can be implemented:

On the server side, e.g. through pre-processing or adapting the page definition for a given target device or width.

On the client side, using JavaScript (or any other browser-based language) to process page width or other target characteristics parameters or changes.

On the client side, using CSS (cascading style sheets), or any other mark-up, presentation or style definition language which provide device, platform or display information querying and the ability to create declarative style definitions based on characteristics of the target device or display. Such declarative style definitions may be executed inside the browser's rendering engine, without requiring rendering external code to execute (such as JavaScript code).

As a user changes his viewport display (whether by changing his device or display window), the website should automatically switch to accommodate resolution, viewports size and scripting abilities by any (or a combination) of the methods above.

SUMMARY OF THE PRESENT INVENTION

There is therefore provided, in accordance with a preferred embodiment of the present invention, a website building system (WBS) and a method implemented thereon. The WBS includes at least one database storing at least website pages and layouts comprising fluid components, breakpoint ranges for multiple viewport sizes, dynamic layout rules and responsive editing rules for editing the fluid components according to breakpoint ranges. It also includes a responsive editing module running on the processor which includes a rule engine to provide layout decisions for a page of a website built by the WBS according to dynamic layout rules and responsive editing rules associated with at least one incoming trigger; a responsive editor to receive the at least one incoming trigger and dimensions of a current viewport, and to generate an updated fluid responsive design layout for the current viewport according to the layout decision; and a CSS (cascading style sheet) generator to map the features of the updated fluid responsive design layout design into a smart CSS for the current viewport.

Moreover, in accordance with a preferred embodiment of the present invention, the system further includes a machine learning (ML)/artificial intelligence (AI) engine trained to provide machine layout and artificial intelligence support for the layout.

Further, in accordance with a preferred embodiment of the present invention, the ML/AI engine comprises at least one machine learning feedback module.

Still further, in accordance with a preferred embodiment of the present invention, the responsive editor further includes an edit receiver to receive the at least one incoming trigger; an edit handler to define changes to the components of the page according to the at least one incoming trigger and current viewport dimensions; and a previewer to enable a user to preview layouts at different breakpoints within a breakpoint range for the current viewport.

Additionally, in accordance with a preferred embodiment of the present invention, the system also includes an explainer and suggester to provide an explanation to the user for a given action by the edit handler and to offer the user a solution or suggestion for an edit according to the ML/AI engine.

Moreover, in accordance with a preferred embodiment of the present invention, the edit handler further includes at least one of: a DL (dynamic layout) handler to handle conflicts between the responsive editing rules and dynamic layout rules for the at least one incoming trigger; a layout handler to arrange the layout of the components according to the dimensions of the current viewport; a text scaler to scale the text point size of the components between a minimal and maximal predefined value according to the dimensions of the current viewport; a visibility handler to manage hiding and unhiding of the components for a breakpoint range; a component handler to handle component attribute changes according to the at least one incoming trigger and to adapt the components to the layout design accordingly; an animator to generate an animation for a user selection of components for a given range of widths or specific breakpoints; an add panel handler to add presets and add panels to the page according to the at least one incoming trigger; a component docker to dock components to a responsive editing grid arrangement inside their containing components as a result of the at least one incoming trigger; a grid handler to adjust the responsive editing grid of the containing component according to the output of the component handler according to the at least one incoming trigger; and a component grouper to group components for the layout decisions according to a hierarchical set of group definitions.

Further, in accordance with a preferred embodiment of the present invention, the ML/AI engine analyzes absolute layout definitions for the responsive editor during editing and saving, detects user input and converts the user input into to a declarative set of rules.

Still further, in accordance with a preferred embodiment of the present invention, the explainer and suggester comprises a next move suggester to suggest a next move according to the user input.

Additionally, in accordance with a preferred embodiment of the present invention, the at least one incoming trigger is at least one of: a user edit, a system modification, a change of device type, user properties, a user/device interaction change, concurrent editing by a second user, system procedural change and a user environmental change.

Further, in accordance with a preferred embodiment of the present invention, the editor supports drag and drop editing for layout design combining fluid components and breakpoint support.

Still further, in accordance with a preferred embodiment of the present invention, the analysis is according to at least one of dynamic layout rules, component properties, content, editing history of the components, related business information and component group recognition.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 10A-10B are schematic illustrations of the use of sections and component selection for a breadcrumb display; constructed and operative in accordance with an embodiment of the present invention;

Figure 1:
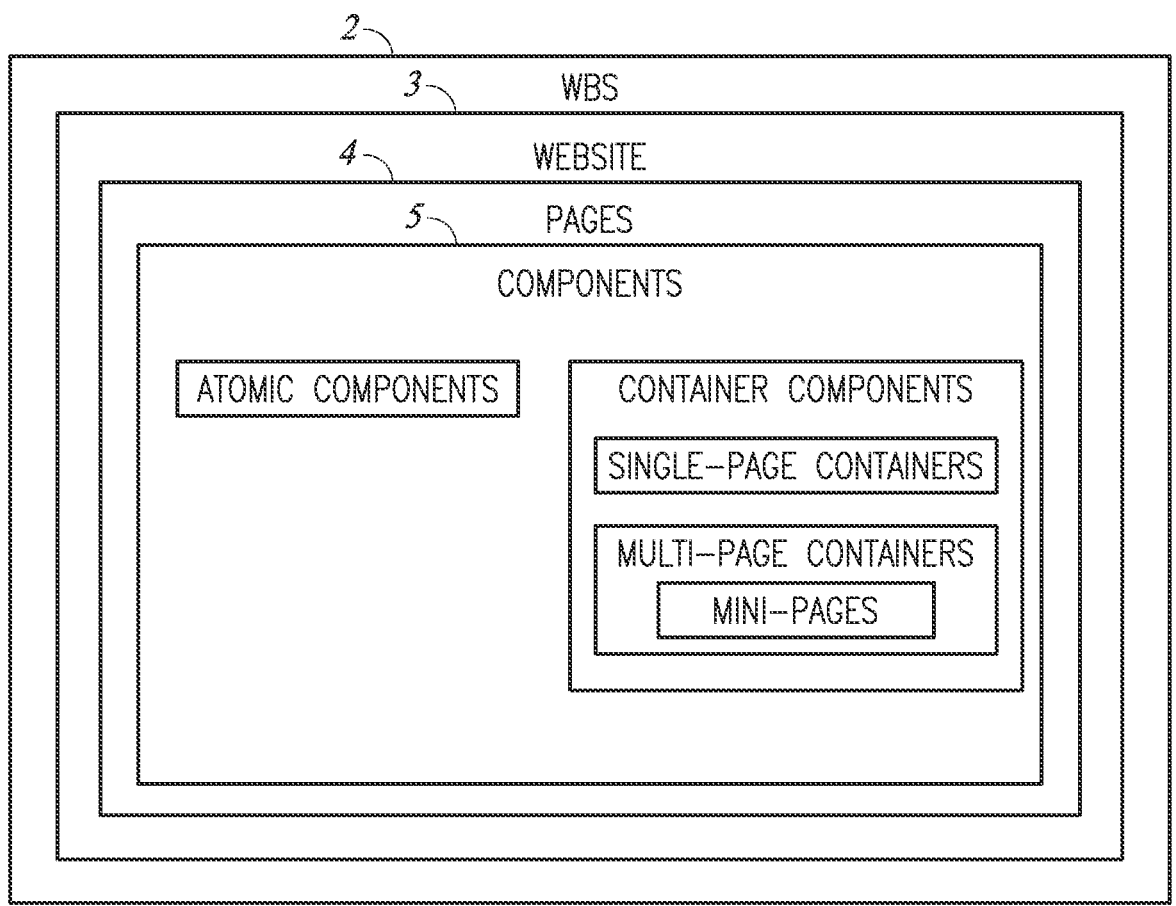
FIG. 1 is a schematic block-diagram illustration of the makeup of a website building system which may be used for building a website.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The responsive editing systems of the prior art, typically work at the website or page level, having pre-defined fixed breakpoints for sizing a website, enabling responsive editing on a limited number of viewports (including screens, displays and windows). It will be appreciated that when a site is changed (such as components changing size or position), the changes are continuous between breakpoints (within a single breakpoint range). When a breakpoint is crossed, non-continuous changes may occur and components may jump from one position to another (e.g. component A may move above component B instead of side by side when the screen width shrinks.) Components may also appear and disappear when a breakpoint is crossed.

Applicant has realized that if the web designer has full control of his breakpoints, i.e. he can define his own ranges, he is able to effectively design websites with the knowledge of which breakpoint range sizes may be handled in a continuous manner and which are handled by altering the design in order to display his website over a larger range of viewports. This may enable the user to create and handle multi-size sites more effectively.

Furthermore, Applicant has realized that a responsive editor suited to a hierarchical component based system i.e. handle functionality at the component level may ensure that breakpoints may be handled not only at the page level, but also at the presets level as well as the container level (e.g., using responsive editing grids at the container component level for the docking of its sub-elements) together with any implemented hierarchy. Thus the designer's ability to define his own breakpoint ranges may give the designer full control over his media such as switching the use of an image from "background" to "floating", the ability to apply multiple focal points (one per each break point) and the ability to provide different cropping parameters per breakpoint range.

Applicant has further realized that responsive editing components may be considered fluid and therefore be responsive to dynamic layout triggers and events that may occur during website editing. A layout may incorporate fluid components whose size and attributes may be affected by their parents (e.g. by parent changes or viewport width changes) or by additional triggers. The effects could be automatically determined by the system and may also be specified or edited by the user (e.g. the component width is a given percentage or function of the parent component width).

Applicant has also realized that the use of machine learning (ML) and artificial intelligence (AI) techniques and models to facilitate aspects of the user's work may also be integrated into a responsive editing system as described herein above, such as an understanding of how the user works in order to automatically adapt his layout to best fit all breakpoints. This may involve a system offering sections and components by understanding and detecting user intent. The system may employ a number of ML/AI engines to achieve its goals using the information available in the WBS such as website component information, business information, editing history and other site related information as well as WBS-based training feedback as described in the US Patent Publication No. US 2020/0380060 entitled "System and Method for Integrating User Feedback into Website Building System Services" published on Dec. 3, 2020, commonly owned by the Applicant and incorporated herein by reference.

Applicant has further realized that the application of rule based and ML/AI engines may also be used to provide complete design expression capabilities where the system translates drag and drop designs into full CSS and understands the best fit locations for breakpoints. This may also include packaged layouts that support responsive design and fluid components and can further adapt to the breakpoints of the target design.

Thus responsive editing functionality may be combined with the website building system process as described in the background and the layout elements described may be adapted in order to build a responsive site.

Furthermore, Applicant has also realized that the above-mentioned functionality may also be applied to existing nonresponsive websites (i.e. those without breakpoints) if they are converted or rendered to a smart mesh form which may also be implemented efficiently on web browsers and other client systems. This capability may be applied to existing WBS sites, or to sites imported from other systems. The smart mesh structure may therefore be used to define a site (with responsiveness and fluidity) declaratively. In this way, browsers may respond to changes in the width (as an example) inside the browser engine (e.g. as part of the CSS processing and display rendering). The process may provide inference and analysis for effective dynamic layout operations based on analysis of WBS component properties (geometrical/non-geometrical) and accumulated information (such as editing history and collected BI) tasks such as group detection and anchor generation.

Figure 3:
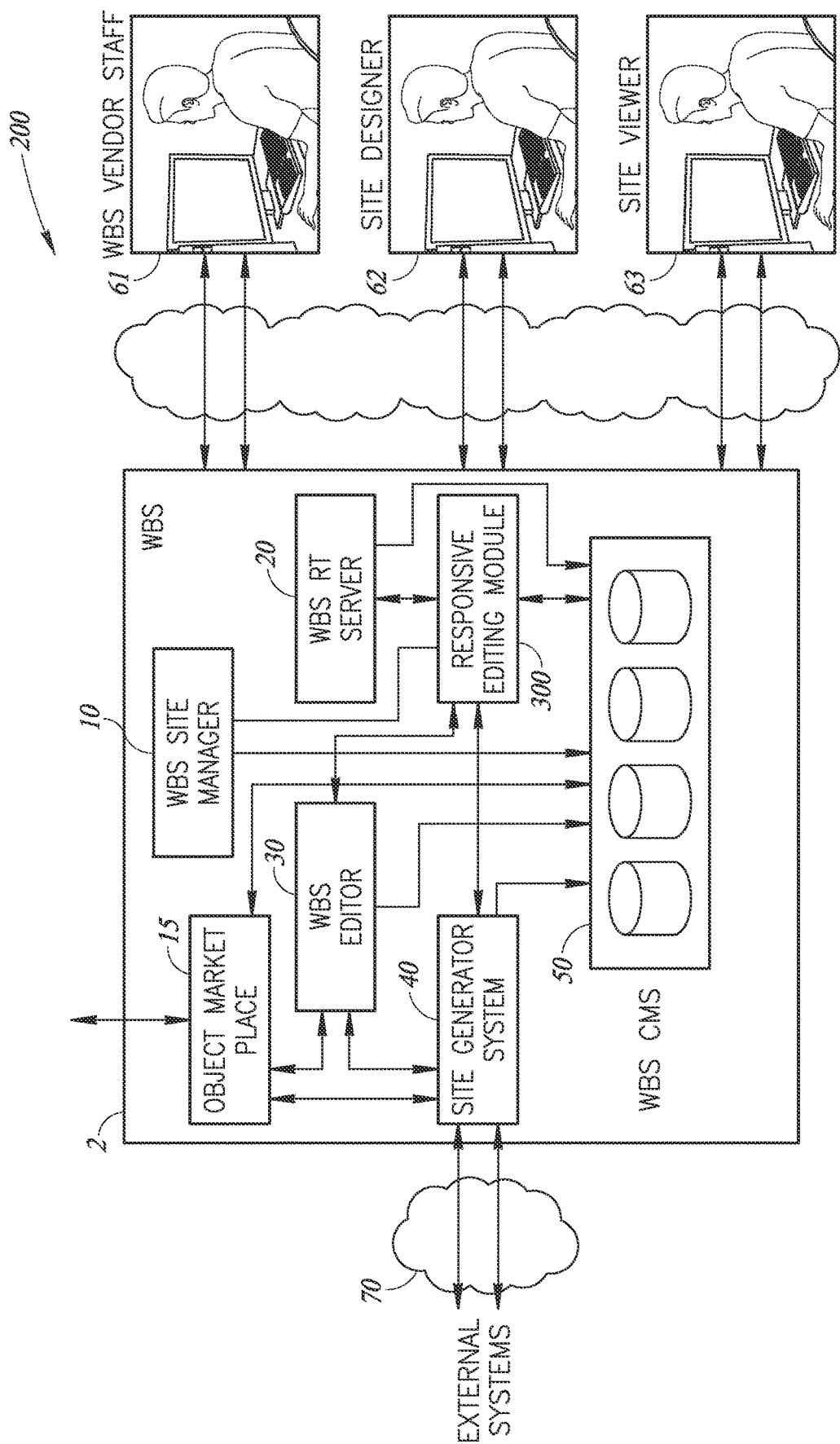
FIG. 3 is a schematic illustration of the creation, viewing and editing of websites using a responsive editor module; constructed and operative in accordance with an embodiment of the present invention.

Reference is now made to FIG. 3 which illustrates a system 200 for the creation, viewing and editing of websites using a responsive editor module constructed and operative in accordance with an embodiment of the present invention. System 200 may comprise the elements of system 100 as described in U.S. Pat. No. 10,073,923 (as well as any sub elements) in conjunction with a responsive editing module 300. In an alternative embodiment, system 200 may provide a unified module that combines the functionality of WBS editor 30, site generation system 40 and responsive editing module 300 or a module combining the functionality of WBS editor 30 and responsive editing module 300 only.

Figure 2:
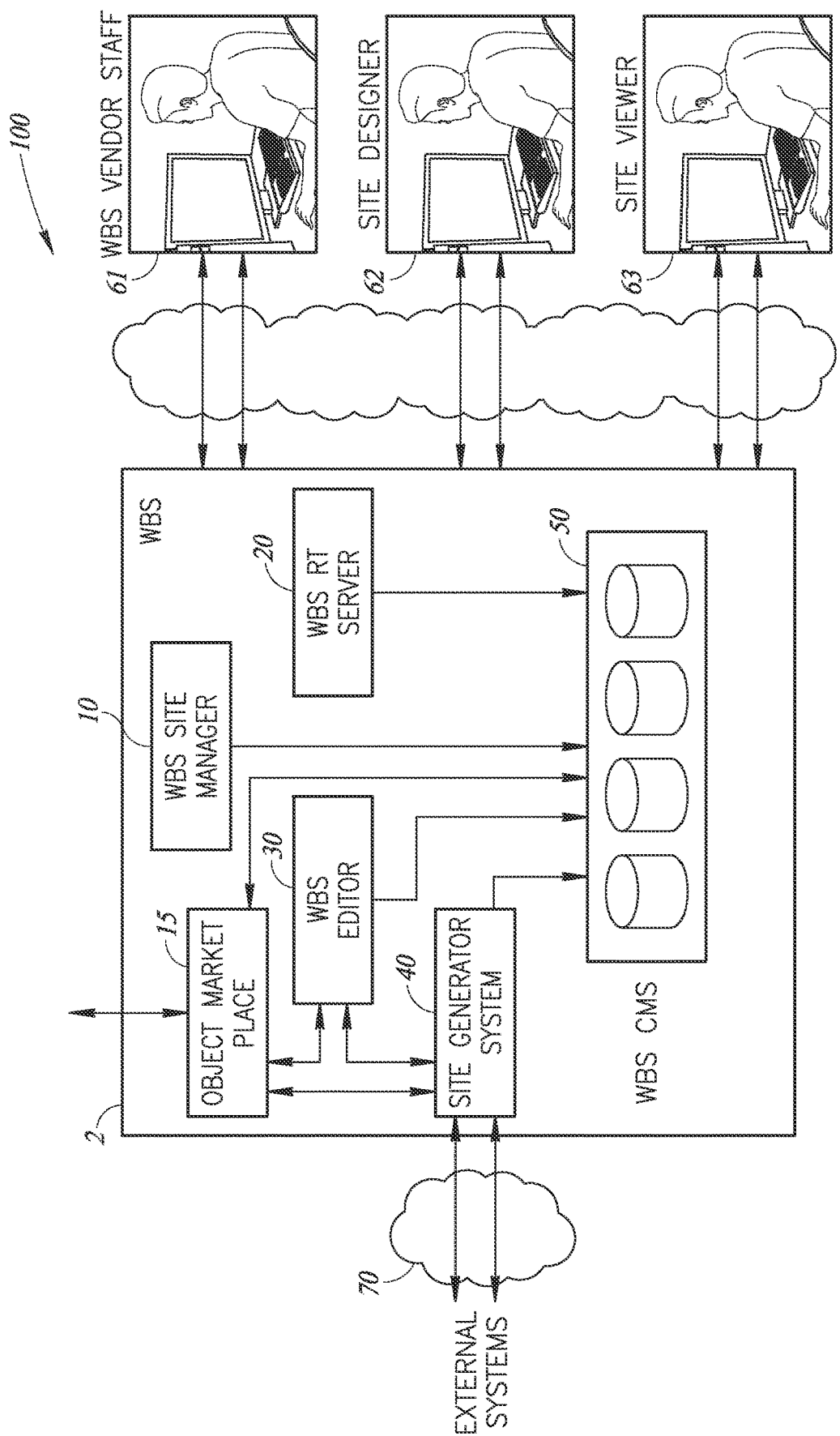
FIG. 2 is a schematic illustration of the elements of a prior art website building system.

It will be appreciated that the discussion below refers to the applications created by WBS's and accessed by the end-users as web sites, although system 200 may be fully applicable to other categories of online applications which are accessed using specific client software (proprietary or not). Such client software may run standalone or be activated from a browser (such as the Adobe Flash plug-in). End-users may access these websites using client software on regular PCs (as illustrated in FIG. 2 back to which reference is now made) but also on smart-phones, tablet computers and other desktop, mobile or wearable devices. Alternatively, the description herein may apply to systems which generate or edit mobile applications, native applications or other application types as described in U.S. Pat. No. 9,996,566 entitled "Visual Design System for Generating a Visual Data Structure Associated with a Semantic Composition Based on a Hierarchy of Components" granted 12 Jun. 2018, commonly owned by the Applicant and incorporated herein by reference.

Furthermore, the discussion below is focused on websites hosted by the website building system provider (which implements system 200). However, system 200 may be implemented with additional types of websites and other non-web digital creations. These may include, for example, the following (or any combination thereof): full websites and website sections (e.g., a subset of the website's pages) or sections of one or more website pages, websites designed for regular desktop computer viewing, mobile websites and tablet-oriented website and websites created by a website building system but hosted externally (i.e., not by the website building system vendor). They may further include websites running locally on a local server installed on the user's machine, websites which serve as a UI and are hosted within other systems (including embedded systems and appliances) and other types of websites and other non-web digital creations which may also include websites or other displayed visual compositions hosted within larger systems, including (for example) pages hosted within social networks (such as Facebook), blogs, portals (including video and audio portals which support user-customizable pages such as YouTube channels), etc. This may include other types of remotely accessible online presence which are not regarded as a web site.

Other types of websites and other non-web digital creations may also include interactive (mobile or otherwise) applications, including hybrid applications (which combine locally-installed elements with remotely retrieved elements) and non-interactive digital creations, such as e-mails, newsletters, and other digital documents.

Figure 4:
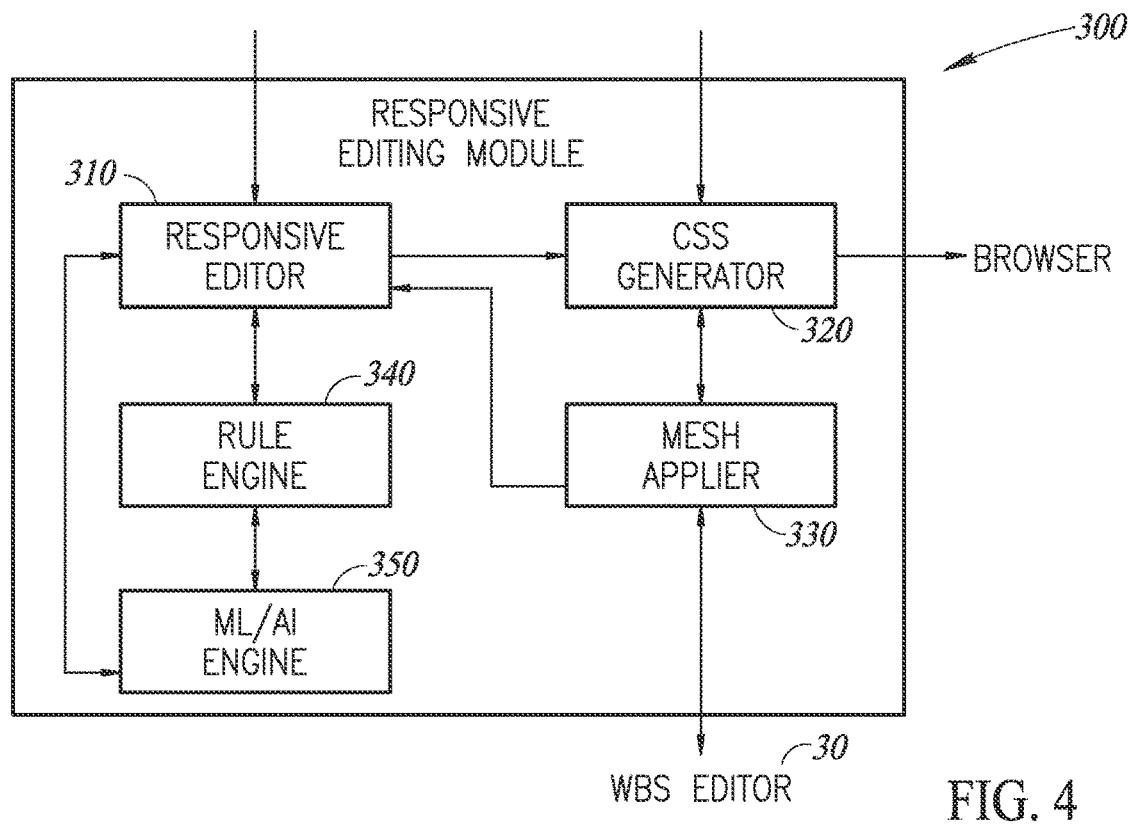
FIG. 4 is a schematic illustration of the elements of the responsive editing module of FIG. 3, constructed and operative in accordance with an embodiment of the present invention.

Reference is now made to FIG. 4 which illustrated the elements of responsive editing module 300. Module 300 may further comprise a responsive editor 310, a CSS generator 320, a mesh applier 330, a rule engine 340 and an ML/AI engine 350. Responsive editor 310 may enable a user to create and edit responsive websites (including specifying ranges for breakpoints) and may use functionality from rule engine 340 and ML/AI engine 350. CSS generator 320 may generate smart CSSs as a result of an editing change and mesh applier 330 may be used to transform nonresponsive websites into responsive ones having grids that are responsive target display changes. It will be appreciated that an updated CSS created as a result of an edit may be saved as the CSS or as a data structure that represents it in CMS 50. CSS generator 320 may take this definition and generate a smart CSS accordingly. The functionality of these elements is discussed in more detail herein below.

It will be appreciated that when implemented on a non-browser-based system, system 200 may be implemented differently including having some elements of the system integrated with the underlying system rendering or display framework. This may be done on the underlying system server, client or other element or platform in the underlying system.

Figure 5:
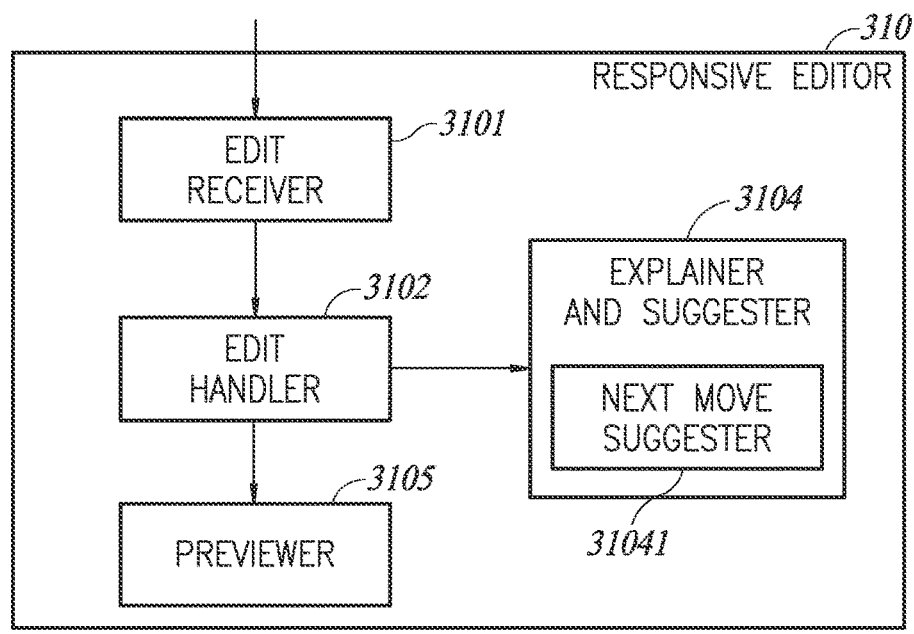
FIG. 5 is a schematic illustration of the elements of the responsive editor of FIG. 4, constructed and operative in accordance with an embodiment of the present invention.

Reference is now made to FIG. 5 which illustrates the elements of responsive editor 310. It will be appreciated that responsive editor 310 may function as a regular editor providing a standard editing UI in order to interact with the user. Responsive editor 310 may further comprise an edit receiver 3101, an edit handler 3102, a previewer 3105, an explainer and suggester 3104. The functionality of these elements is described in more detail herein below. Explainer and suggester 3104 may further comprise a next move suggester 31041.

Edit receiver 3101 may receive the incoming event or trigger (from both system and user). Edit handler 3102 may determine the required handling of the edit, previewer 3105 may provide a WYSIWYG preview of the application of the edit and explainer and suggester 3104 may provide an explanation to the user of given action and offer the user a solution or suggestion. The functionality of these elements is described in more detail herein below.

As discussed herein above, system 200 implements responsive sites based on layouts that may change based on changes to one or more site variables or parameters (herein "affecting variable(s)"). An example is a layout change (e.g. stretching or compressing of the layout) in response to a change in the site's window or display width.

Responsive editing module 300 may allow a user to define width value breakpoints and matching breakpoint ranges for displays associated with different viewports (such as 320-750 pixels for a smartphone screen, 750-1000 pixels for a tablet screen and 1000 pixels and higher for a desktop screen etc.).

System 200 may also support additional form factors which are larger than a regular desktop screen, such as very large displays used in electronic billboard systems (or multi-screen applications as described in more detail herein below) as well as very small ones (such as smartwatches or wearable device screens). Thus a website or application may be built for desktop resolutions with variants for both lower and higher resolutions.

It will be appreciated that when the width of the display site varies within a single breakpoint range, the layout may change in a continuous or semi-continuous manner. When a breakpoint is crossed, the layout may change in a non-continuous manner (as further discussed herein below), and components may change their position, size, visibility or other attributes. This process is known as cascading.

As discussed in more detail herein below, system 200 may implement additional affecting variables (such as changes in the site's display height) or a combination of multiple such parameters. The variables could also include other non-size information, such as platform type.

Furthermore, the affecting variables may be not a single parameter (or a combination thereof), but rather a function of multiple parameters. For example, system 200 may allow defining different layouts based on the aspect ratio of the display (which is a function of the display width and height).

As discussed herein above, a layout may incorporate fluid components whose size and attributes may be affected by their parents (e.g. by parent changes or viewport width changes) or by additional triggers as discussed in more detail herein below. It will be appreciated that these effects could either be automatically determined by edit handler 3102 or may also be specified or edited by the user (e.g. the component width is a given percentage or function of the parent component width). Such fluidity may be at the full component level, but may also apply to specific sub-elements of the component (e.g. a multi-column layout component in which the width of the columns may be specified as a formula based on the width of the full component).

System 200 may further apply dynamic layout techniques and other layout changes in response to additional events and responsive triggers occurring in or to the site as further discussed below.

As discussed herein above, module 300 may allow breakpoint definitions to be made at a number of levels, including the web site level, the individual page level, per section level and at the per specific container levels (including screen-wide containers or other containers).

Module 300 may also allow inheritance-based breakpoint definitions, e.g. defining a site-level breakpoint set, and allowing pages and/or sections to create their own variants.

It will be appreciated that the fluidity of the components as described herein above may be due to their ability to adapt accordingly to size changes or other affecting variable changes. Each component or layout may have its own processing rules as processed by rule engine 340 accordingly. These rules may be stored in CMS 50. It will be appreciated that this ability to adapt may be due to the application of predefined processing rules together with the application of responsive editing grids and elements such as layouters, splitters and wedges which may be applied at the different levels which allow components to move inside their containers and hierarchies as described in more detail herein below in relation to mesh applier 330.

It will be appreciated that the processing rules may affect editing procedures such as auto docking (changing the alignment and margins of components when dragged), size conversion on reparenting, size conversion when changing unit, dragging and resizing elements (updating grid areas, sizes and margins), applying a grid over content (updating grid areas, sizes and margins), deleting a grid row or column, deleting an entire grid, resizing for minimum and maximum values and changing the display of a layouter or a repeater.

Other rules may include dragging a component to a nonexistent cell on a lower breakpoint (updating its grid area so that it remains in the viewport), creating a stack, unstacking a stack, changing alignment, stretching and un stretching docking and margins, adding, removing and flipping sections (updating the page and sections grids) and flipping a section from horizontal to vertical (updating the size and position of components).

Figure 6A:
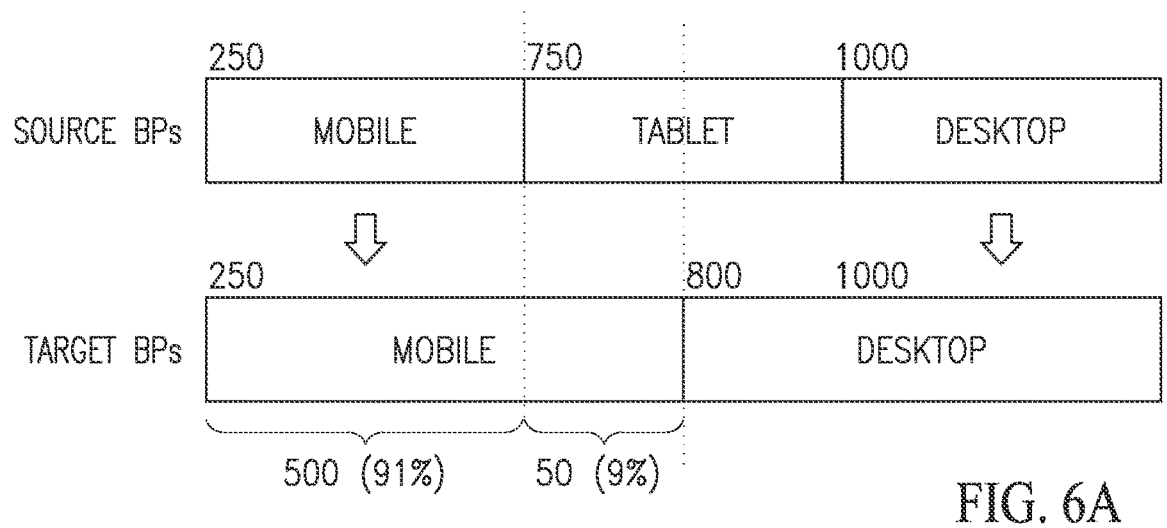
FIGS. 6A to 6C are schematic illustrations of how components having a given source breakpoint definition may be applied to a page or container having a new target breakpoint definition.
Figure 6B:
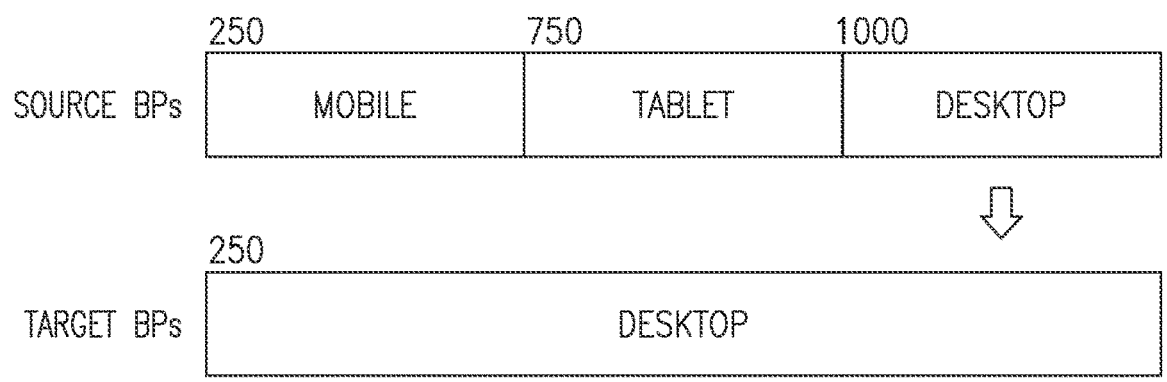
Figure 6C:
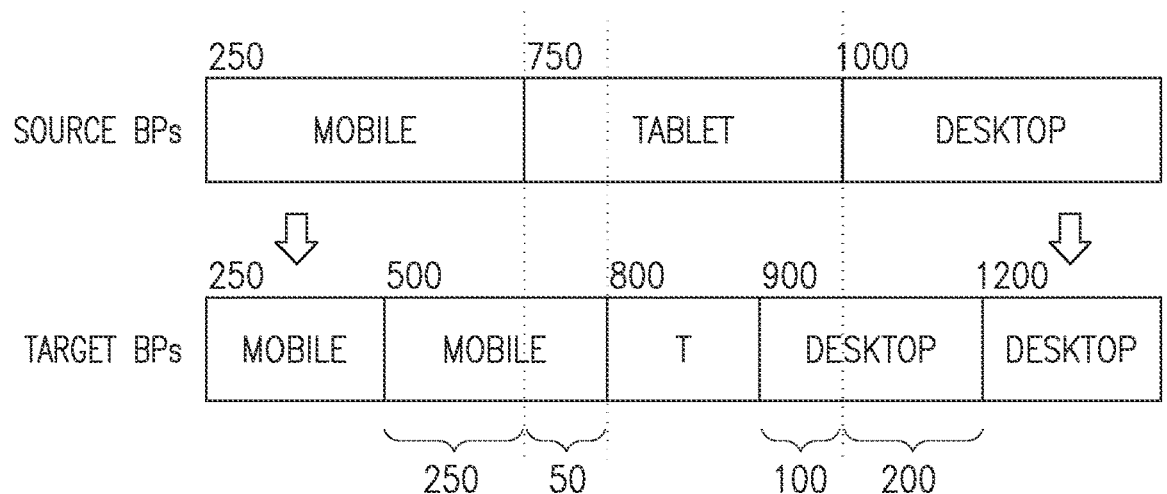

Reference is now made to FIGS. 6A-C which illustrate examples of how components having a given source breakpoint definition may be applied to a page or container having a new target breakpoint definition. This may be relevant for scenarios such as copying a section from one page to another (when pages have different breakpoint definitions), when using presets (i.e. when the user defines different breakpoint ranges from the default ones that came with the preset), and for shared parts (common elements shared through inheritance over multiple pages). This may include detaching a shared part and returning to the page breakpoint and moving elements from a page to a shared block and vice versa. In FIG. 6A the target breakpoints are less in number than the source breakpoints. In this scenario, one of the source breakpoints are dropped. In FIG. 6B, the target only has one breakpoint. Therefore, since the last breakpoint is defined to infinity (no maximum value), the coverage is the highest on the desktop. In FIG. 6C, the target has more breakpoints than the source and therefore the target breakpoints may be contained in the source breakpoint or between them. The highest overlap may be selected to define the mapping.

It will be appreciated that responsive editing module 300 may also provide drag and drop editing, as well as multiple other capabilities as described below to support the editing, publishing and running of generated sites that support responsive design, fluidity and dynamic layout.

It will be further appreciated that system 200 may provide responsive design, fluidity and dynamic layout capabilities during run-time (viewing of the site), as well as editing (when working in WYSIWYG mode to edit the site or in preview mode inside editor 310). It may also provide capabilities at the save, preview and publish stages.

System 200 may also provide site templates specific to responsive design, fluidity and dynamic layout. The user may create and edit sites using such templates.

It will be appreciated that module 300 may also provide additional capabilities to standard website building system procedures such as the contextual add panel and the next move suggestion described below. Such capabilities may shorten the editing time and improve the ease-of-use (as the user has fewer options or more focused options to choose from).

Module 300 may also provide capabilities such as layout suggestions via explainer and suggester 3104 for different breakpoints for existing layouts, as well as optimization for site looks and performance. These may allow the user to create a better-performing and more professionally designed site.

As discussed herein above, the current description focuses on an embodiment of system 200 in which a website layout is affected by changes to displayed site width. However system 200 may be adapted to modify the site's attributes and layout due to other affecting variables including changes and triggers. These may include but not be limited to changes to device properties such as width, height, orientation, changes to display viewport properties (when the viewport width or height changes) and changes to the site display sub-area inside the editor. This may occur (for example) when responsive editor 310 has a site display area which is a variable sub-area of the editor area. Responsive editor 310 may allow this area to be resized by the editing user (as shown in FIGS. 7A to 7G to which reference is now made) and may change the site layout based on this resizing. A detailed description of FIGS. 7A-7G is provided in more detail herein below.

Other triggers and changes may include user edits and modifications to the components, their attributes and their layout, changes to device type (e.g. devices having different resolution), changes to user properties such as changes to geography (location), user identity or other specific attributes associated with the user and changes to environmental properties such as changes to the level of lighting (day/night, indoors/outdoors).

Another trigger may be changes to interaction properties e.g. changes in the distance between the user and the screen (which affects the way the user views the screen). Thus, a site may detect when a user is viewing it from a distance (thus viewing the site on an "effectively smaller" screen) and adapt the site to that distant viewing, possibly changing site layout and using a larger font size. The site may then change as the user approaches the screen. The user's distance may be measured (for example) by any sensor available to the system, or analysis of video camera output available to the system. This may also work with multiple viewing users (e.g. in a public setting) by optimizing for the distance that best represents the multiple viewers (e.g. average distance).

It will be appreciated that the various triggers and changes described herein above, may occur in a number of ways. If the trigger or change is static, the site is opened with given parameters (e.g. a given device, resolution, width or height). In such a scenario system 200 may configure the site based on the various affecting variables, and this configuration may remain constant during the session.

The trigger may be discrete, for example, the site is opened on a mobile device in portrait mode (using a given width) and the user switches to and from landscape mode (having a larger width).

The trigger may be continuous, for example, the site is opened in a window having a given width, and the user varies this window width (during editing or viewing). Module 300 may respond continuously to these changes, modifying the site to adapt to the current width (or other affecting variables) at all times.

The trigger may also be non-user, i.e. the site is affected by changes not directly based on the user's action such a system procedural change. This could be, for example, due to any other changes to affecting variables (as described herein above). This could also be when a user views a site that is being edited by a different user in an embodiment that supports such concurrent editing and viewing of sites.

It will be appreciated that all of these triggers and changes are applicable when editing the site as well as at run-time access to the site. As discussed herein above, WBS 2 may provide some editing capabilities during run-time (e.g. allowing the creation of designed blog posts by users of a blog site).

Some of the triggers above (e.g. environmental or interaction changes) may also be relevant within a physical environment, as well as a non-physical environment (such as the changes occurring during editing or interaction with the site inside a virtual reality, augmented reality or any other non-physical environment).

Figure 8:
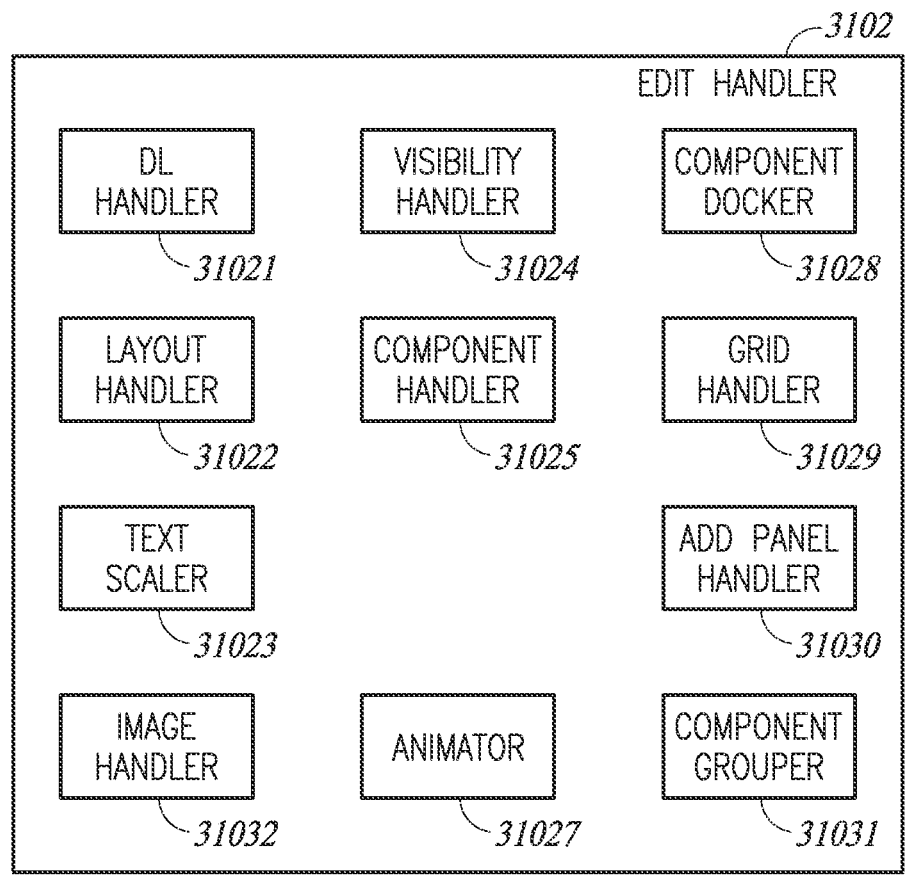
FIG. 8 is a schematic illustration of the elements of the edit handler of FIG. 5; constructed and operative in accordance with an embodiment of the present invention.

Reference is now made to FIG. 8 which illustrates the elements of edit handler 3102. Edit handler 3102 may further comprise a dynamic layout (DL) handler 31021, a layout handler 31022, a text scaler 31023, a visibility handler 31024, a component handler 31025, an animator 31027, a component docker 31028, a grid handler 31029, add panel handler 31030, a component grouper 31031 and an image handler 31032. The functionality of these elements is described in more detail herein below.

As discussed herein above, edit receiver 3101 may receive an incoming event which may be an edit, change or trigger to the current site, page or a component. Edit handler 3102 may determine what changes need to be made as a result of the incoming event. It will be appreciated that the sub elements of edit handler 3102 may use rule engine 340 and ML/AI engine 350 to improve their functionality as described in more detail herein below.

As discussed herein above, system 200 may also integrate its responsive design capability with dynamic layout changes occurring due to triggers as described in U.S. Pat. No. 10,185,703.

Module 300 may implement dynamic layout processing during editing (e.g. reflecting the editing changes made by the user) as well as during run-time. System 200 may use different mechanisms in either case, as the requirements may be different between the cases. A third use scenario may be a preview or simulation mode, a run-time view of the web page functional inside the editing environment, which may still behave differently from the regular run-time view.

It will be appreciated that dynamic layout involves the moving and resizing of components on the screen based on dynamic layout triggers. These dynamic layout triggers may include content changes, content formatting changes, components switching between multiple configurations, multiple target platforms use (display of the application using different technologies on different viewing platforms) and multiple screen or display viewport sizes (display of the application using a number of displays that have different sizes and resolutions, including due to screen rotation and windows resizing). Other dynamic layout triggers may include dynamic data (use of components containing dynamic data which changes over time), end-user initiated changes, application initiated layout changes, component moving and resizing in the editor and concurrent editing of the page (e.g. by another user in a system providing shared editing or immediate update of the edited page by users).

It will be also appreciated that components may change their size/position at run-time due to various factors such as:

A content change by the user in components that allows run-time editing, such as a blog component (allowing posting/editing of user posts of comments).

A content change reflecting content imported from external sources. This could be (for example) single field content, or a field displaying a repeater showing multiple records from an external database.

A content change reflecting concurrent editing of the content by another user in systems which allow concurrent editing and viewing of the same page, or concurrent editing by multiple users of the same page.

A content or size change due to site initiated/programmed effects (e.g. due to code associated with site events affecting component content, formatting, attributes or layout).

Requests made by other components or third party applications (or other embedded components).

Changes in the page size due to environmental size change, e.g. deploying to a platform of different size, window/viewport resize, form factor changes (portrait/landscape display) or screen size change.

Other changes affecting components such as change due to gallery scrolling, mouse passage which affects a component (e.g. causes a zoom-in), etc.

It will be appreciated that pages and layouts are not always static. In particular, components may switch between multiple states and may further be animated. State changes and animations can include changes to a component's position, size, layout, rotation, style, shape, transformations etc. Module 300 may support multiple triggers for such state changes and animation, including cursor movement, scrolling, interaction with other elements, programmatic, database based, etc.

The layout of the element being edited may take these changes and animation into account, either as a driving dynamic layout operation or in terms of planning the appropriate space for them in the various page configuration. Also, the state definitions and animation of a given component may also be changed in individual breakpoint ranges.

It will be appreciated that all references above to content change may include formatting changes to the content as well.

Furthermore, components that move or change their size due to dynamic layout may affect other components, e.g. "push" them down or expand them in the case of a component affecting its container. Such an effect can be based on implicit (automatically created) anchors or explicit anchors as described in U.S. Pat. No. 10,185,703.

It will be appreciated that anchors (as described in U.S. Pat. No. 10,185,703) may have multiple attributes such as docking/locking type (edge, corner, center), explicit/implicit nature, minimal or maximal size, unidirectional/bidirectional, one- or two-way anchors, gate/breaking conditions, move or resize effects etc.

It will be further appreciated that responsive design and dynamic layout are both applicable during editing as well as during run-time (as described herein above).

In a typical embodiment, dynamic layout deals with components pushing or resizing other components due to editing and content changes (typically down). Responsive design typically deals with layout changes due to width changes (including multiple configurations for different breakpoint ranges).

DL handler 31021 may enable responsive editing and dynamic layout to interact and operate in harmony preventing any conflicts. For example, as the layout width changes, components may become wider or narrower based on the anchoring to containing components. When a text component narrows, the container text is reformatted and may cause the text component to grow downwards. The component, in turn, may push a component below it down or cause a containing container to grow downwards. This may be based on an explicit or implicit anchor as described in U.S. Pat. No. 10,185,703, or on the use of editing elements such as a stack element or a grid as described in more detail herein below.

Figure 7A:
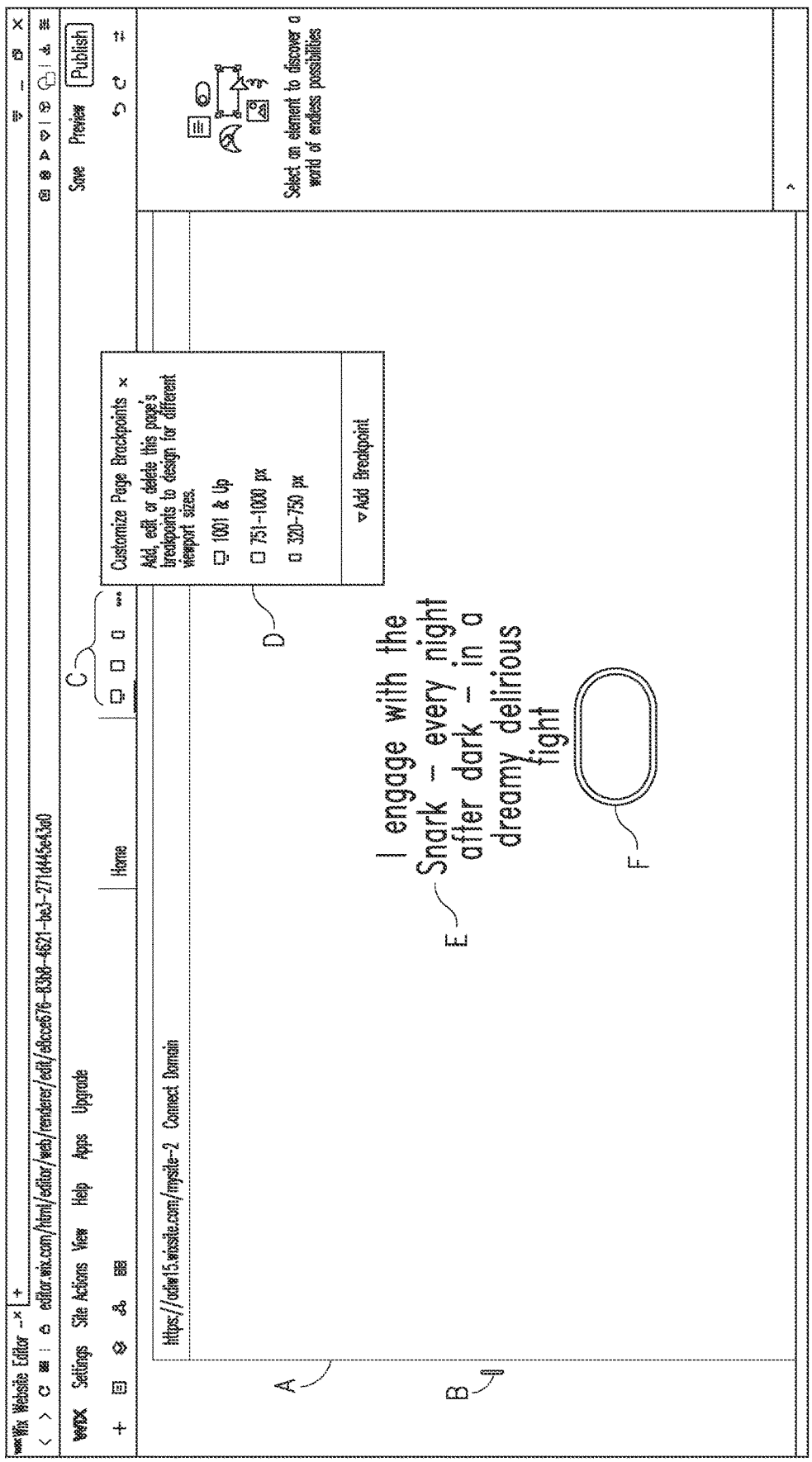
FIGS. 7A-7G are schematic illustrations of site width changes on a site layout; constructed and operative in accordance with an embodiment of the present invention.

Reference is now made back to FIGS. 7A-G which illustrate the effects of width change on a site layout. FIG. 7A demonstrates several UI elements including a resizable editing stage [A], a width resizing handle [B], a visual indication of the possible breakpoint ranges [C] (including an underline under the currently selected size (the desktop mini-icon)), a customization dialog [D] showing a list of current breakpoint ranges with the interface allowing the user to edit the breakpoint (and thus the ranges).

The editing stage further contains a text paragraph component [E] and a container component [F] (rectangular with rounded corners). It will be appreciated that some of these marked elements appear in additional figures in FIGS. 7B to 7G, and the same labelling is relevant.

It will be appreciated that the discussion below and FIGS. 7A to 7G focus on examples with a given set of components and containers, and with the responsive design, fluidity and dynamic layout capabilities of system 200 as described in conjunction with this limited set. However, system 200 may also implement responsive design, fluidity and dynamic layout capabilities for an arbitrary hierarchy of components and containers and apply the responsive design, fluidity and dynamic layout throughout the containment hierarchy. Thus, for example, system 200 may apply layout changes both at the top level (e.g. when the entire page display viewport changes) as well as inside internal containers (e.g. changing the layout of sub-elements depending on the width of a specific container).

Figure 7B:
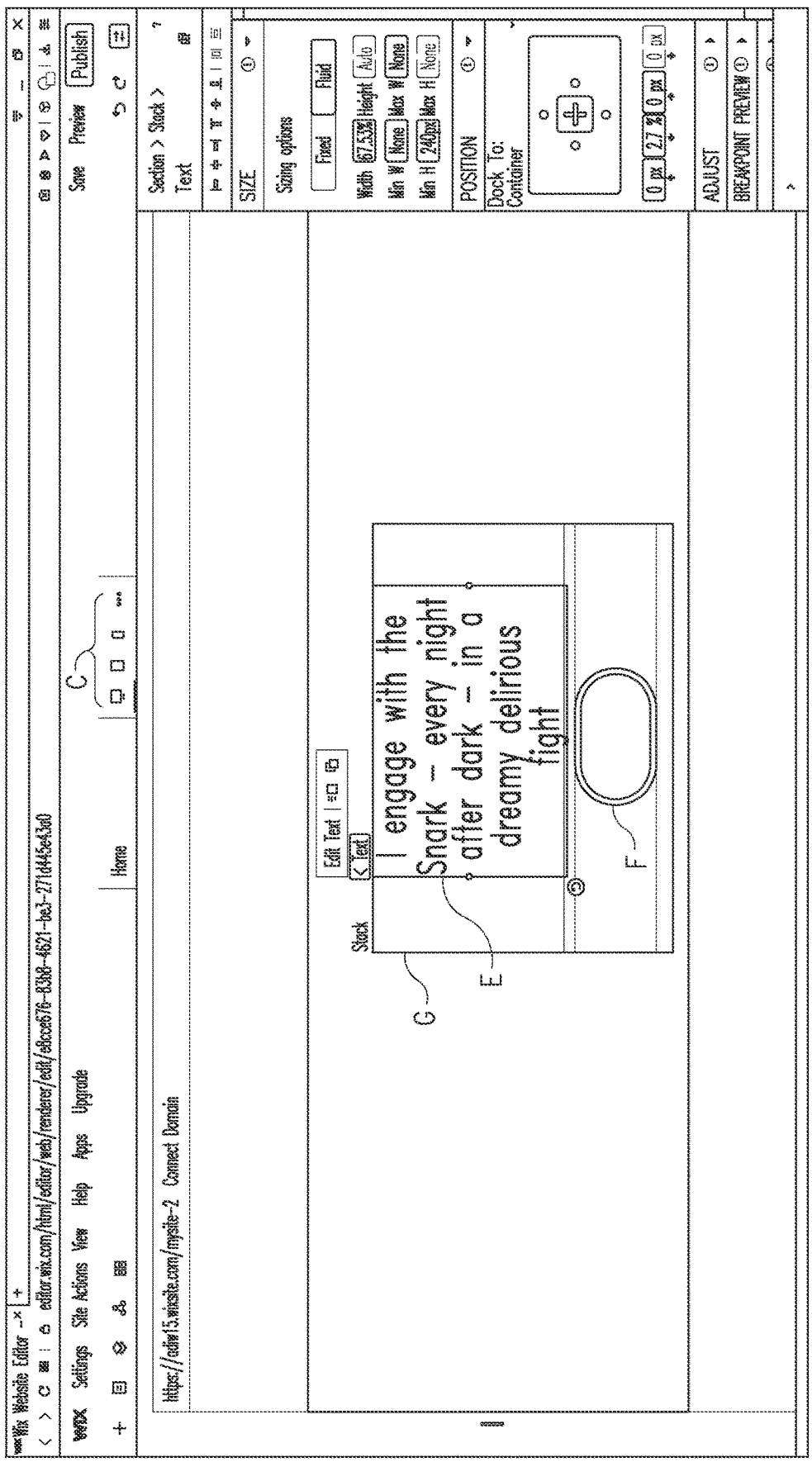

As can be seen in [D] (FIG. 7A), the default settings are for the following ranges: 320-750 pixels for a smartphone screen, 750-1000 pixels for a tablet screen and 1000 pixels and higher for a desktop screen. FIG. 7B illustrates the use of a stack (as discussed in more detail herein below) to provide proper handling across breakpoint ranges. This is a mechanism that may be employed by users of system 200 to create an anchor between the two components ([E] and [F]) to link them together in order to affect them together. It will be appreciated that stack container [G] may include [E] and [F] and may also define spacing around them (e.g. around [F] in this scenario).

DL handler 31021 may also implement other types of dynamic layout anchors (as described in U.S. Pat. No. 10,185,703), including explicit/implicit anchors and anchors to the containing container as well as between objects in the same container hierarchy level. Another embodiment of system 200 may further implement cross-container anchors, e.g. anchors between components in different containers which allow maintaining a similar order of elements between the two containers.

Figure 7C:
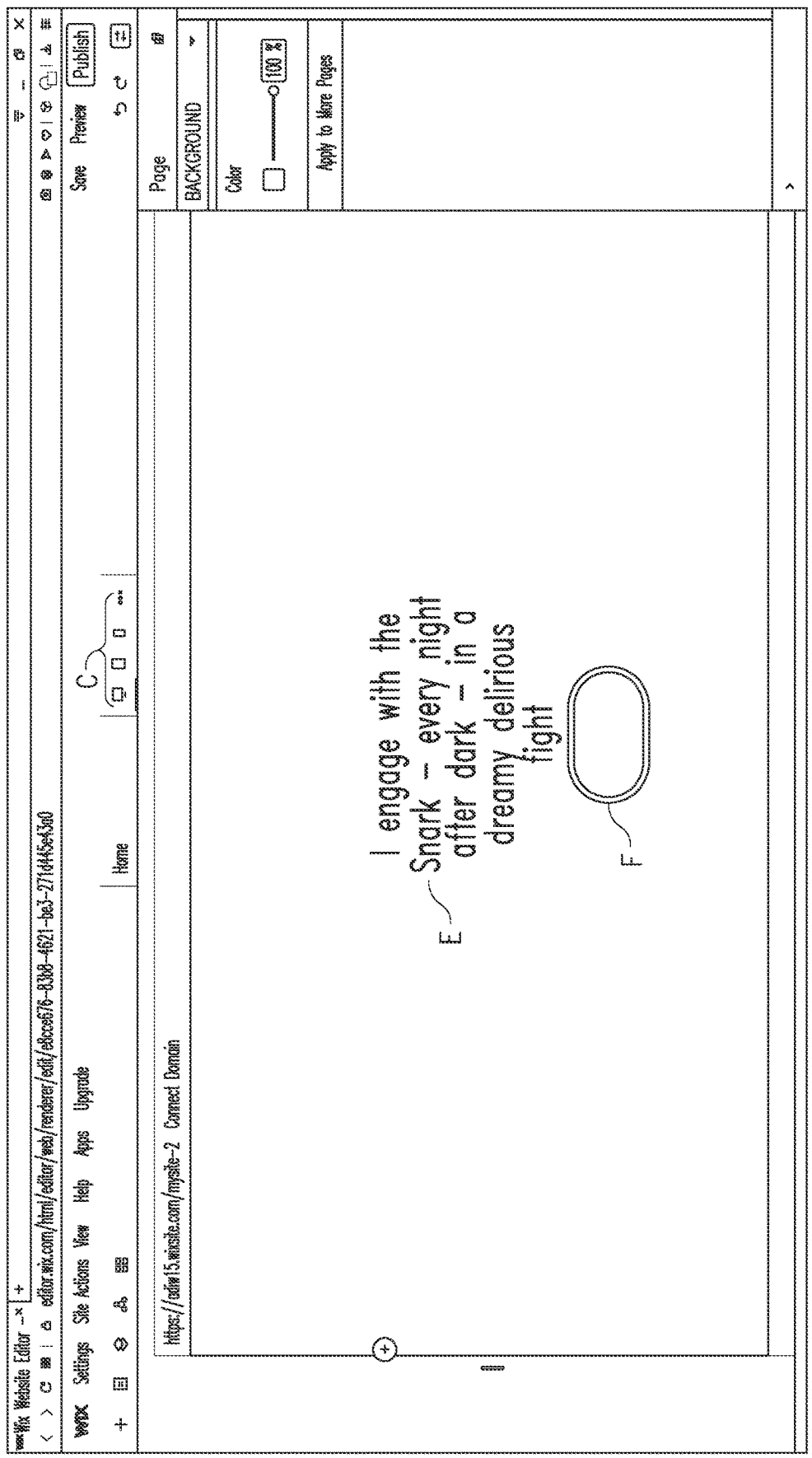
Figure 7D:
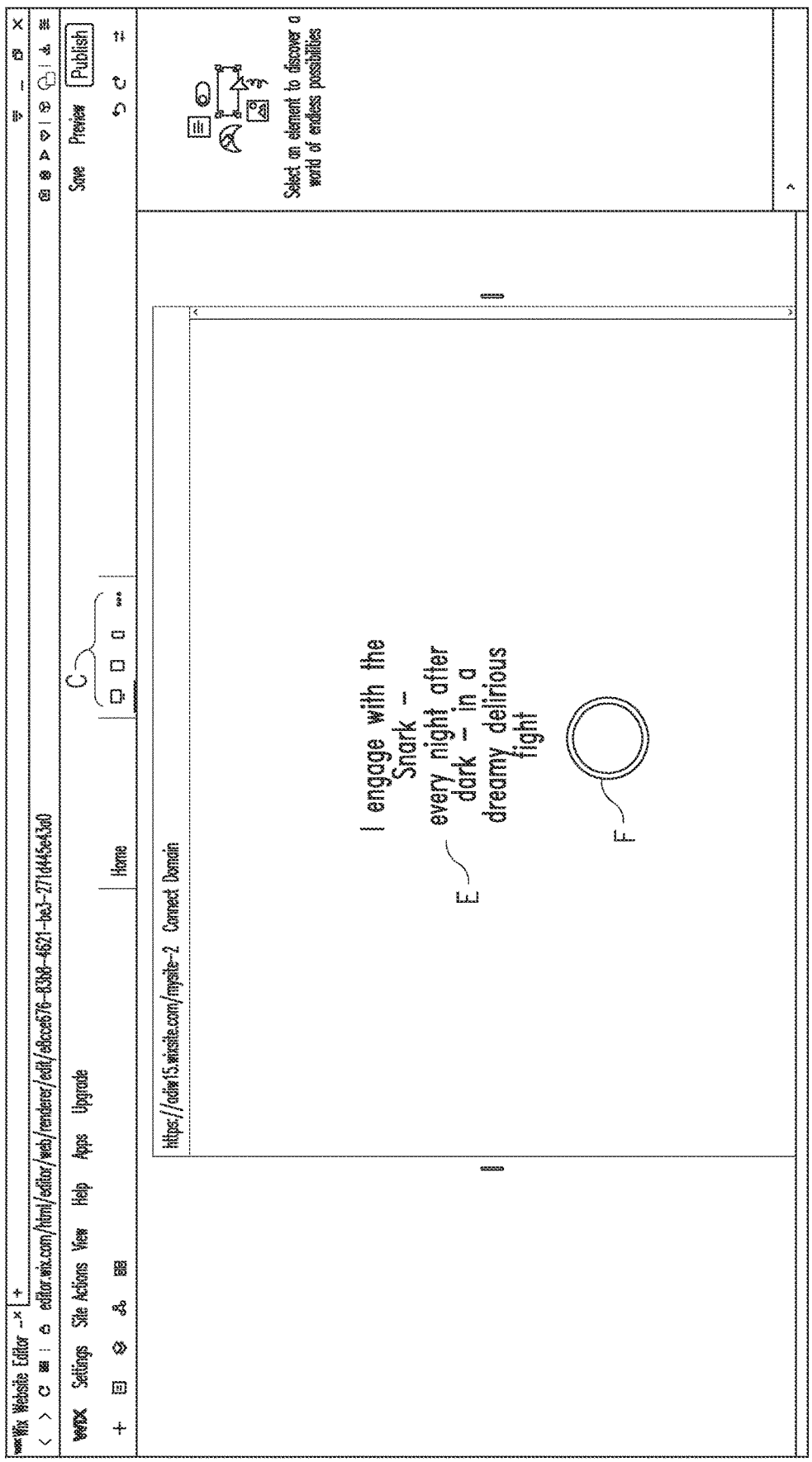
Figure 7E:
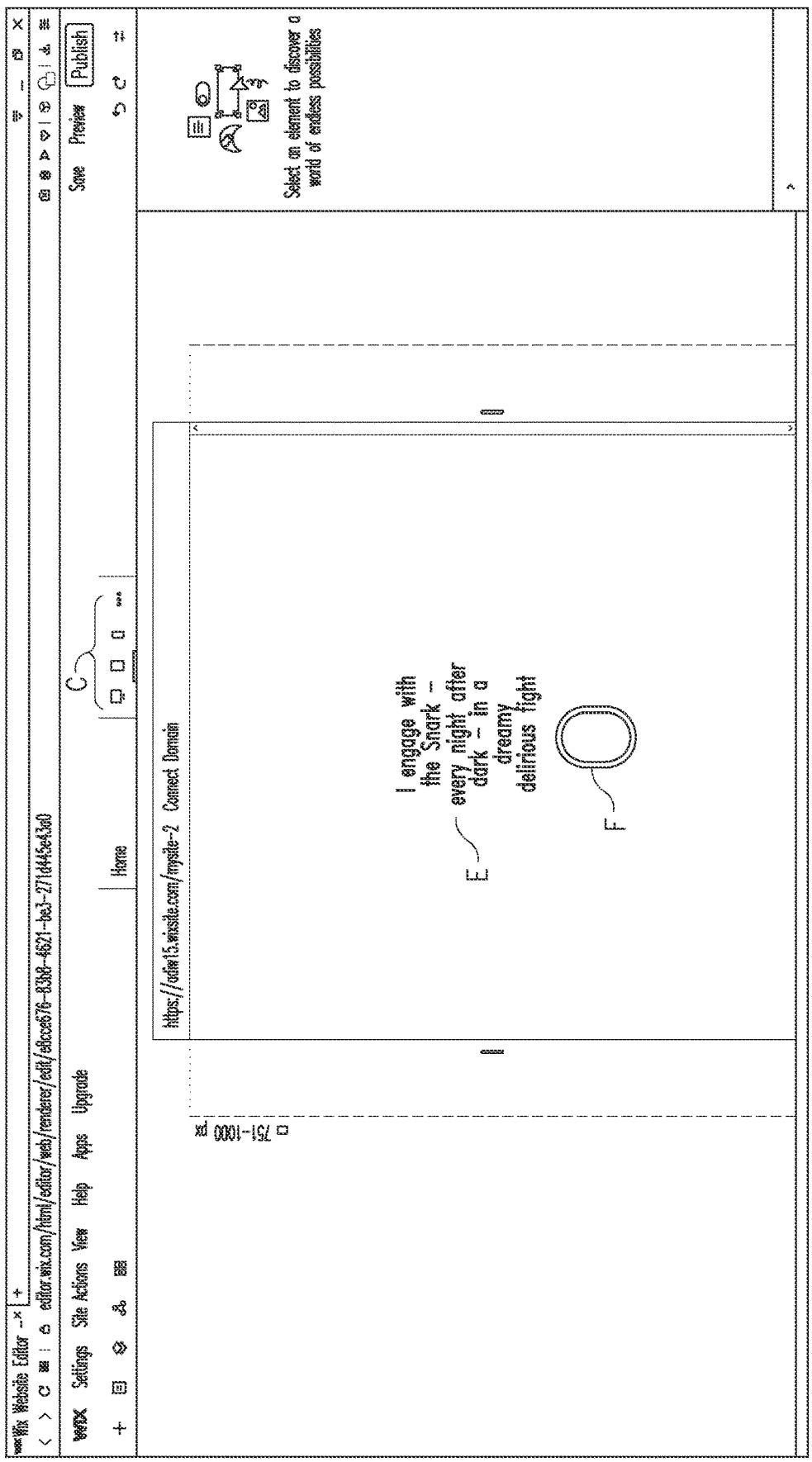

Reference is now made to FIGS. 7C to 7E which illustrate the effects of width changes on the site. They show the display during WYSIWYG editing with changes performed using the previously detailed width change handle [B]. Responsive editor 310 may provide multiple methods for width change during editing, allowing the designer to view the layout under different widths. For example, responsive editor 310 may allow discrete per-breakpoint width values to be selected (using the desktop/tablet/mobile menu [C] of FIG. 7A as modified for the current breakpoint set set). Responsive editor 310 may also allow continuous change using the width change handle [B].

Responsive editor 310 may also allow the user to specify one or more width animations associated with a given command (visual buttons, keyboard shortcuts, mouse event or other system inputs). Such width animations allow the user to view the site under a specific set or range of widths without manually going over the multiple widths repeatedly.

Reference is now made to FIG. 7C which shows the page at an approximately 1600 pixels width.

Reference is now made to FIG. 7D which shows the page at approximately 1100 pixels width. It will be appreciated that at this width the text font size of text [E] has been reduced and has been reflowed (i.e. words moved to the following lines). Container [F] has been "squeezed" (so it now almost circular compared to FIG. 7C).

FIG. 7E shows the page at approximately 800 pixels width. It should be noted that the breakpoint indicator [C] now shows that the page is in the "tablet" mode.

As discussed herein above. previewer 3105 may allow the user to preview specific components (including containers and component sets) in various breakpoint ranges. As illustrated in FIG. 7G, previewer 3105 may display a preview [A] of the currently selected text component [B] and its immediate container [C] at all breakpoints. The preview may also include multiple states, including dynamic states (e.g. when the mouse hovers over a component).

Figure 7F:
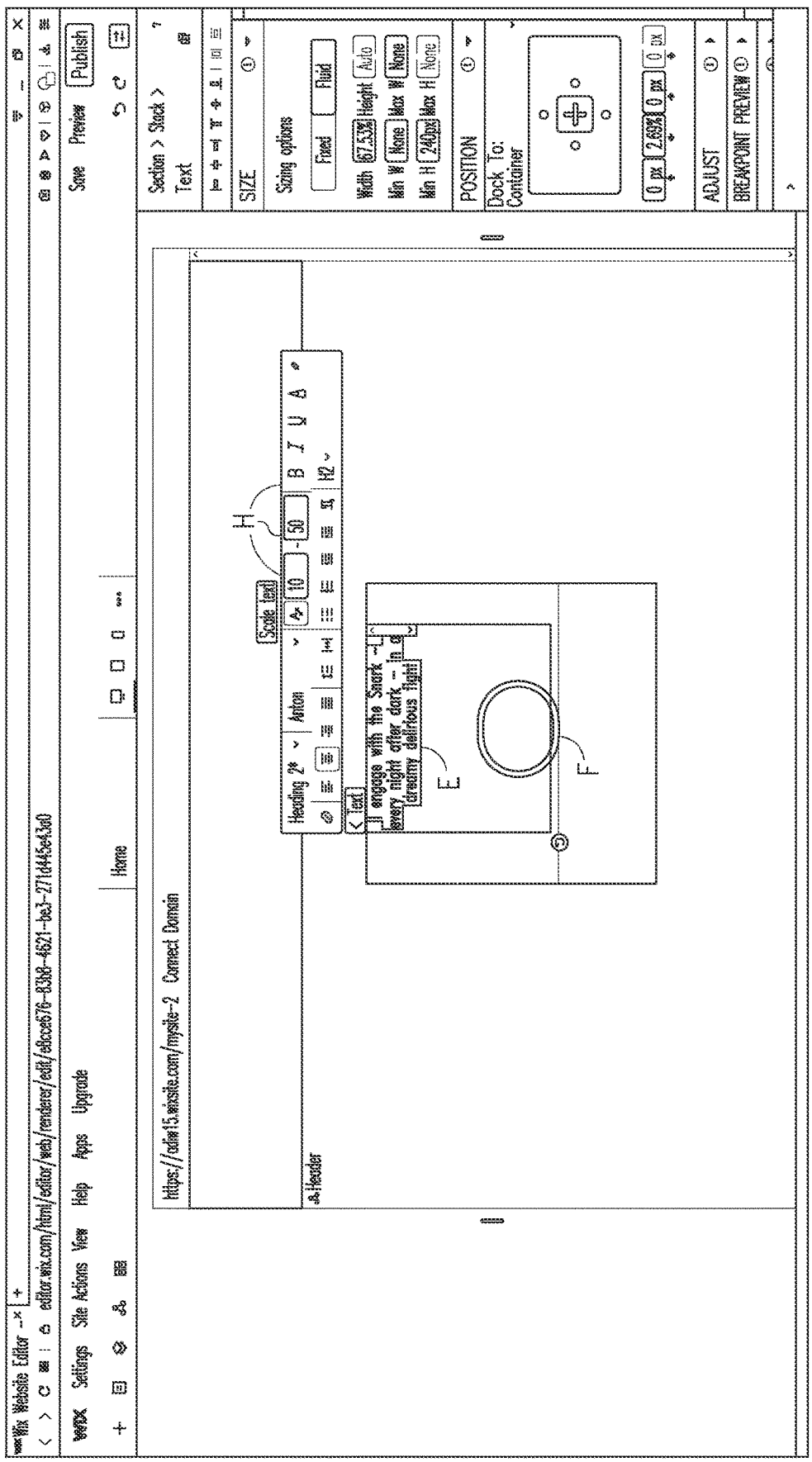
Figure 7G:
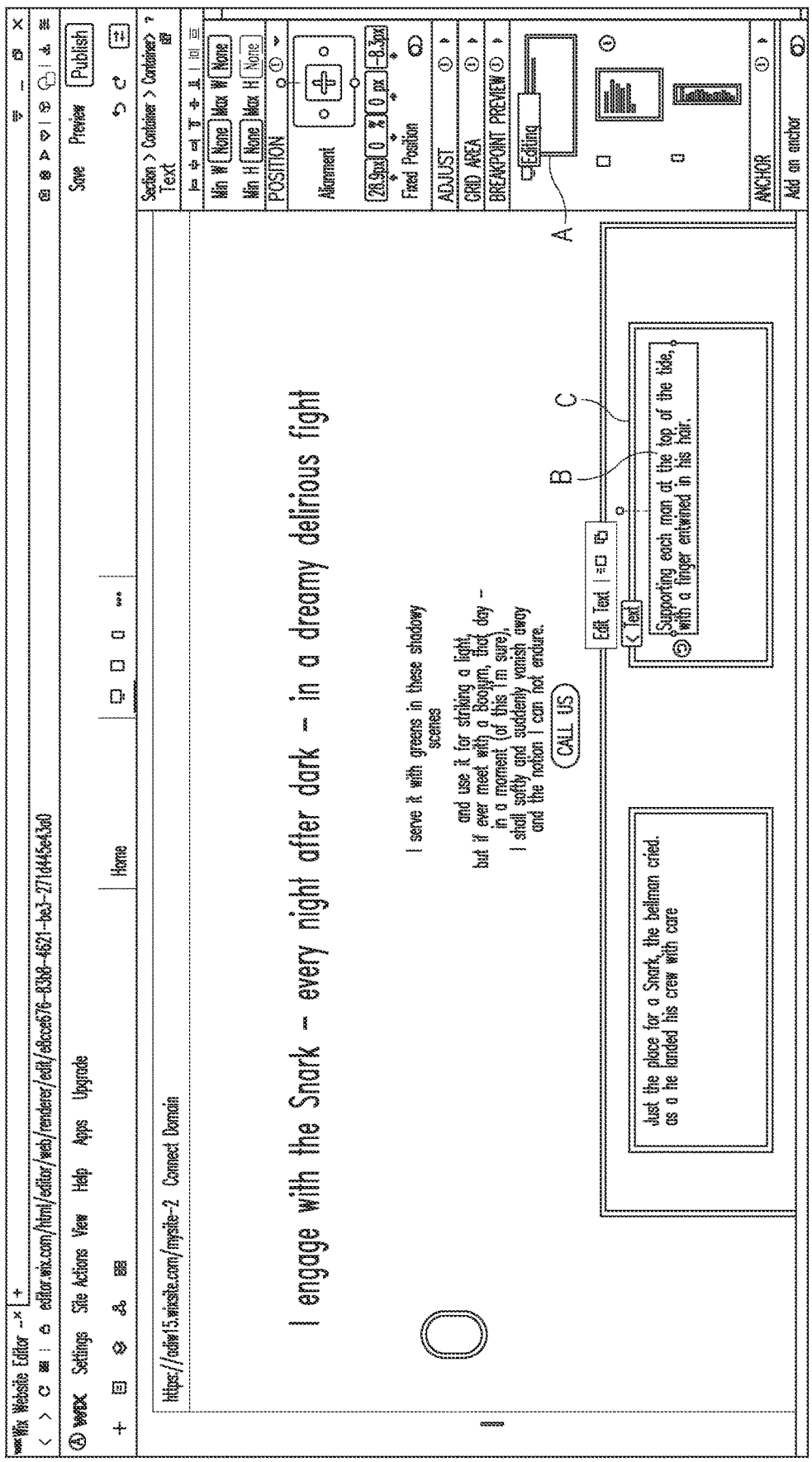

Reference is now made to FIG. 7F which shows the mechanism through which a text element can be defined to have a range of point sizes, rather than a single point size (as defined by [H] the "scale text" button and the two text point size boxes). In this scenario, text scaler 31023 may scale the text point size between the minimal and maximal value based on the viewport or the text field width.

Text scaler 31023 may use continuous linear scaling (e.g. using fine-grained linear interpolation of the font size in the given range based on the width value and its width range). Such fine-grained interpolation may change the point size by any minimal unit, such as a tenth of a point. Text scaler 31023 may also use a non-continuous linear scaling (i.e. limiting font size changes to given "steps" or limiting font sizes to a given set of values).

CSS generator 320 may implement such dynamic font scaling directly with the generated CSS, using a CSS definition such as:

$$\text{calc}([\text{min font size}]+([\text{max font size}]-[\text{min font size}])*((100vw-[\text{min viewport width}])/([\text{max viewport width}]-[\text{min viewport width}])))$$

Text scaler 31023 may also implement smart scaling which combines text resizing and re-flowing to strike an optimal balance between the two, rather than using linear scaling at all times. This typically involves analyzing the changes resulting from a component width change and creating small variations from the linear interpolation so to achieve the best visual result.

Figure 9A:
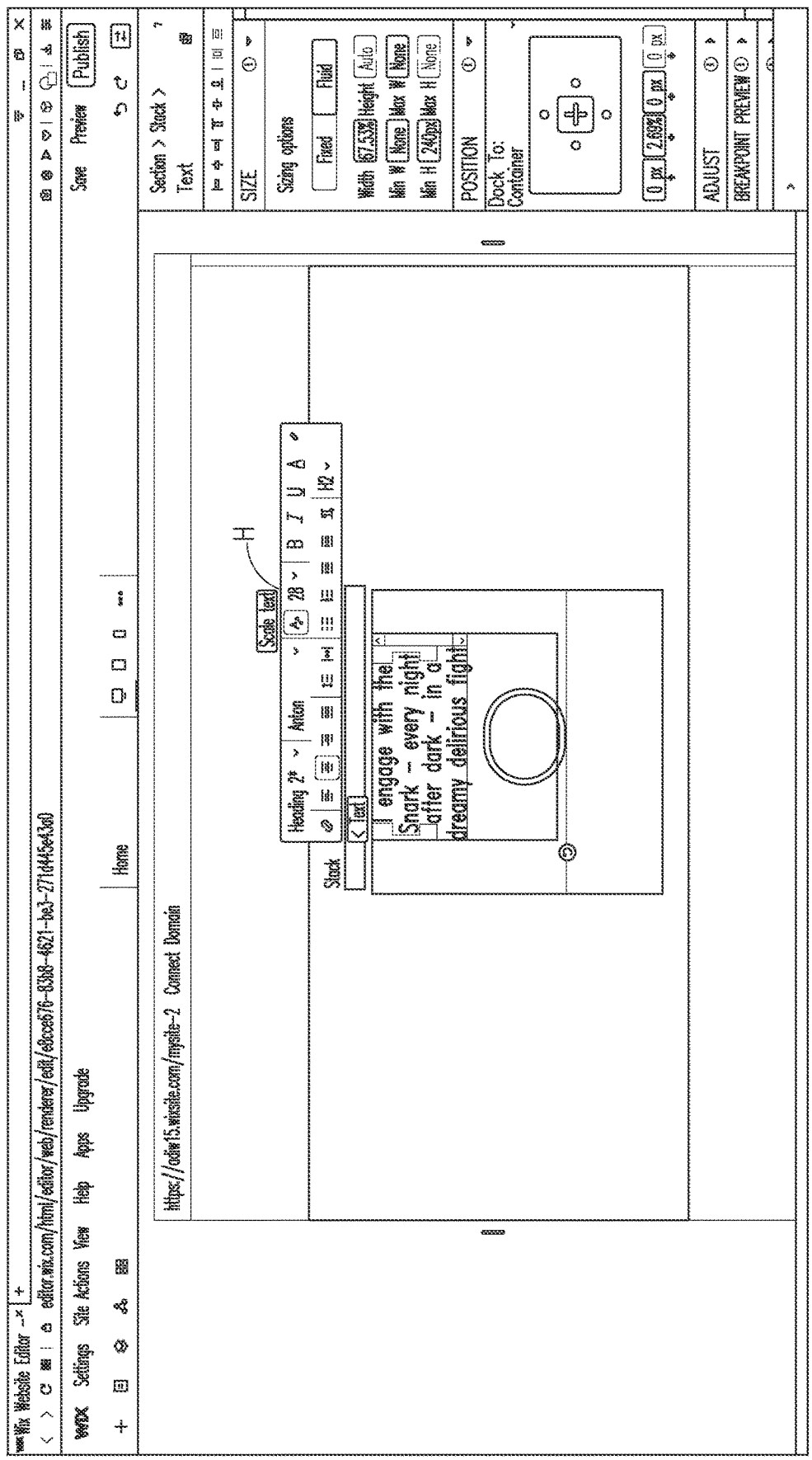
FIGS. 9A-9E are schematic illustrations of site width changes when the text is not scalable.

Reference is now made to FIGS. 9A to 9E which show a similar configuration in which the text is not scalable and thus requires (relatively) more space in the narrower configurations. FIG. 9A shows that a single point size is selected (28 points in this case as shown in the text scale/point selection UI [H]).

Figure 9B:
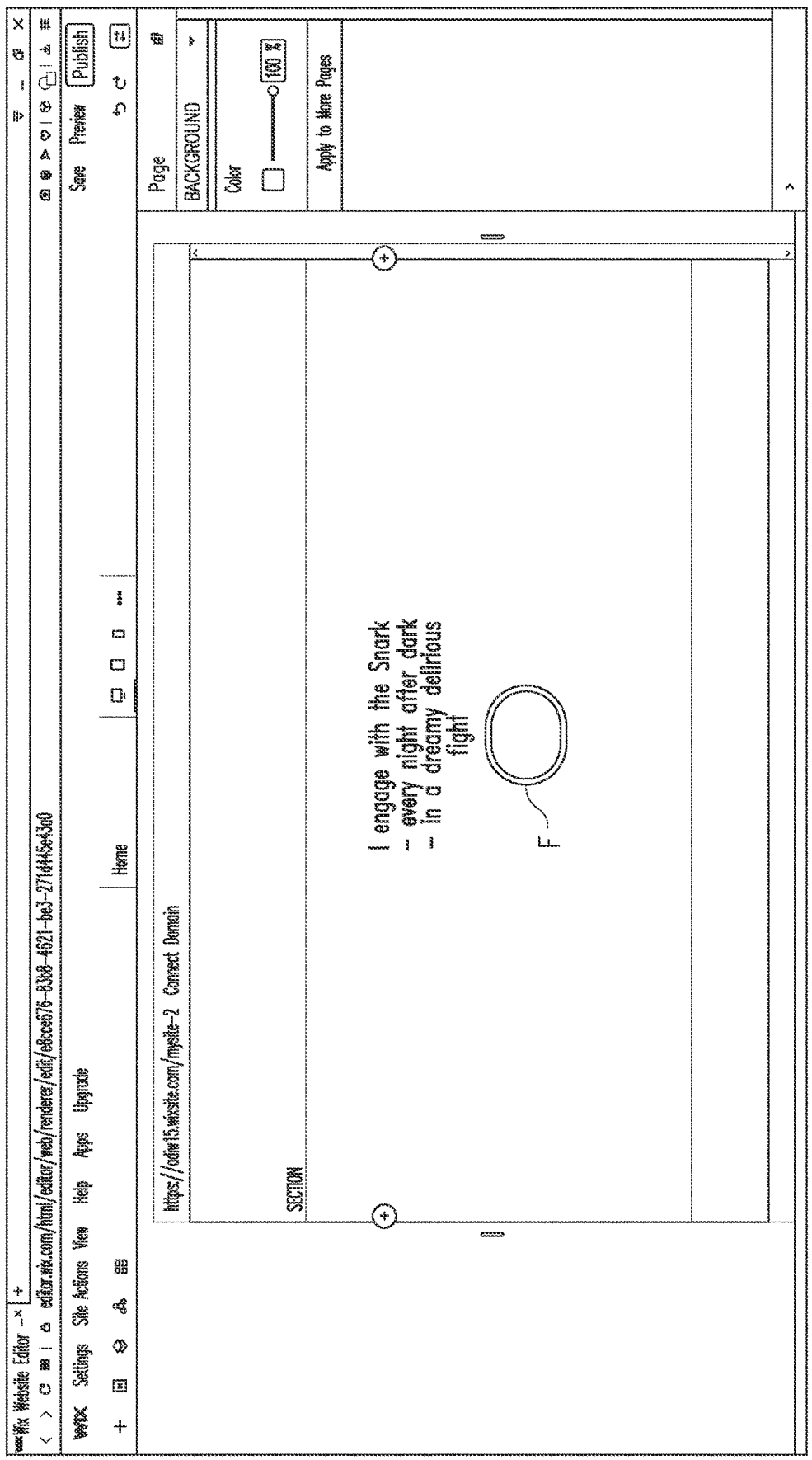
Figure 9C:
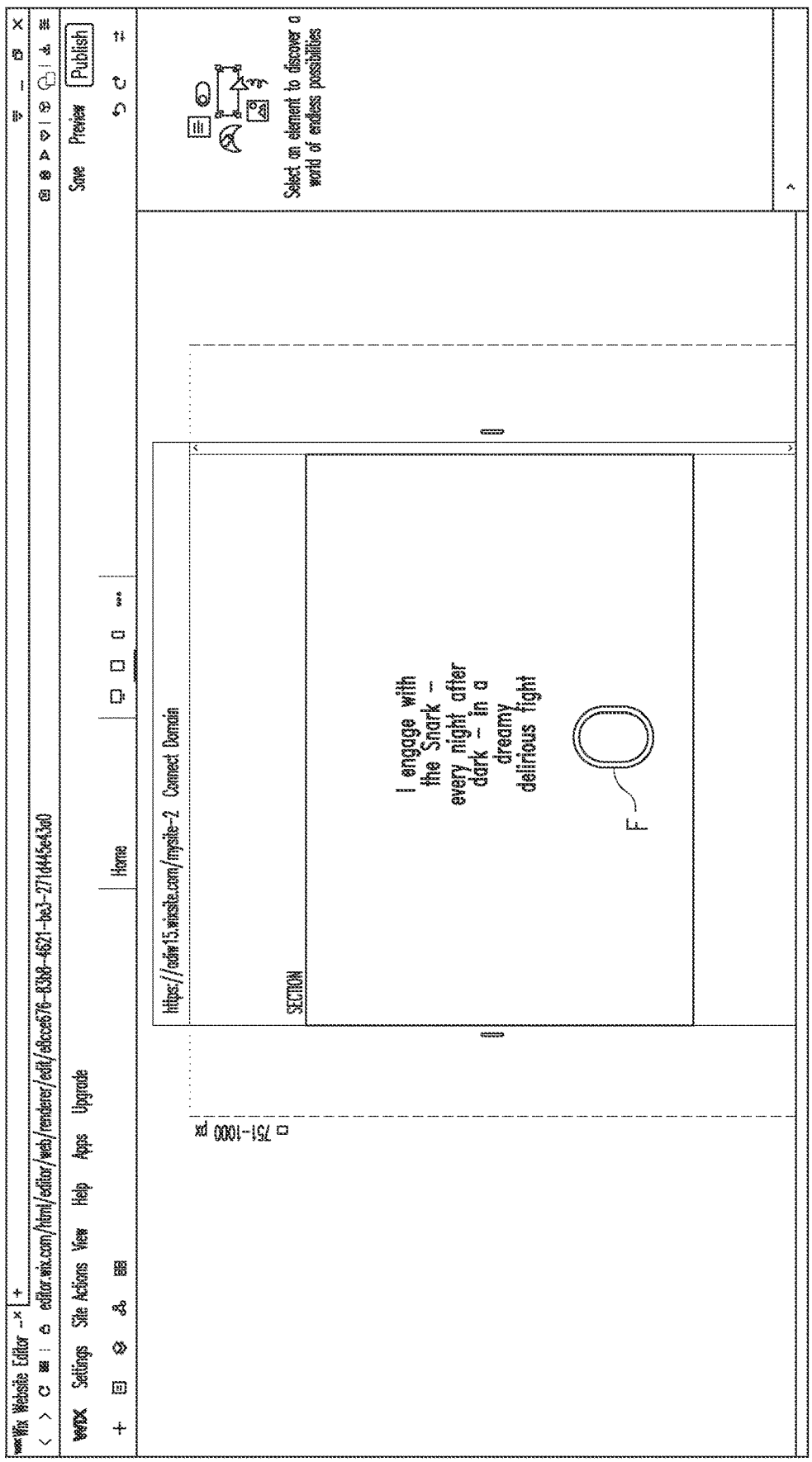

As can be seen from FIG. 9B (~4260 pixels width), 9C (~750 pixels width) and 9D (~360 pixels), when the screen (and thus the layout) becomes narrower, the text is re-flowed and thus become taller. The text then pushes the container [F] down.

As discussed herein above, edit handler 3102 may define changes to the layouts (and the page in general) based on changes in display width (or other affecting variables). As discussed herein above, the sub elements of edit handler 3102 may use rule based functionality in conjunction with rule engine 340. Such rules may include directions for functionality such as auto docking, site conversion, dragging and resizing elements, managing grids (addition, deletion etc. of rows and columns) and changing the display of layouters and repeaters as discussed in more detail herein below.

Figure 9D:
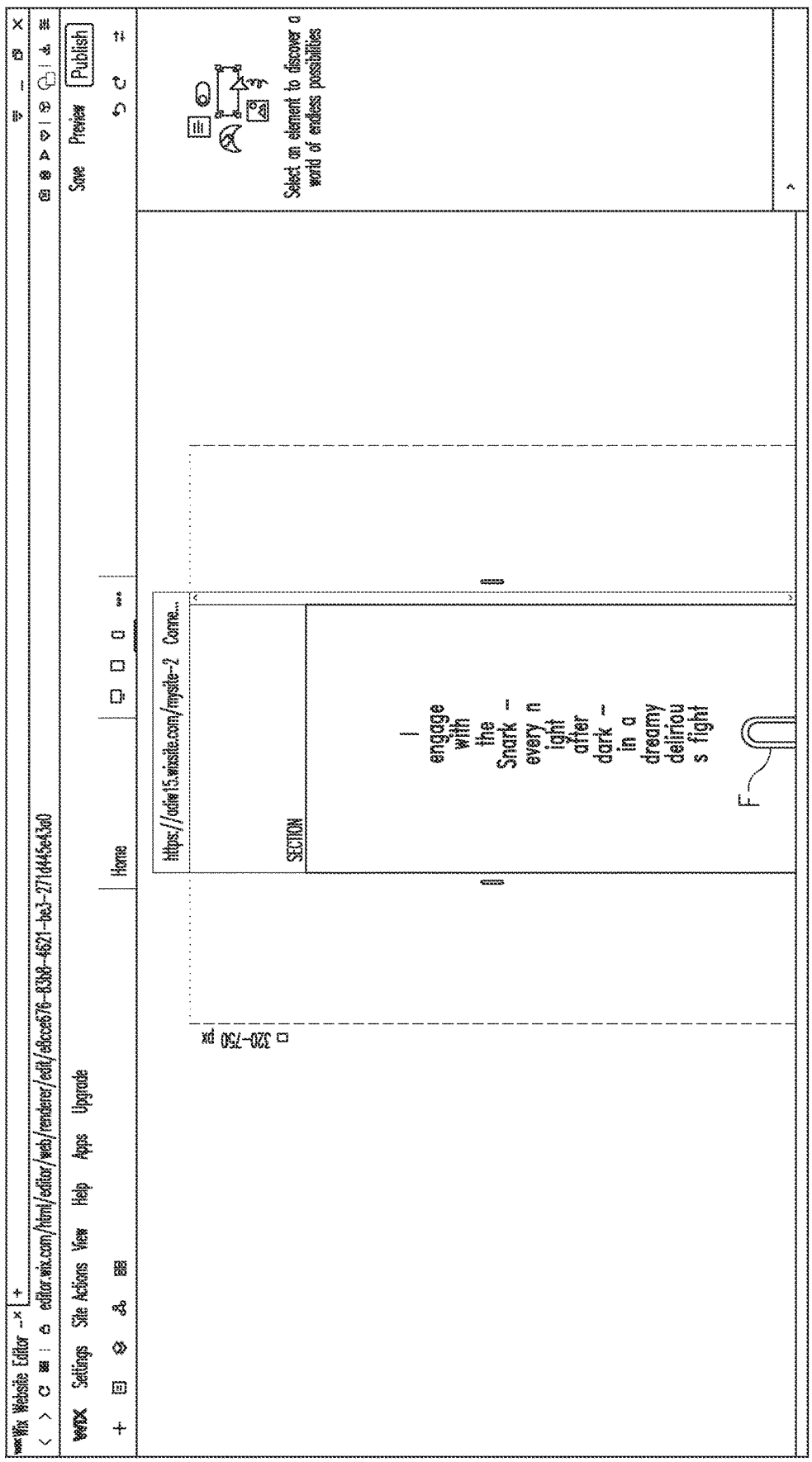
Figure 9E:
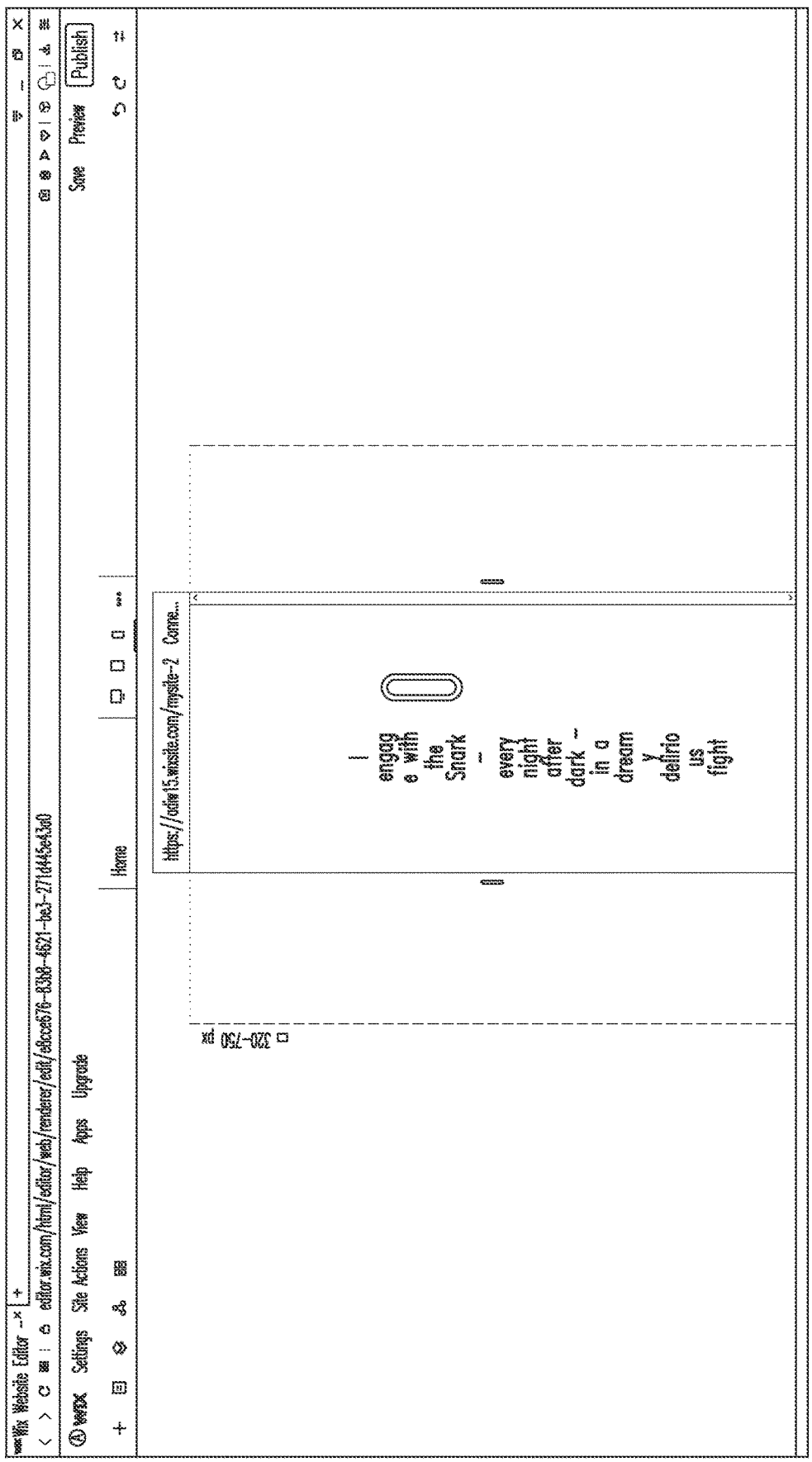

Thus, for example, in FIG. 9E (to which reference is now made) the rounded container and the text are arranged side by side in the breakpoint range shown, rather than one over the other as in FIG. 9D.

Edit handler 3102 may allow such (and other) changes to occur when passing a breakpoint. These are the non-continuous changes, as the changes within each breakpoint range should be continuous. As further discussed herein below, a component's position and size may be defined using a variety of units, including absolute pixel size, relative to enclosing container (e.g. "size is 50% of enclosing container size"), by fraction (the CSS "2fr" unit) etc.

In a typical embodiment, the user could change the main parameters of the layout, i.e. component location and size (as is illustrated in FIGS. 9B-9E) between breakpoints. Each page may thus have multiple contained component layouts, one per breakpoint range. It will be appreciated that although each page may have multiple layouts (including layouts inside container components), specific (single) components may also have multiple configurations.

It will be appreciated that layout handler 31022 may understand layouts based on a mapping between a decomposition of the site (such as the grouping described herein above) and a taxonomy of elements. The taxonomy provides its own hierarchy of site elements concepts, which can include "WBS world" concepts (e.g. a picture+caption block) as well as "real world" concepts (e.g. "Our products" page block or section). Such taxonomies are described in more detail in U.S. Pat. No. 10,073,923.

The identification may be based on natural language processing (for text included in components), information on previous labeled sites, computer vision and user feedback.

As long as the display width is within the same breakpoint range, layout handler 31022 may calculate the layout (position and size) according to a formula (which may still provide different results depending on the width parameter). The formula may be based on layout variations explicitly defined by the user or defined by ML/AI engine 350 which may automatically generate alternate designs as described in more detail herein below.

When a breakpoint is crossed, layout handler 31022 may switch to a new layout, possibly causing non-continuous site changes (i.e. a button jumps from one place to another).

It will be appreciated that such changes may be made at a container level, e.g. a container may move between different breakpoint ranges, while the components inside it retain their position and size for the different breakpoint ranges (relative to the container). In contrast, a container may also resize itself between different breakpoint ranges, and the contained components inside that container may be affected (moving, resizing or otherwise changing as appropriate).

Layout handler 31022 may also provide a pre-defined arrangements of containers that have a different layout for different breakpoint ranges (e.g. side-by-side in the desktop version and one-above-the other in the mobile version).

Edit handler 3102 may also allow additional component attributes and settings to be changed on breakpoint crossings, such as component z-order, visibility (hide/unhide) and other attributes as discussed in more detail herein below.

Visibility handler 31024 may manage the hiding and unhiding of components for a specific breakpoint range. This may allow, for example, using one method of site navigation for a desktop configuration (e.g. a side menu) and another method for a mobile version (e.g. such as the "hamburger" menu).

The user may also define different layouts for different breakpoint ranges in order to "close the gap" for components disappearing in a given breakpoint range or to "make space" for components appearing in a given range. Thus, user editing may be assisted by the make/close space functionality described herein below in the context of component editing (which provides automatic re-arrangement of components once a component is inserted or deleted).

Visibility handler 31024 may provide the ability to do this automatically and dynamically using the dynamic layout capability. This may be more applicable, for example, in the case of components having a variable size (e.g. due to different amounts of content determine during run-time). In this case, visibility handler 31024 may, for example, regard a hidden component as being resized to zero (e.g. a zero-size point or a zero-width line) and apply dynamic layout processing to other components based on the anchors to the hidden component (in its new "shape").

Component handler 31025 may provide the ability to link multiple components so that they share state or setting information. For example, if the user designs a responsive page for use on a tablet in both landscape (wide) and portrait (narrow) mode and the landscape mode layout uses a side menu whereas the portrait mode layout uses a hamburger menu, component handler 31025 may allow the user to link the two components so they share specific state information, such as novice/expert menu complexity setting, last option selected (if highlighted) etc.

Alternatively, system 200 may provide similar capability through a menu component offering multiple variants as described in more detail herein below.

It will be appreciated that component handler 31025 may change component attributes (including style information) based on the responsive affecting parameters.

For example, component handler 31025 may apply a different color to components in different breakpoint ranges. This may be needed as, for example, if a component is re-located from a given breakpoint range into or near an area having a different background color, and a component color change is required.

Similar to the capability described for fonts above, system 200 may also provide range definitions for some or all of the component attributes. Such range definitions may include min/max values as well as an associated interpolation formula (e.g. component handler 31025 may provide multiple such formulas, such as multiple color gradient methods and the user may select which one to use).

It will be appreciated that the per-breakpoint range changes may include changes related to other attributes, such as the component's rotation and animation specifications.

It will be further appreciated that a component remains a single component and the various per-breakpoint ranges changes are essentially modifiers to an inherited version of the component for each breakpoint range. Thus, for example, if a component is deleted when editing a given breakpoint range (rather than just being hidden for this breakpoint range), it would be deleted for all breakpoint ranges (possibly triggering a change to dynamic layout definitions or a "close space" action as described herein). Similarly, if the actual content of the component is modified (e.g. the text is edited), the modified content would be used for all breakpoint ranges.

Even though the component may be moved for a specific breakpoint range, a typical embodiment of module 300 may require that the component remains under the same parent container (which may also be a cell of a stack, a layouter or a repeater). Component handler 31025 may prevent the moving of components from one container to another (known as "re-parenting") in a specific breakpoint range. Note that this does not apply to grid "cells", as the grid lines provide anchoring support but do not form a set of per-cell containers.

In an alternative embodiment, component handler 31025 may allow the user to waive this limitation and re-parent components between breakpoint ranges. However, this may have substantial costs (as it would be more difficult to represent such structure and behavior in HTML and CSS). Component handler 31025 may implement this structure (for example) using multiple instances of the same component which are linked to each other (as described herein above) and are hidden or visible depending on the breakpoint range in use.

It will be appreciated that some components may have multiple versions, variants or configurations which are good for different sizes, resolutions or aspect ratios such as images that may have multiple pre-rendered resolutions.

Galleries may also have multiple versions that may have different types (slider, matrix, horizontal flip gallery, vertical flip gallery etc.) or different parameters (# of columns etc.) which depend on the allocated size and aspect ratio (for the gallery component). For example, a repeater component may change between a matrix gallery in a large-screen desktop configuration to a slider in a mobile configuration.

A contact form which (when resized to below a certain limit) may render as a button that opens a modal dialog, or has alternatively becomes divided into an initial section and an expanded section (which only opens when the end-user presses a button).

A video player may also have multiple versions and may render a different set of control buttons depending on the available space (e.g. just play/stop, adding skip to start/pause, adding fast forward/fast backward buttons etc.).

It will be appreciated that the component definition may be discrete (i.e. select one of the three available configurations) or be based one or more parameters (which can be discrete or continuous). For example, a matrix gallery repeater component can have a different number of columns for the different breakpoints.

Responsive editor 310 may support a manual selection of which component configuration to use in each breakpoint range. Alternatively, the component definition may provide hints to component handler 31025 as to which configuration to select under different conditions. Thus, the component may provide its own breakpoints and rules, e.g. use version A when 100-300 pixels of width are available, and version B if more than 300 pixels are available.

It will be appreciated that a typical page structure for use with responsive editor 310 may consist of page sections, as well as a header and footer areas. The page may contain multiple sections, and each section may contain components and containers, including supporting container types such as layouters, repeaters, and stacks. In a typical embodiment, the sections are placed vertically one above the other and are coast-to-coast sections, i.e. occupy an entire horizontal strip of the page. Such sections may typically change their width depending on the display viewport width. Responsive editor 310 may support additional layout elements, such as component rotation, animation etc.

It will be appreciated each of the main supporting tools (such as layouter, stack, repeater or grid) may provide multiple sub-elements including a visual representation sub-element displayed on the editing stage; a editing support sub-element which helps the user use the tool (e.g. place elements in a layouter); and an implementation sub-element which performs the actual layout calculation (jointly with the other layout elements) to help generate the underlying CSS to implement the right behavior at run time. This last sub-element supports the CSS generator 320 in its work.

Responsive editor 310 may also support the use of shared parts, components that can appear in some or all of the pages. Shared parts display the same content which may still be parameterized per page (e.g. the page number in a page header), in all the pages in which it appears. In some embodiments, shared parts are also known as master parts or master blocks. The header and footer described herein above are examples of such shared parts (as shared part containers that can contain other components).

It will be appreciated that components may be moved into and out of the shared parts (from a regular page area). The content of the shared parts may be shared in a number of ways, such as multi-viewing, i.e. the actual same component is simply visible in multiple pages. Changes in the view on any page will affect all other pages.

The content may also be shared through inheritance, i.e. pages inherit from the master copy. If the master copy is changed, these changes propagate to all pages. If a specific page copy is modified, this is handled through a local modifier and the change applies to this page only.

Content may also be shared by copying to each page so that each page copy is separate and not connected to a main copy or the other pages.

Responsive editor 310 may require sections to be contiguous, or allow spacing to be defined between sections. Section height can be determined in a number of ways, e.g.: it can be fixed/predefined, it can be set to the full height of the viewport used to display the site, and it can be adapted the largest contained object.

Components typically reside completely inside a single section. However, component handler 31025 may allow components to extend (i.e. protrude) from a given section, crossing into one or more adjacent sections. However, in this scenario, the majority of the component's area would typically be in the section with which it is associated.

Containers and other components may be defined as having a fixed size, stretchable or be related to a screen size. This may apply to the various specific container types described herein below (sections, stacks, layouters, repeaters etc.).

Figure 10A:
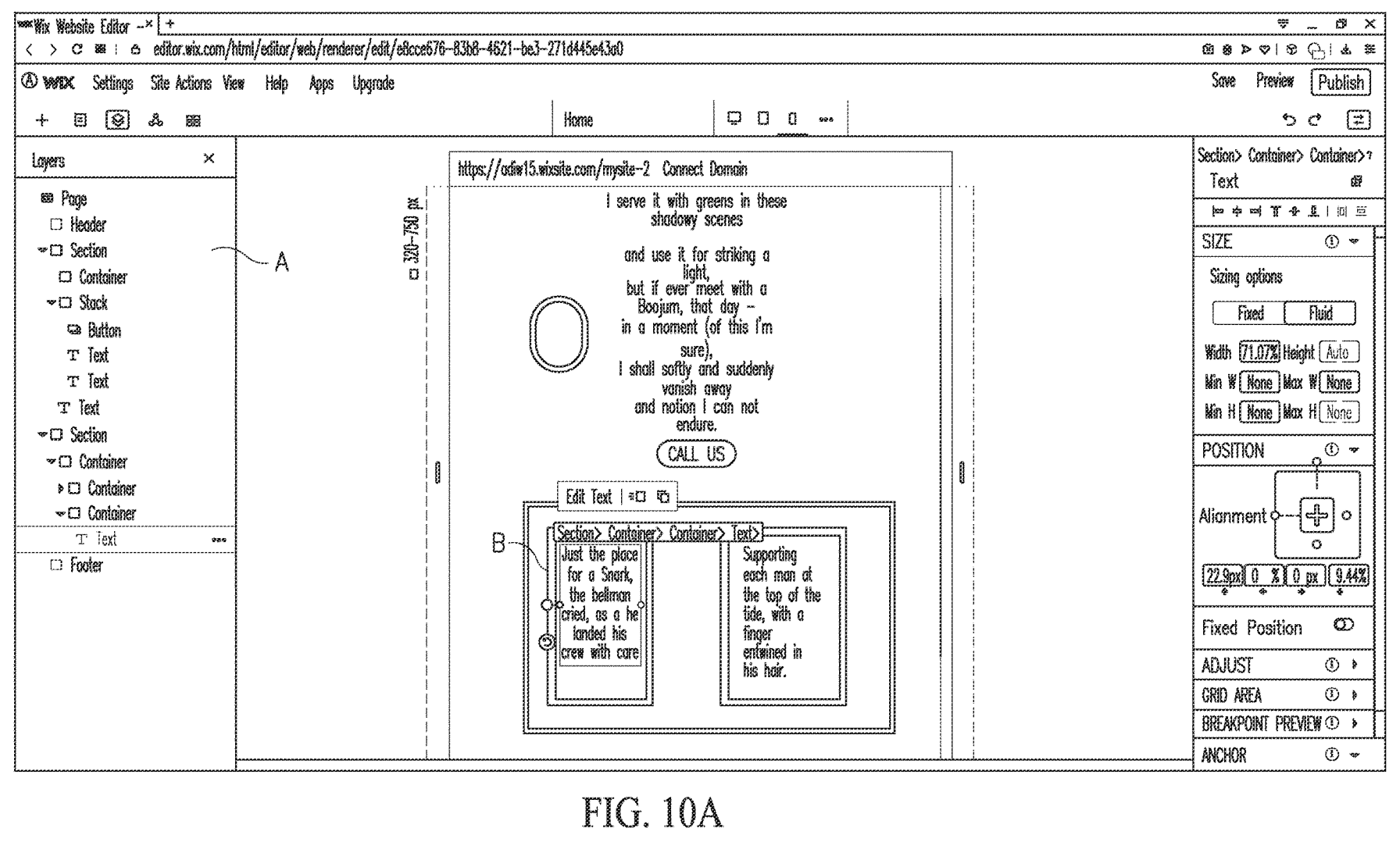
Figure 10B:
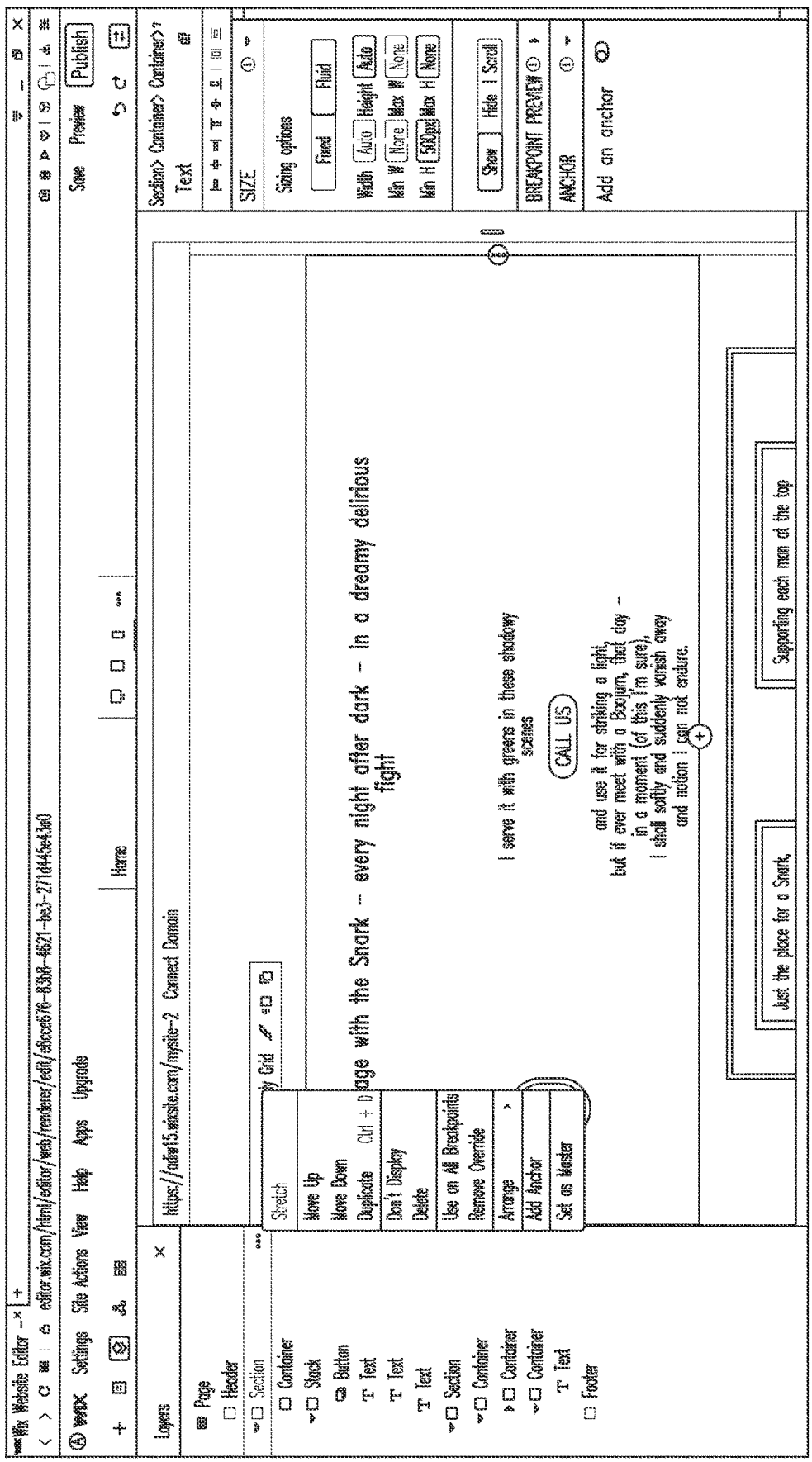

Reference is now made to FIGS. 10A and 10B which illustrate the use of sections and component selection for a breadcrumb display. FIG. 10A shows such a structure with a page containing two sections. Responsive editor 310 may provide a section handling and navigation tool [A] which allow sections (and other elements) to be selected, moved, removed, etc.

To assist in the selection of deeply embedded components, Responsive editor 310 may also employ a breadcrumb path display [B]. When a component (which may be a container) is selected, a path display showing the path of containing components from the top-level container to the selected component is displayed (as in the example display [B], the path "Section>Container>Container>Text" is shown for the selected internal text).

FIG. 10B (to which reference is now made) further illustrates the page structure, showing the separation between the sections and the options available for section manipulation, as (for example) a section may be made hidden for a given breakpoint.

Additional options for section handling and page object selection as discussed in U.S. Pat. No. 10,146,419 entitled "Method and System for Section-Based Editing of a Website Page" granted 4 Dec. 2018 and U.S. Pat. No. 10,824,793 entitled "System and Method for Handling Overlapping Objects in Visual Editing Systems" granted 3 Nov. 2020, both commonly owned by the Applicant and incorporated herein by reference.

Figure 11A:
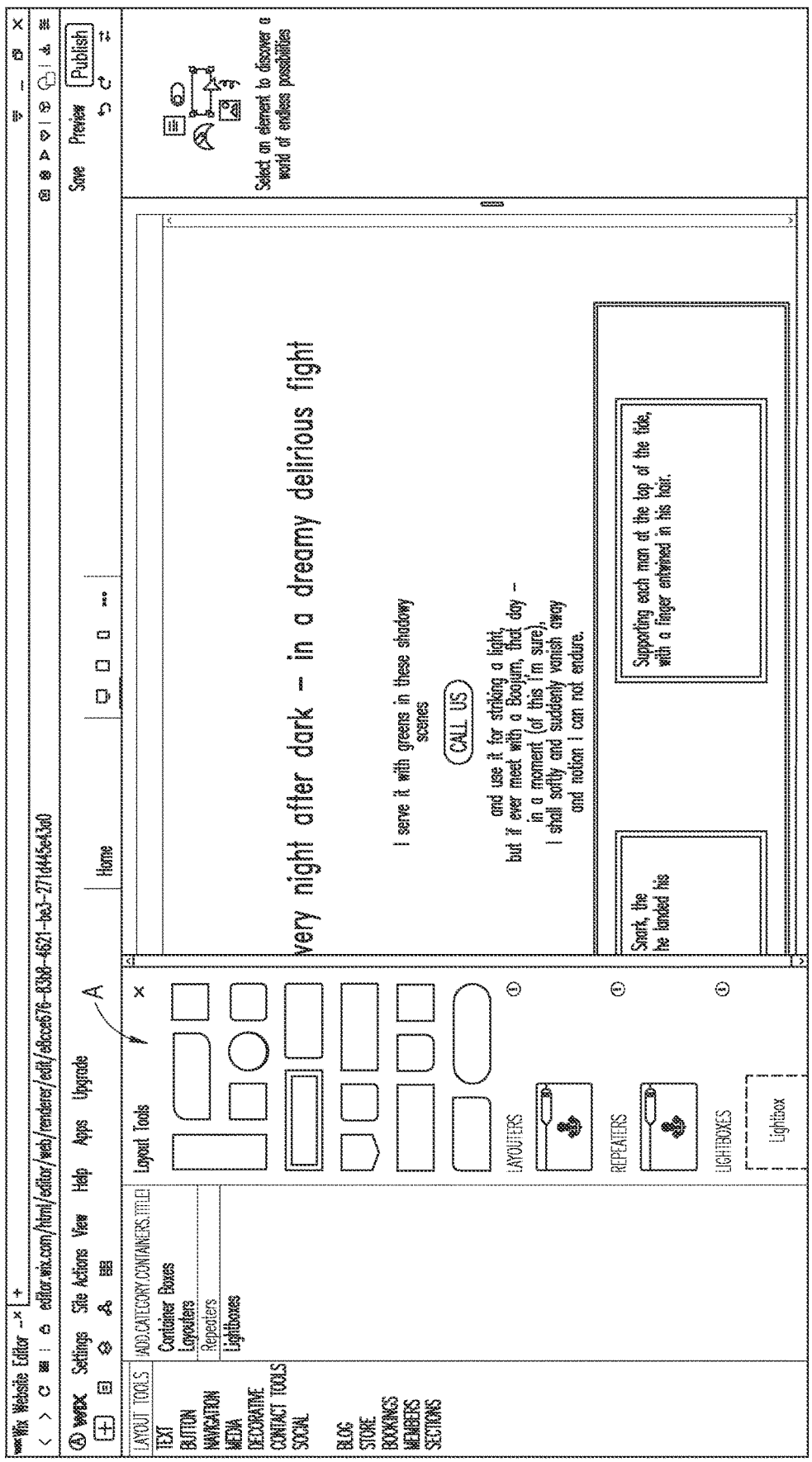
FIGS. 11A-11C are schematic illustrations of the use of an add menu for various element types; constructed and operative in accordance with an embodiment of the present invention.
Figure 11B:
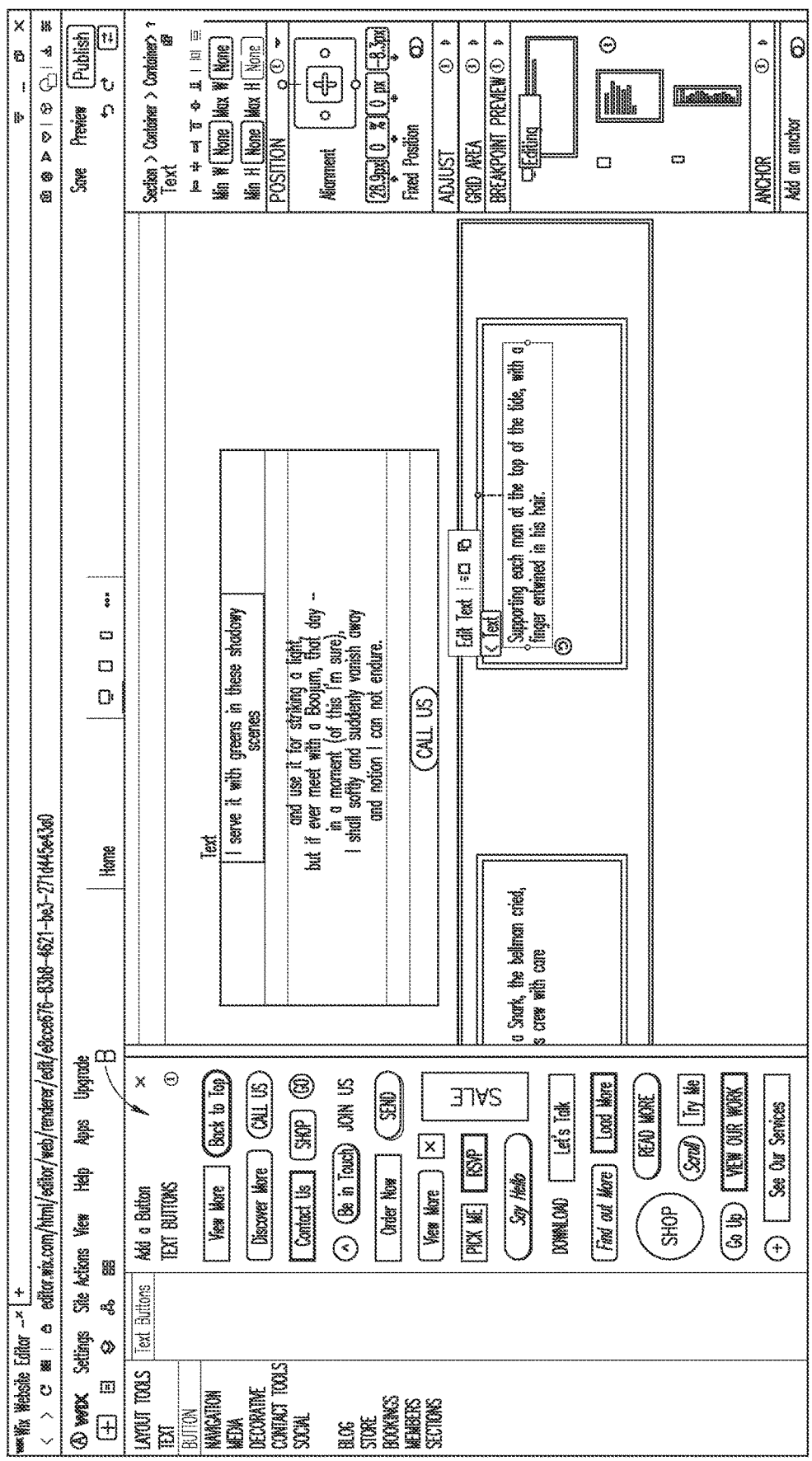
Figure 11C:
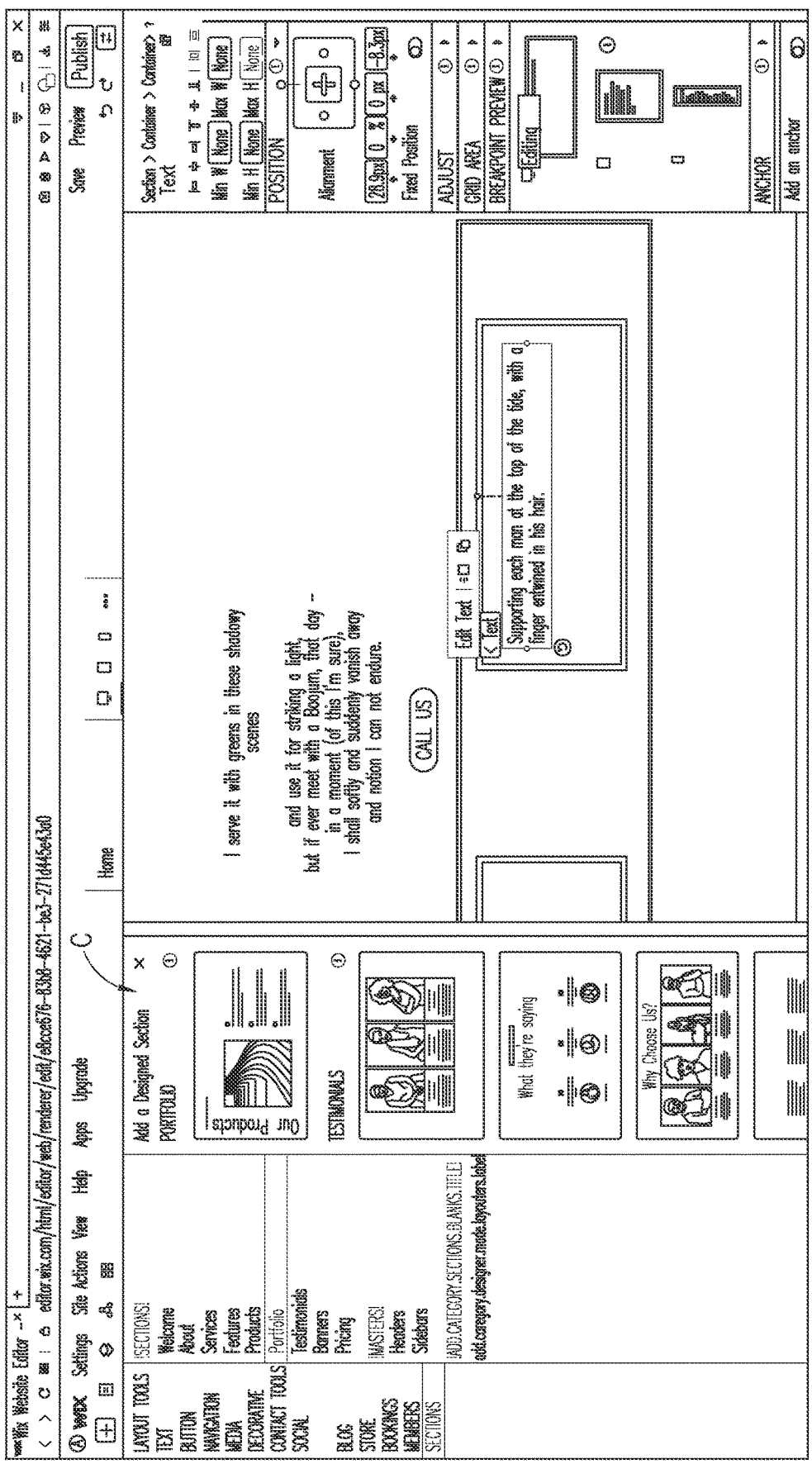

It will be appreciated that components are typically added via drag and drop from a set of menus of available objects (component types), known as the Add Panel. The Add Panel may include atomic components, containers, design elements (such as layouters and repeaters) as well as pre-fabricated sections. The Add Panel may also include WBS services and verticals, such as blog, store and bookings. Reference is now made to FIGS. 11A-C which illustrates such a menu. The Add Panel and the figures are described in more detail herein below.

Responsive editor 310 may allow components to overlap each other geometrically and be placed (via drag and drop or resizing) in arbitrary locations. Component handler 31025 may further implement a z-order or layering capability to handle such overlapping objects. Alternatively, component handler 31025 may provide a mechanism to make space for inserted components as discussed in more detail herein below.

Thus responsive editor 310 may provide the ability to "make/close space" (in parallel to exact user-defined placement) during component insertion, deletion or drag and drop. Therefore, when a component is dropped into a given position (possibly one overlapping other components), responsive editor 310 may resize or move some or all of these components to make place for the dropped components. Similarly, when a component is dragged out from an arrangement of components, responsive editor 310 may resize or move the remaining components so to close the created gap. Responsive editor 310 may handle component insertion and deletion in a similar way (i.e. deletion similarly to drag from, insertion similarly to drag to).

Figure 12:
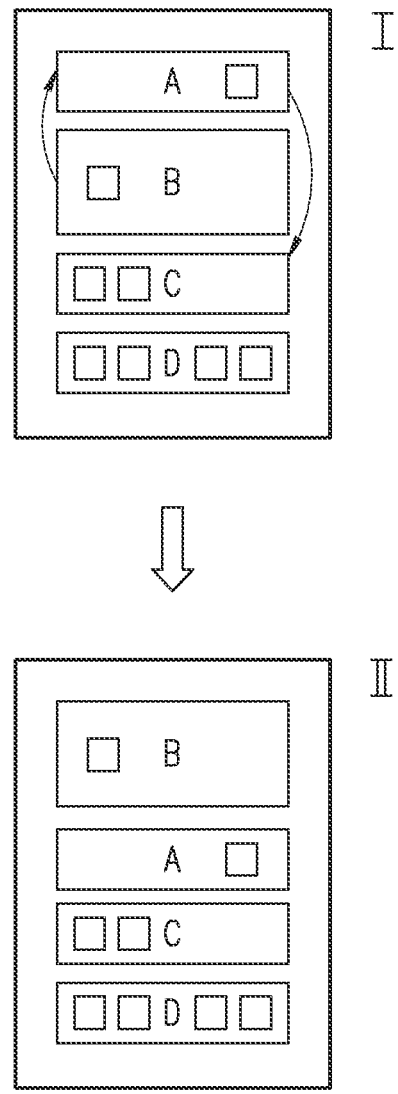
FIG. 12 is a schematic illustration of the use of make/close space for drag and drop editing; constructed and operative in accordance with an embodiment of the present invention.

It will be appreciated that the drag-from and drop-to locations may be within a container, e.g. a stack container with a vertical column of components. Reference is now made to FIG. 12 which illustrates how when container A is dragged down (scenario I), container B is moved up in place of A, and the two switch places (scenario II).

Such make/close space operation may depend on specific user action (e.g. using control-drag instead of regular mouse drag) or using specific handles or similar mechanisms as described in U.S. Pat. No. 10,185,703 entitled "Web Site Design System Integrating Dynamic Layout and Dynamic Content" granted 22 Jan. 2019 commonly owned by the Applicant and incorporated herein by reference).

Alternatively, this may depend on the type of the container in which the drag-from or drop-in occurs. For example, component handler 31025 may apply the make/close space behavior to specific container types (such as the stack container described herein below), or to any container marked with a specific attribute or setting. In such a scenario, the make/close space behavior may differ between the source container and the target container (e.g. closing the space in the source container but allowing overlapping drop placement in the target container without making any space there).

It will be appreciated that "make place" capability may be based on an analysis of the user's design intention, e.g. using information from existing anchor types and direction to determine the best way to modify each adjacent component. Component handler 31025 may also use previous user activities and editing history, the layout of other areas in this web site and other sites and other information available in the system as described in more detail in relation to ML/AI engine 350 as described in more detail herein below.

It will be appreciated that responsive editor 310 may provide multiple mechanisms to support the editing of the site across multiple breakpoints, unifying the design and layout across the breakpoint range set while optimizing the design for each breakpoint range. It will be appreciated that these goals may conflict in many cases.

Figure 13A:
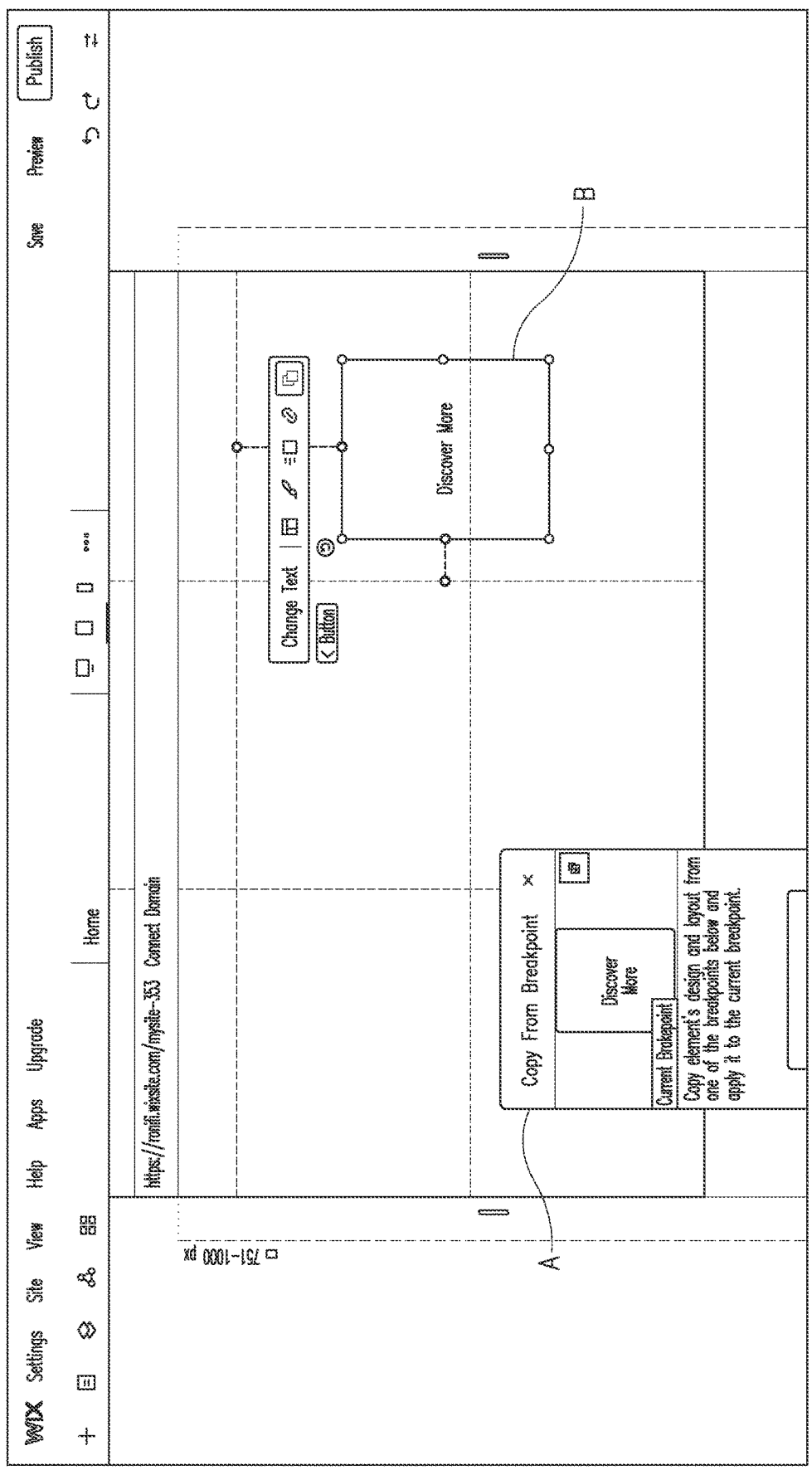
FIGS. 13A-13B are schematic illustrations of a user interface for design unification across multiple breakpoint ranges; constructed and operative in accordance with an embodiment of the present invention.
Figure 13B:
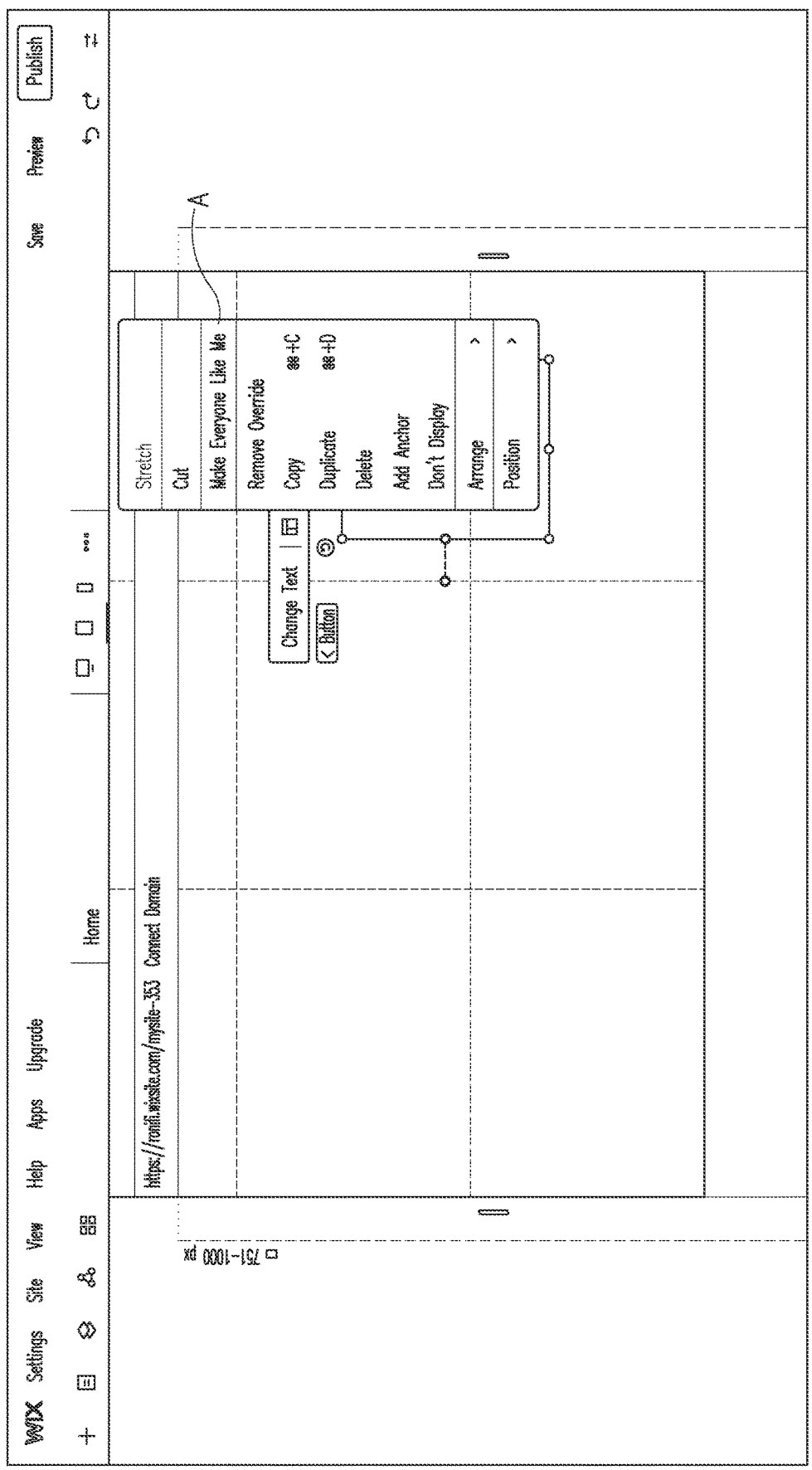

Reference is now made to FIGS. 13A and 13B which illustrate an interface for design unification across multiple breakpoint ranges. FIG. 13A shows an interface that may allow the user to copy the setting and the design for a component in a given breakpoint range from that of the same component in another breakpoint range ("pull design" UI [A] in the figure—"Copy from Breakpoint). A similar option (illustrated in FIG. 13B) allows the user to copy the setting and the design of the component in the current breakpoint range to other breakpoint ranges ("push design") as represented by UI [B] in the figure "Make Everyone Like me".

An embodiment of responsive editor 310 may also allow such copying to be done from instances of the same or similar component type in other pages of the same site or another site. This may be implemented using a clustering algorithm and selection of representative setting and design values as described in U.S. Pat. No. 10,459,699 entitled "System and Method for the Generation of an Adaptive User Interface in a Website Building System" granted 29 Oct. 2019 commonly owned by the Applicant and incorporated herein by reference.

Animator 31027 may provide an animation for a user selection of components for a given range of widths or specific breakpoints. Animator 31027 may display full pages, specific page section(s), specific container(s) or specific component(s). The different versions of the page (for different widths) may take into account any unselected components, which may be grayed-out or completely hidden. This may be done to display the intuitive manner in which changes occur to a given component or component set between breakpoints. The unselected components are removed in order to simplify the display animation.

Responsive editor 310 may allow such animation to be viewed interactively or exported and may allow it to be paused (reverting it to a version of a site preview with the given graying out/hiding applied).

Responsive editor 310 also may offer multiple tools to simplify object docking and anchoring during editing, as well as placing components in the layout.

Component docker 1028 may support auto-docking, showing the best way to dock a component and implement distances for each possible docking option. Docker 31028 may then suggest and apply possible docking. For example, docker 31028 may detect when a component is located close to a corner of its container (much closer than any other object inside that container) and recommend docking it to the two near edges of the specific corner.

Responsive editor 310 may allow components, containers and presets to specify their private docking parameters. Thus, a given preset, for example, may have a specialized grid arrangement that does not conform to the regular matrix format.

ML/AI engine 350 may analyze the absolute (WYSIWYG) layout definitions during editing and saving (or other site operations), and may detect user intent, converting it to a declarative set of rules which implements this intent as described in more detail herein below.

As discussed herein above, elements are typically added to the page via the Add Panel interface (in addition to component moving, copying, and duplication).

Reference is now made back to FIGS. 11A to C which show how the Add Panel may include layout support elements (marked A in FIG. 11A), regular components and containers (marked B in FIG. 11B) and full predefined sections (marked C in FIG. 11C). Such predefined sections are also known as Presets.

It will be appreciated that generally provided elements (such as containers, components and some section types) are in the "WBS world", since they are abstract and related to the world of components, layouts and pages. System 200 may also offer sections that correspond to the "real world", that of human discourse having meaning external to the web site (such as business terms). As can be seen in FIG. 11C, responsive editor 310 may provide elements (Presets C) such as an About screen, Services list, Products list, Portfolio etc.

Since the number of such possible sections and components is very large, responsive editor 310 may provide a customized and personalized Add Panel. Such an Add Panel may be established on information available on the user based on the user entry funnel, user attributes (such as a business type), site attributes, current site structure, previous actions, and design preferences etc. as discussed in more detail herein below.

Responsive editor 310 may support multiple situations in which an object with a given source breakpoint setting (e.g. with 3 breakpoint ranges) is inserted into a page with a different target breakpoint setting (e.g. with 4 breakpoints with different values). Component handler 31025 may adapt the inserted object to the breakpoints defined for the target page.

This could happen in multiple scenarios, such as when copying or moving a section (or another component) from one page to another (assuming that the pages have different breakpoint definitions). This could be within a single site (if different per-page breakpoints are allowed) or between different sites.

It could also happen when including (through reference, inheritance or other mechanisms) an element or section from another site or a different layout creation environment (e.g. another editor employed by the WBS) or when a user selects a Preset (or another component) for inclusion in a page, and the page has breakpoint ranges which are associated with the inserted object.

It may also happen in shared parts such as when detaching a shared part (i.e. from the shared area such as page header) and returning it to the regular page area or when moving an element from the page to a shared part.

Figure 14:
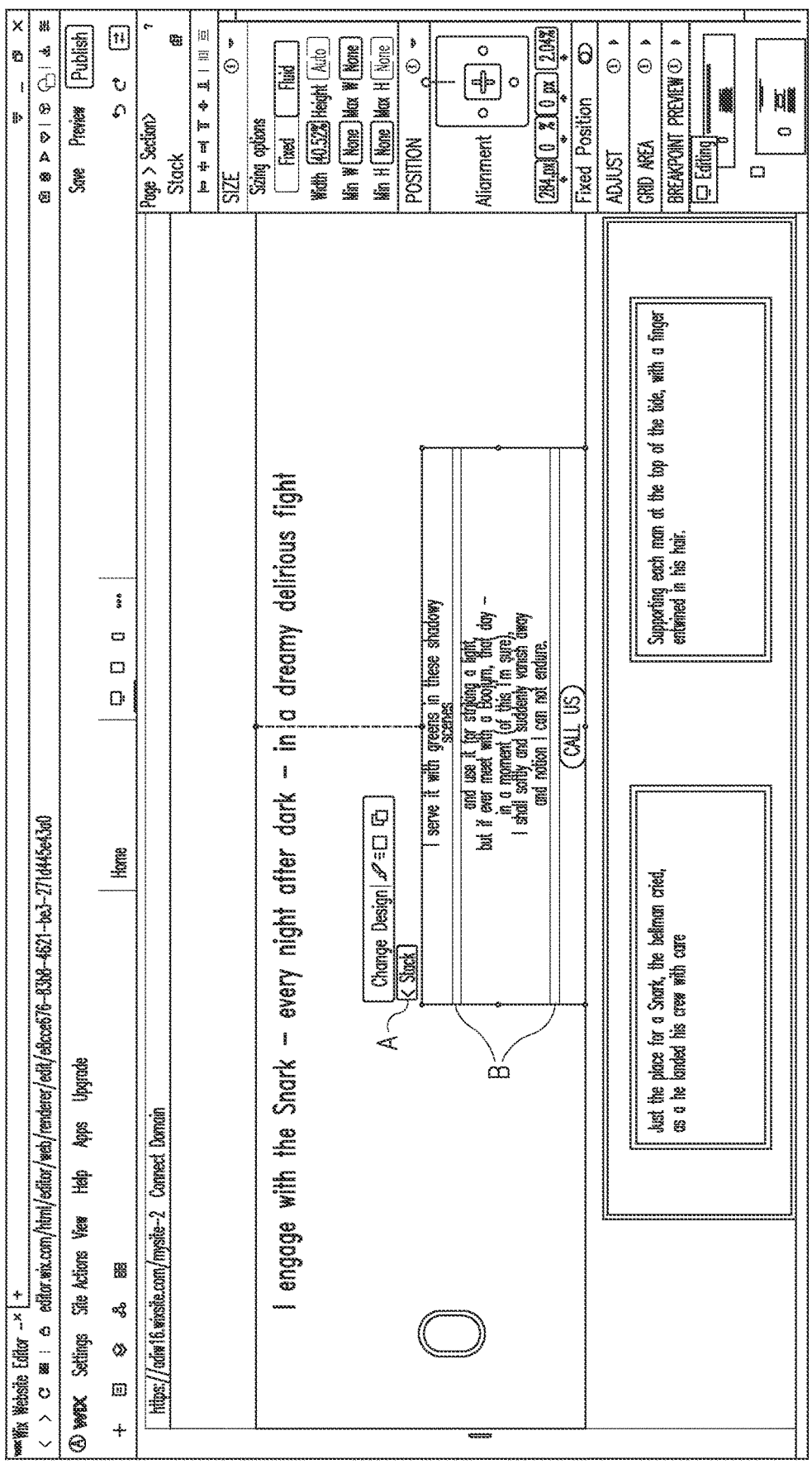
FIG. 14 is a schematic illustration of a stack component; constructed and operative in accordance with an embodiment of the present invention.

Reference is now made to FIG. 14 which illustrates a stack. A stack [A] is a container that includes a vertical set of contained components (which could be other containers, stacks or other elements) that push each other up or down. The stack definition includes the gaps [B] between the contained components. The stack maintains the gaps between its contained components and does not allow them to overlap. A similar component may provide horizontal pushing instead of a vertical one.

It will be appreciated that the stack may allow drag and drop for the placement of contained components as well as re-ordering of contained components during editing. This is done using make/close space, as described herein above.

Similar to a layouter as described herein below, layout handler 31022 may transform the stack to a different display format (e.g. slider or a slideshow) if it becomes overfilled.

System 200 may implement such a stack element using an HTML FlexBox element.

It will be appreciated that a layouter is a container providing a layout to a set of sub-containers. It provides an easy way to design containers which include arrangements, lists or other repeaters. A layouter provides an easy way to define a set of sub-containers that are re-arranged on width change including both user-defined re-arrangement and system-determined re-arrangement.

A layouter may support a variety of direct siblings (i.e. directly contained elements). However, an embodiment may require all direct siblings to be containers or even a container of specific types.

A layouter may provide multiple alignment options that decide where the items are placed inside their row/column, inside the layouter container itself and when there is available space (left/right/center/justify etc.)

Figure 15A:
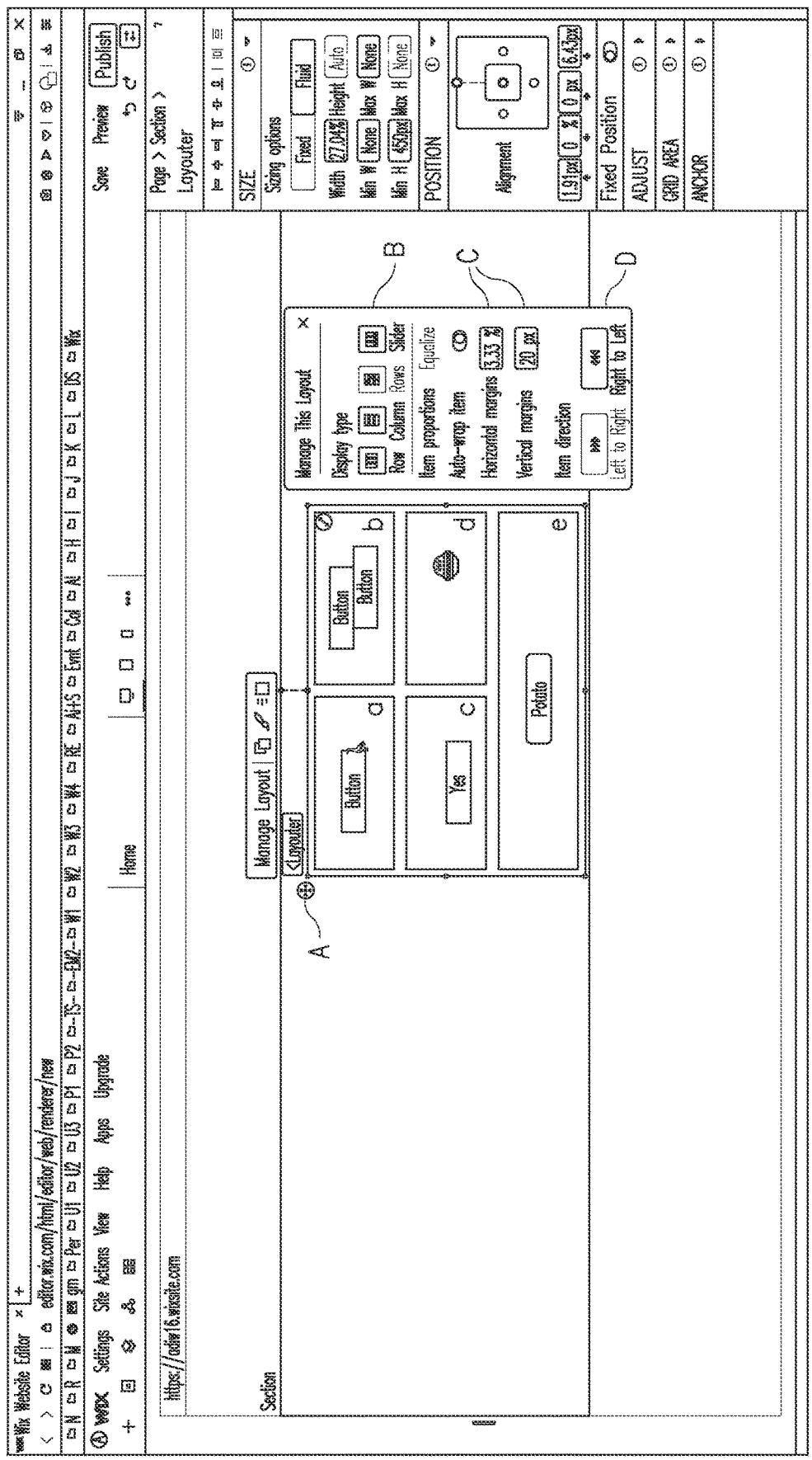
FIGS. 15A-15B are schematic illustrations of a layouter component and its possible arrangements; constructed and operative in accordance with an embodiment of the present invention.
Figure 15B:
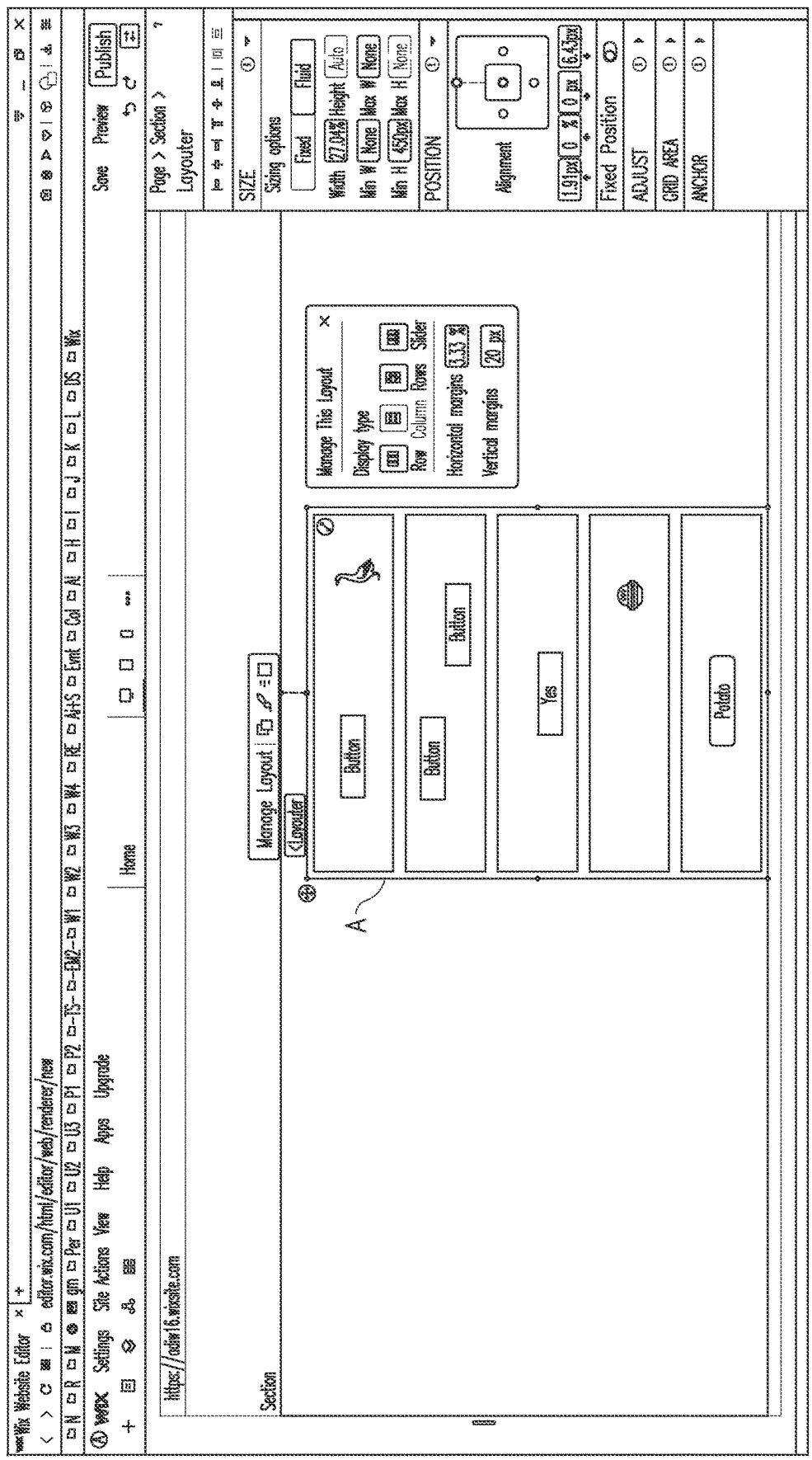

Reference is now made to FIGS. 15A and 15B which illustrate a layouter component and layouter arrangements. FIG. 15A illustrates a layouter [A] which includes 5 sub-containers (a-e) which themselves include additional content (1-2 buttons or a hamburger icon in each of the 5 sub-containers). The sub-containers are stretchable and can be resized and moved.

It will be appreciated that the layouter may behave like a regular container, in the sense that sub-containers can be moved out of the layouter, and an external container can be moved into the layouter.

The layouter may allow the user to perform operations such as re-ordering while editing (with or without a "make/close space" capability), adding a container on the fly, adding a container from outside, removing a container to outside, and change layout.

It will be appreciated that a layouter may support multiple types of arrangements (such as "Display type" [B] in FIG. 15A) including static arrangements (such as row, column, and rows in [B]) and dynamic arrangements (such as the slider arrangement in [B]). This can include other types of a gallery in which only some of the sub-containers are visible at any time, and the user (as well as the site viewer) may be able to navigate to different parts of the underlying gallery.

As discussed herein above, many more arrangements are available, and layout handler 31022 may further switch a given layouter automatically to a different arrangement if the space if filled (e.g. due to content growth). Additional arrangements may include cards, slideshow, slider, list and columns, and the layouter can apply any of them without any additional editing by the user.

The layout [A] in FIG. 15A uses a "Rows" arrangement. In contrast, the same layouter [A] in FIG. 15B uses a "Column" arrangement as shown.

It will be appreciated that a user can switch between the various arrangements, and the layouter may re-arrange the sub-containers (with their content) in the layouter according to the desired arrangement. The user may provide additional parameters for the arrangement (such as margins [C] in FIG. 15A and main directionality (L2R/R2L) [D]).

The layouter may also preserve a layout context for each of its possible arrangements. As the user may have modified each arrangement (e.g. change position, size and order for the given arrangement), the layouter may preserve these modifications so it could re-apply them when returning to this arrangement.

Thus the user may apply per-breakpoint range changes, including using a different arrangement per breakpoint range and making other changes to the sub-containers and to their content.

It will be appreciated that the user may move objects into and from the sub-containers of the layouter. When dropping an object into a layouter so that the object crosses multiple sub-containers, the layouter may select which sub-container to use.

Such selection may be based on a number of parameters, such as the cursor position, the sub-container with the largest overlap area, the largest combined vertical and horizontal overlap or other criteria. The layouter also may help the user during dragging by highlighting the sub-container which would "receive" the dropped object if dropped now (known as the "hot zone").

If the layouter requires all direct siblings to be containers (as noted above), the layouter would automatically create a wrapping container around the dropped object.

It will be appreciated that a layouter together with ML/AI engine 350 may suggest better design options, including a recommended arrangement choice and various modifications within the same arrangement. These could be generalized suggestions or suggestions within the context of a specific breakpoint range. A generalized suggestion is one of a menu of generalized layout types (as described in more detail herein below). A specific suggestion is a set of layout suggestions based specifically on the current content of the layouter, similar to the layout suggestions described in U.S. Pat. No. 9,747,258 entitled "System and Method for the Creation and Use of Visually-Diverse High-Quality Dynamic Layouts" granted 29 Aug. 2017, commonly owned by the Applicant and incorporated herein by reference.

A layouter may be fixed, i.e. its sub-containers remain in the same arrangement when the layouter width changes (though they may resize or push each other due to dynamic layout). The only movement which occurs between breakpoint ranges is due to explicit editing by the user.

Alternatively, a layouter may be transformational and its sub-container will move in a certain way under certain conditions. One simple example would be a row layouter (with elements side by side) which is automatically converted to a column layouter (with one element on top of the other) when available width falls below a certain value. More complex transformations may be specified (e.g. similar to the re-flowing of words in paragraphs when the width changes in word processors). System 200 may provide such transformational layouters, and may allow the user to design his own transformational layouters.

Responsive editor 310 may also support additional transformation capabilities as described herein above (regarding layouter changes under differing widths). Responsive editor 310 may also support algorithm-based transformation using technologies such as the ones used to re-arrange components for mobile display as described in U.S. Pat. No. 10,176,154 entitled "System and Method for Automated Conversion of Interactive Sites and Applications To Support Mobile and Other Display Environments" granted 8 Jan. 2019 and US Publication No. 2020/0380060, entitled "System and Method for Integrating User Feedback into Website Building System Services", published 3 Dec. 2020, both commonly owned by the Applicant and incorporated herein by reference.

Figure 16A:
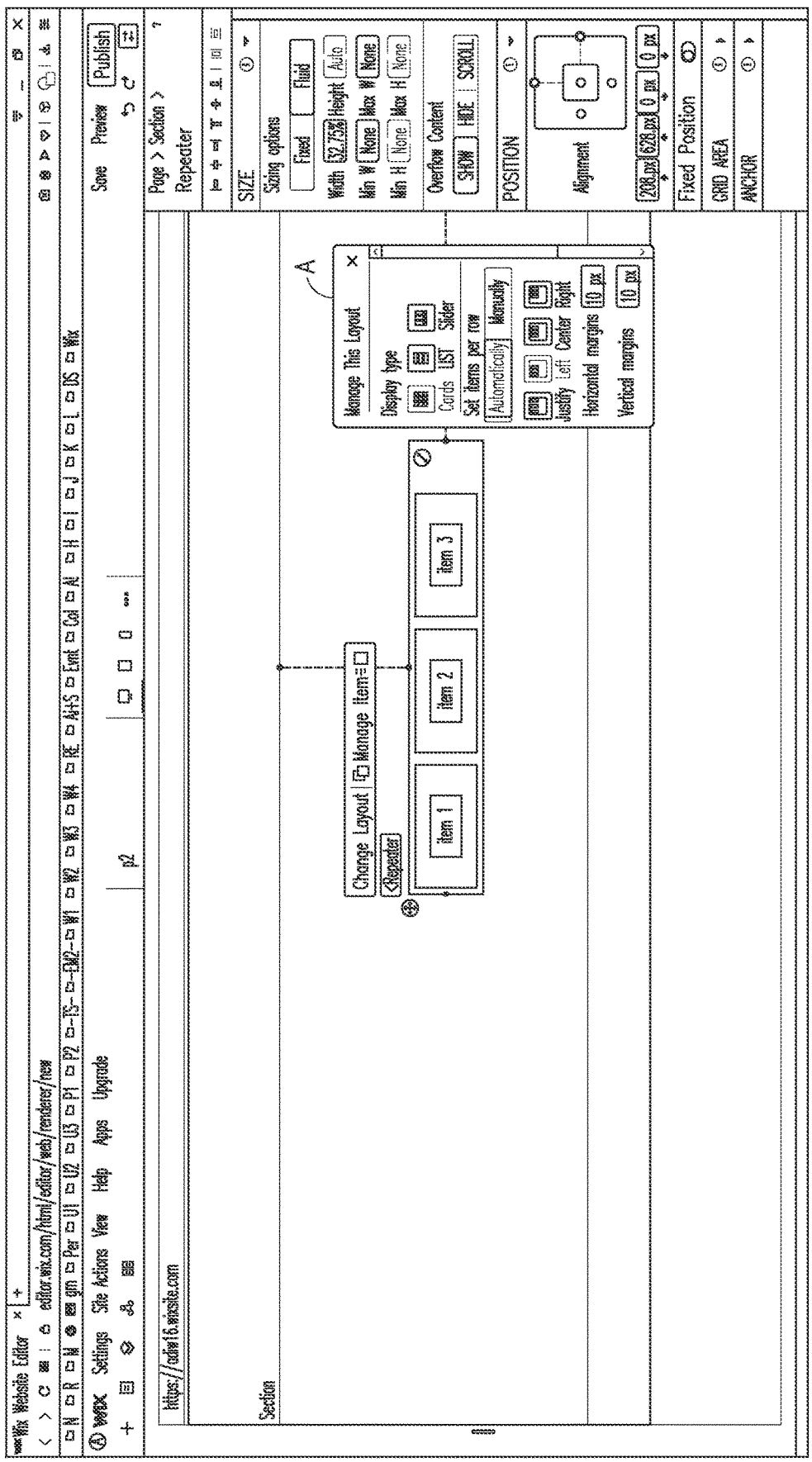
FIGS. 16A-16C are schematic illustrations of the use of a repeater; constructed and operative in accordance with an embodiment of the present invention.
Figure 16B:
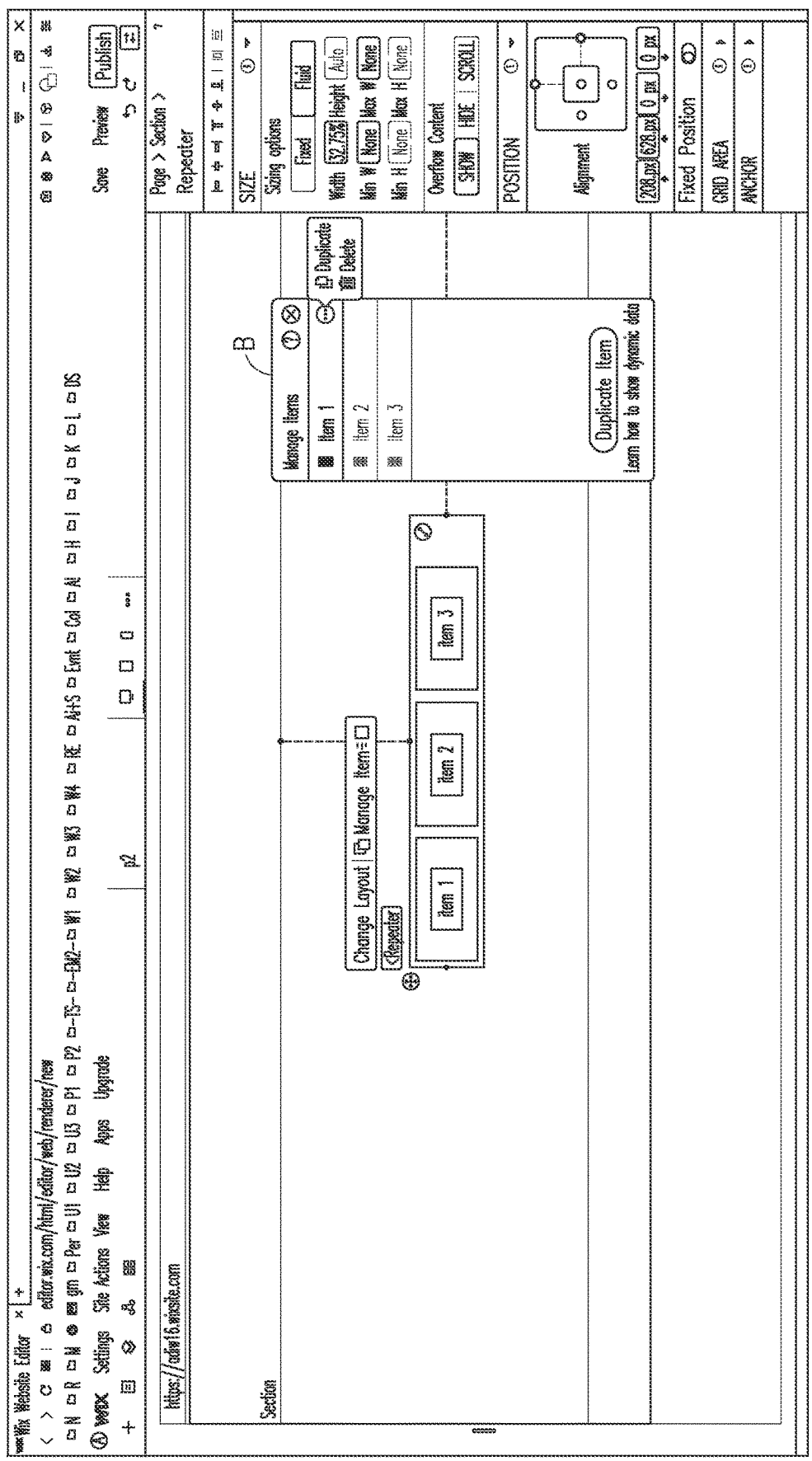
Figure 16C:
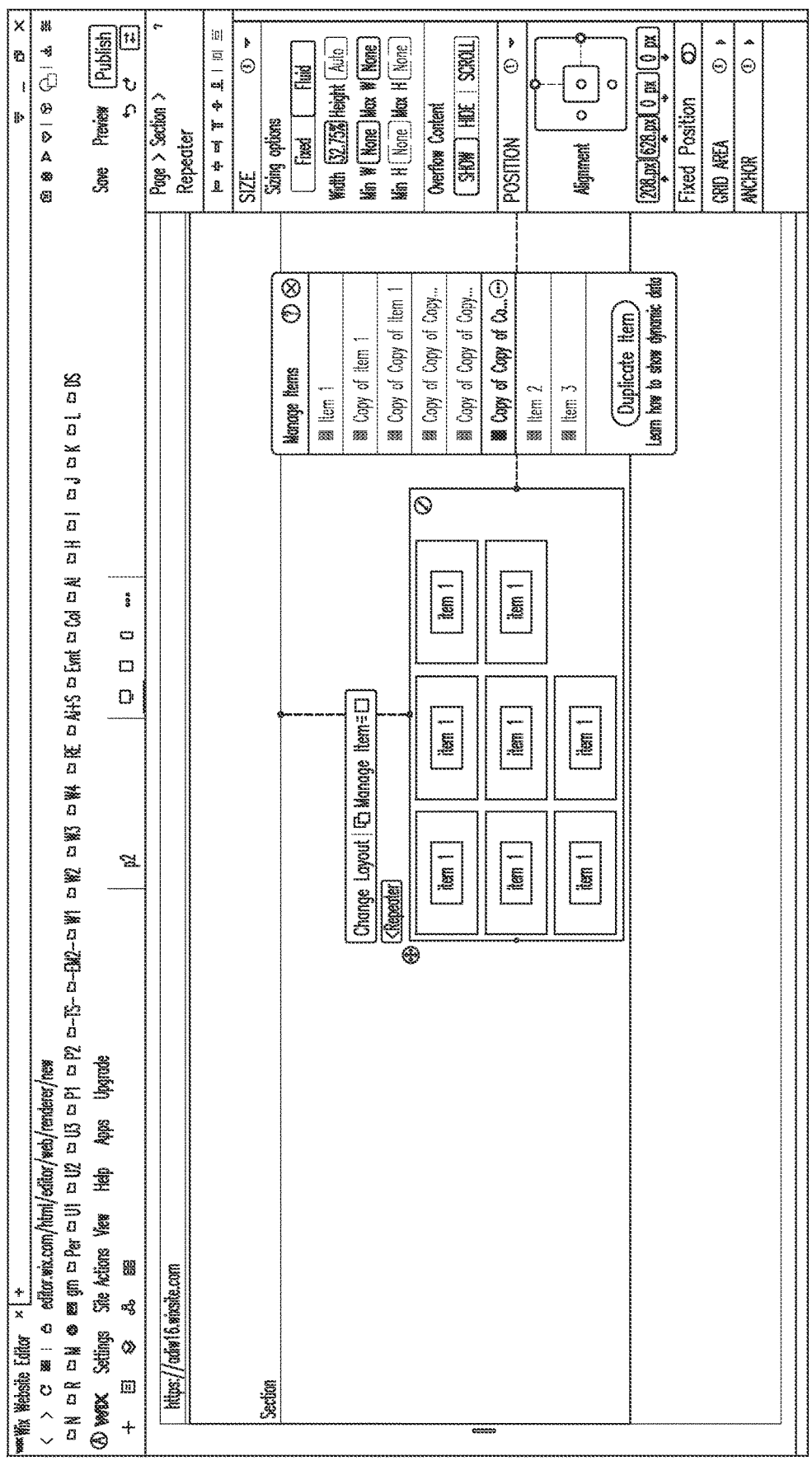

Reference is now made to FIGS. 16A-16C which illustrate the use of a repeater. It will be appreciated that repeaters are similar to layouters with the difference that the sub-containers (also known as items) are multiple instances of a single sub-container or a set of sub containers. Thus, a change applied to one sub-container (e.g. inserting a new component) may apply to all sub-containers and would appear in all of them. FIG. 16A illustrates some options [A] for a repeater display.

However, components inside the repeater may still have specific data (e.g. text or image source) different between the pages. Such data may be managed manually by the user or by associating the repeaters with a data source (in-memory table, a database, an external CMS etc.). The user may manage the data through interfaces provided by the underlying database or CMS 50.

A repeater may use items that are separate from the displayed data. For example, the repeater may display a set of 4 boxes that form "windows" into a series of data elements (showing elements 1/2/3/4, 2/3/4/5, etc.).

The repeater may provide a "Manage items" user interface [B] (as illustrated in FIG. 16B to which reference is now made) to manage the items, e.g., selecting display method and arrangement, maximal number per row and other attributes of the display.

As illustrated in FIG. 16C to which reference is now made, when items are added to the repeater (e.g. by duplicating item 1 and its duplicates), module 300 may extend the repeater and create additional rows of sub-containers. Layout handler 31022 may perform other types of re-arrangements (as discussed for layouters above) such as converting the grid display into a slider.

As discussed herein above, a responsive editing grid is a grid layout mechanism which can be applied to most containers to help align their contained components. Thus, the responsive editing grid is visible to the user, who explicitly uses it to arrange components.

Figure 17A:
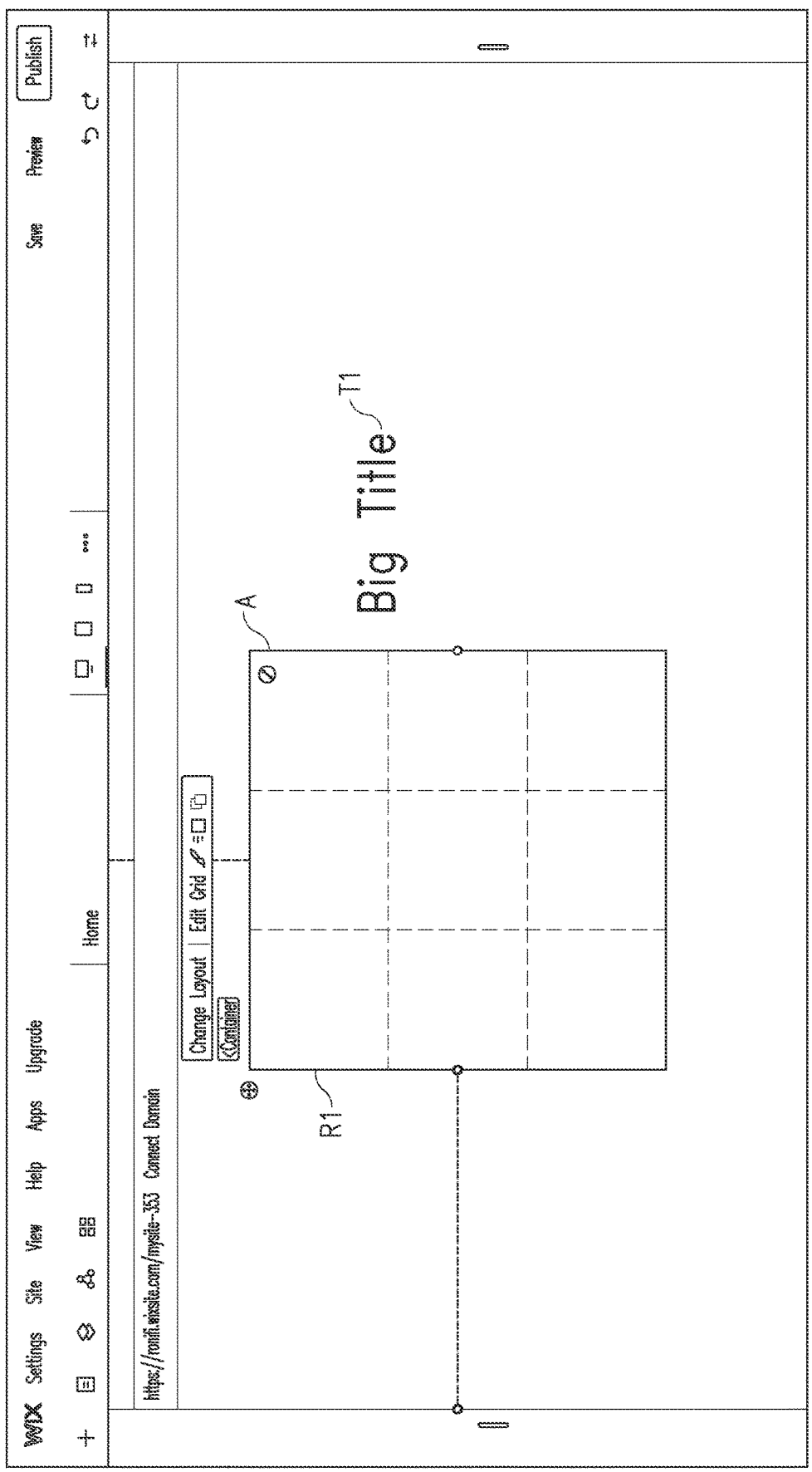
FIGS. 17A-17D are schematic illustrations of the use of a responsive editing grid; constructed and operative in accordance with an embodiment of the present invention.

It will be appreciated that responsive editor 310 may allow the user to manually apply a responsive editing grid to a section and to all regular container types (but not to layouters and repeaters which have their own layout mechanisms). Reference is now made to FIGS. 17A to 17D which illustrate the implementation and handling of responsive editing grids within containers. A sample 3×3 grid [A] (as applied to a regular container) is illustrated in FIG. 17A.

Figure 17B:
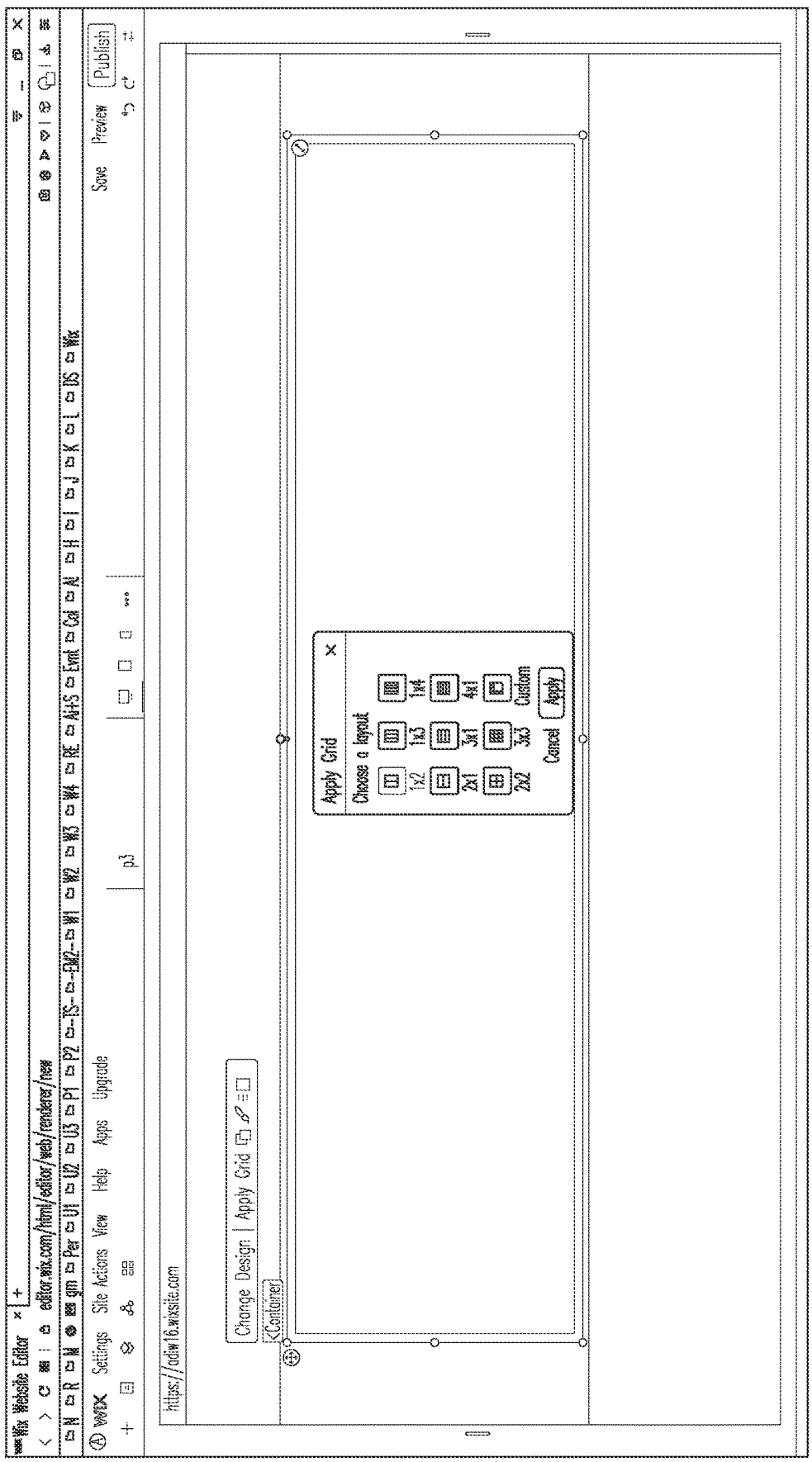
Figure 17C:
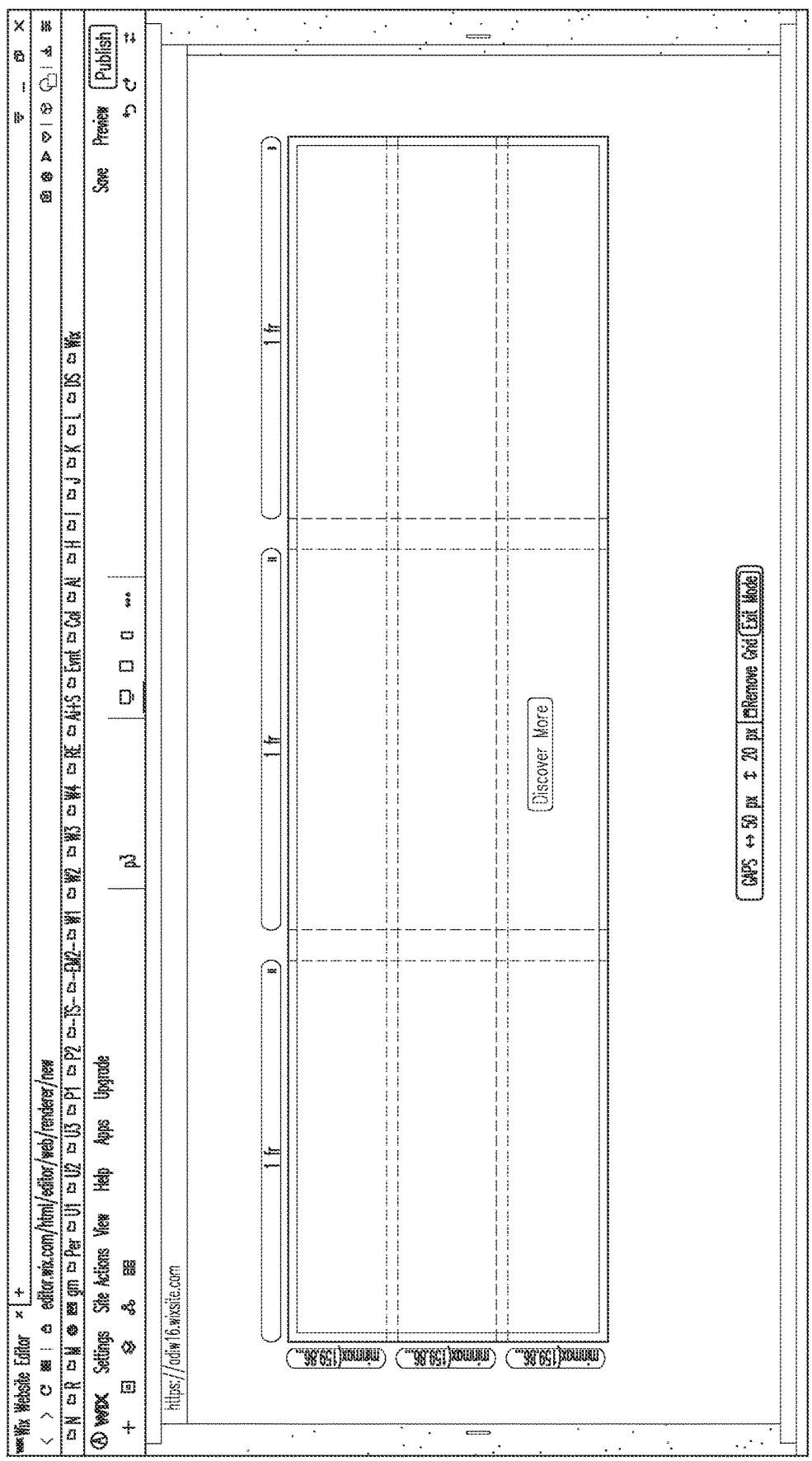
Figure 17D:
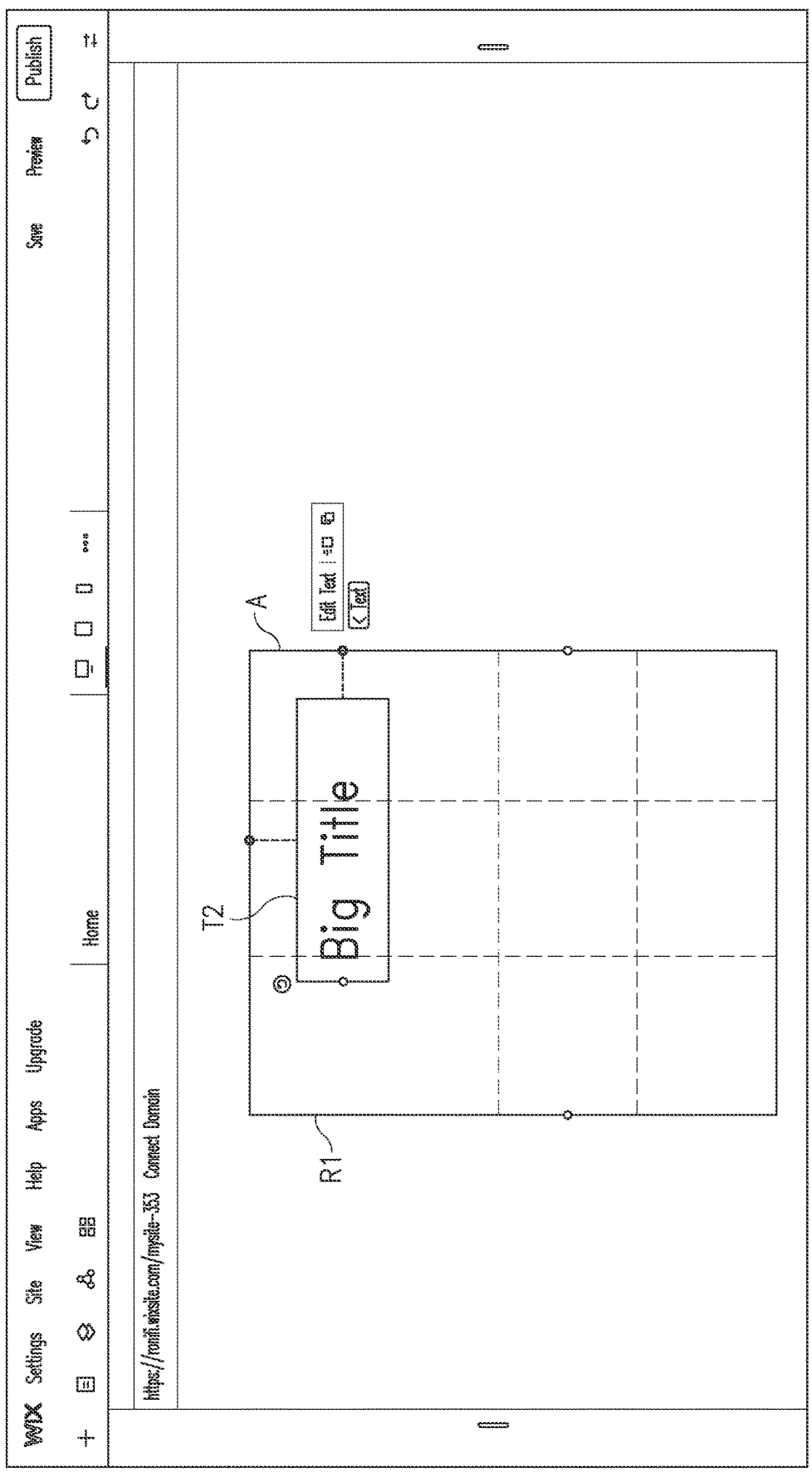

As illustrated in FIGS. 17B and 17C to which reference is now made, the user can specify the parameters of the grid, such as the number of rows and columns, the row/column measurement units and size, the horizontal and vertical gaps etc. Rows and columns can be of fixed size or flexible. The grid can also be further edited or removed with editing operation including stretching, swapping of grid lines or columns etc.

It will be appreciated that the grid provides horizontal and/or vertical lines that can be used for docking of the sub-elements of the container (to which the grid was applied). The docking may also use negative margins, so an element is anchored to a given grid cell edge, but actually crosses that edge to be partially outside the grid cell (or the grid entirely).

It will be appreciated that the grid cells are not separate sub-containers and thus components can be moved between them for different breakpoint ranges.

Grid handler 31029 may match between the size of the container and the parameters of the grid, and may change line parameters as required (even when working with non-% units). For example, grid lines with "auto" may grow when dropping a large element (such as text). An example is a comparison between the $1^{St}$ grid row R1 between FIG. 17A (before dropping the text object) and FIG. 17D (after dropping the text "Big Title").

It will be appreciated that system 200 may support a variety of measurement units, such as pixels, %, fr (size fractions), vh/vw (based on size of viewport), em, rem, calculation-based etc.

The fraction unit allows specifying (for example) two columns with sizes of 1fr and 2fr. The $1^{St}$ column would take ⅓ of the width, and the $2^{nd}$ column would take ⅔ of the width.

Grid handler 31029 may manage the grid size and measurement units, so that changes according to the units used and changes to components in the containing container are handled automatically. Thus, when applying a grid to a container, grid handler 31029 may keep the existing design and re-calculate it to the new grid including unit changes. The user does not have to worry about the units and sizes. Grid handler 31029 together with layout handler 31022 may further update the container size to fit the grid size, keeping the grid in place.

It will be appreciated that image components and images used as background (to other components) often pass through substantial processing before being displayed. In particular, a user may typically desire to crop an image so its most relevant parts are shown. The defined cropping defines (in particular) the default size and the aspect ratio of the image. Responsive editor 310 may also support non-rectangular cropping through the use of a shape mask.

Furthermore, the user may like to specify a point of interest in the image (the focal point). This is needed as some image display components (such as some galleries) determine image display based on a focal point rather than a user define crop region.

Figure 18:
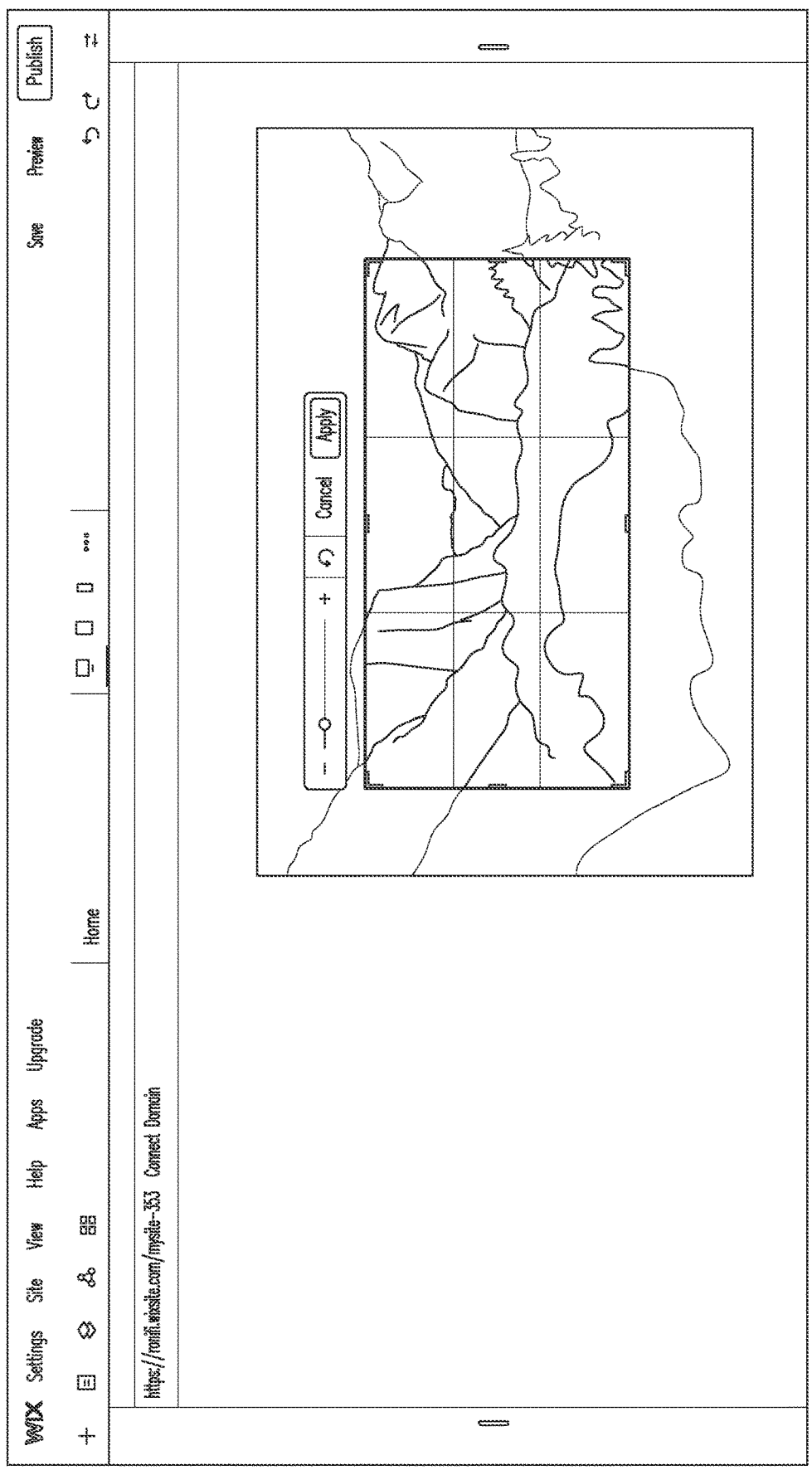
FIG. 18 is a schematic illustration of a cropping process using a responsive editing grid background; constructed and operative in accordance with an embodiment of the present invention.

Reference is now made to FIG. 18 which illustrates an image that is cropped (using visual cropping) to serve as a background for a given container and grid.

It will be appreciated that system 200 may allow image attributes to be defined per breakpoint range. Thus, the user may embed a single copy of the image in his site, but define a different crop (and resulting aspect ratio) and a different focal point for each breakpoint range. Thus, the page would have a single image component, but with multiple generated outputs from this single component.

Image handler 31032 may integrate this capability with other changes made by responsive editor 310, as (for example) the image may already be adjusted (e.g. reduced) to fit the different breakpoint range. Image handler 31032 may also handle other image changes such as zoom, focus, color handling etc.

It will be appreciated that the discussion above has focused on the construction of applications that display their output and handle their interaction on a single screen, which may be very small (e.g. smartwatch display) to very large (e.g. billboard display).

In a different embodiment, system 200 may support the design of applications that are divided over multiple screens (which do not necessarily form a contiguous "display surface"). This could occur in a number of cases, such as a very large physical screen that is accessed as multiple screens (e.g. due to display management limitation), a multi-monitor system, a system with a primary display and an auxiliary display (e.g. a smartphone running part of the application as a "virtual remote control" for the system) or in a system with actual multiple separate monitors running the application.

In this scenario, the application may be partitioned to display over the multiple displays (such as main display and remote-control display). Each partition may have its own set of breakpoints which may individually adapt to different display sizes. Furthermore, the breakpoint model may be expanded to support multiple screens having different widths, e.g. one layout definition for single screen (with subdivisions into different breakpoint ranges), one layout definition for two screens etc.

The different monitors may be connected to a single system 200 or to multiple systems 200. These multiple systems may coordinate between them in running the application. Furthermore, the display/monitor configuration may change during application operation (e.g. when an auxiliary display as described above is engage or disengaged from the system).

Thus system 200 may also provide responsive design, fluidity and dynamic layout editing and viewing capabilities which are adapted to such an environment, allowing the application to be designed once and operate (for example) in systems having a different number of monitors.

As discussed here in above, ML/AI engine 350 may be utilized to achieve system 200 goals as discussed in more detail herein below. ML/AI engine 350 may use the information available in WBS 2 as well as WBS-based training feedback as described in US Publication No. 2020/0380060, entitled "System and Method for Integrating User Feedback into Web site Building System Services", published 3 Dec. 2020, and may utilize a number of machine learning models or combinations thereof as described in more detail herein below.

As discussed herein above (and as illustrated in FIG. 11C back to which reference is now made), system 200 may offer sections and components which correspond to the "real world" that of human discourse having meaning external to the web site (such as business terms).

As the number of such possible sections and components is very large, responsive editor 310 may provide a customized and personalized Add Panel section. Add panel handler 31030 may dynamically update the Add Panel with the component selections and presets that the user is most likely to use or add, and may further recommend them to the user. The Add Panel is customized not just per-user, but also per-site and additional information, so the same user may see different Add Panel in different sites or in different contexts.

It will be appreciated that this customization may be determined through the use of ML/AI engine 350 which may apply ML/AI techniques to learn the user's patterns-of-use when building sites. ML/AI engine 350 may continuously learn from new sequential steps that lead to the creation of elements on the site, including pages, sections, containers and components.

It will be further appreciated that this functionality may be coupled with contextual data that is based on the palette of the site, the layouts that the user created, the part that is being built in the page, alongside with the page inside the site, whether it is the home-page or a page with specific intent. This will determine the recommendation most suitable for the design and intents of the user. ML/AI engine 350 may also use models to optimize the results by the level of proficiency that the user holds, the business goals of the site and the past behavior of the user himself and other similar users.

The context information may also include additional information available on the user and the site such as information based on the user entry funnel (e.g. questions answered by the user on entry), user attributes (such as business and industry types), user preferences (such as saved designs, saved presets, likes, dislikes, collections etc.) and site attributes (e.g. what add-ons did the users install and which are active).

The context information may further include current site structure, previous actions, user design preference and current editing state (selected components, open floating dialogs etc.). It will be appreciated that all the information may be available from the different repositories of CMS 50 as described herein above including editing history and business intelligence.

System 200 may also recommend specific add-on purchases (third party applications, WBS configurable applications, verticals and other add-ons), as well as specific content, media, Presets and other elements based on analysis as above.

Next move suggester 31041 may use ML/AI engine 350 and in particular use a model which is generative in nature i.e. based on what the user has done so far, in order to suggest to him what to do next. The action could be a component suggestion ("now is the time to place the third button"), and placement suggestion ("that's the best place for the next image"), an editing change ("better wrap these 3 components with a stack") or other WBS operational suggestions. Next move suggester 31041 may thus function as a recommender or as an editing assistant (e.g. a "do it for me" assistant) and interface with the user through explainer and suggester 3104.

Next move suggester 31041 may offer multiple alternatives to the user (simultaneously for a selection or via a "suggest something else" option thorough explainer and suggester 3104). It may also offer different arrangements for existing components.

Figure 19A:
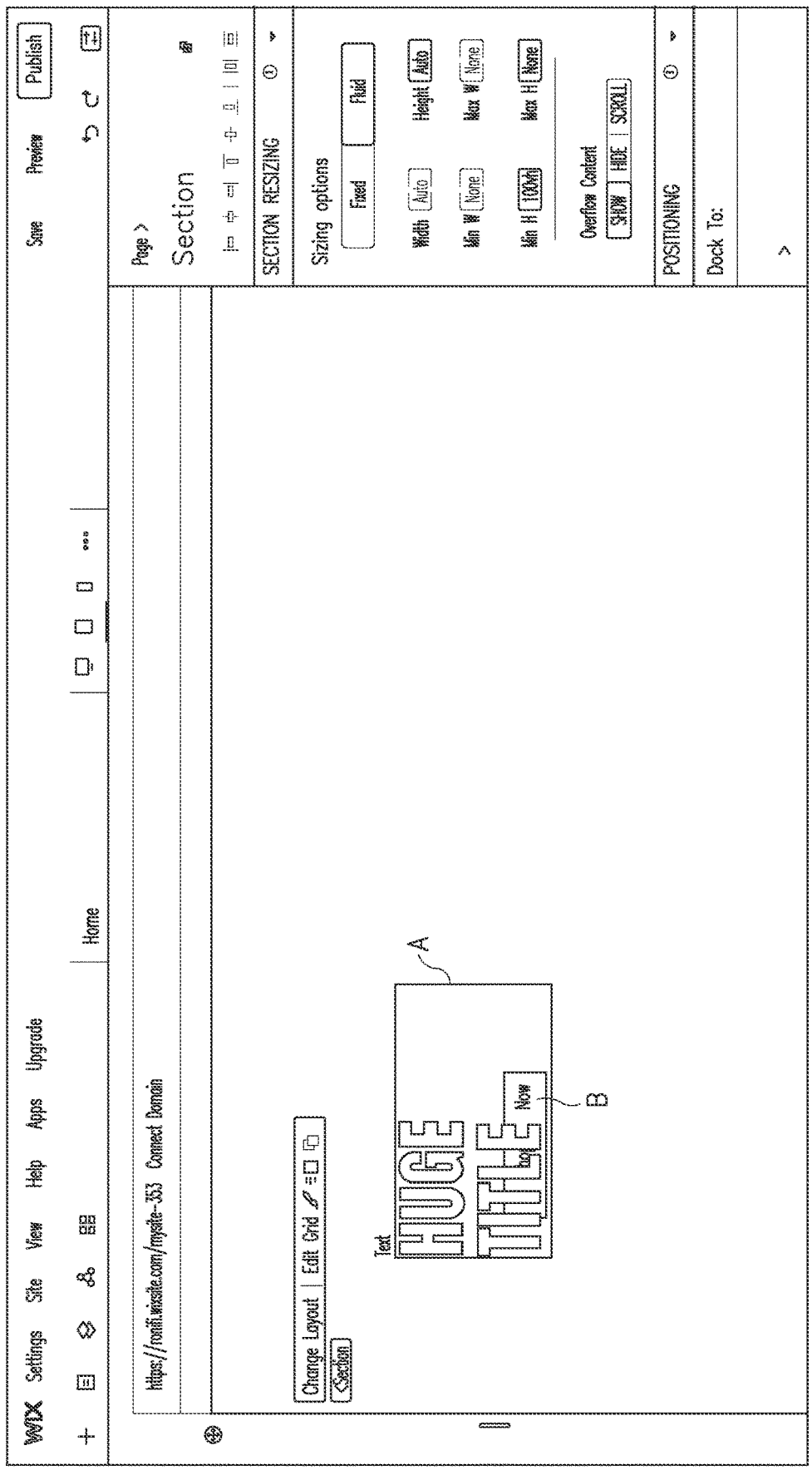
FIGS. 19A-B are schematic illustrations of a scenario involving a design recommendation; constructed and operative in accordance with an embodiment of the present invention.
Figure 19B:
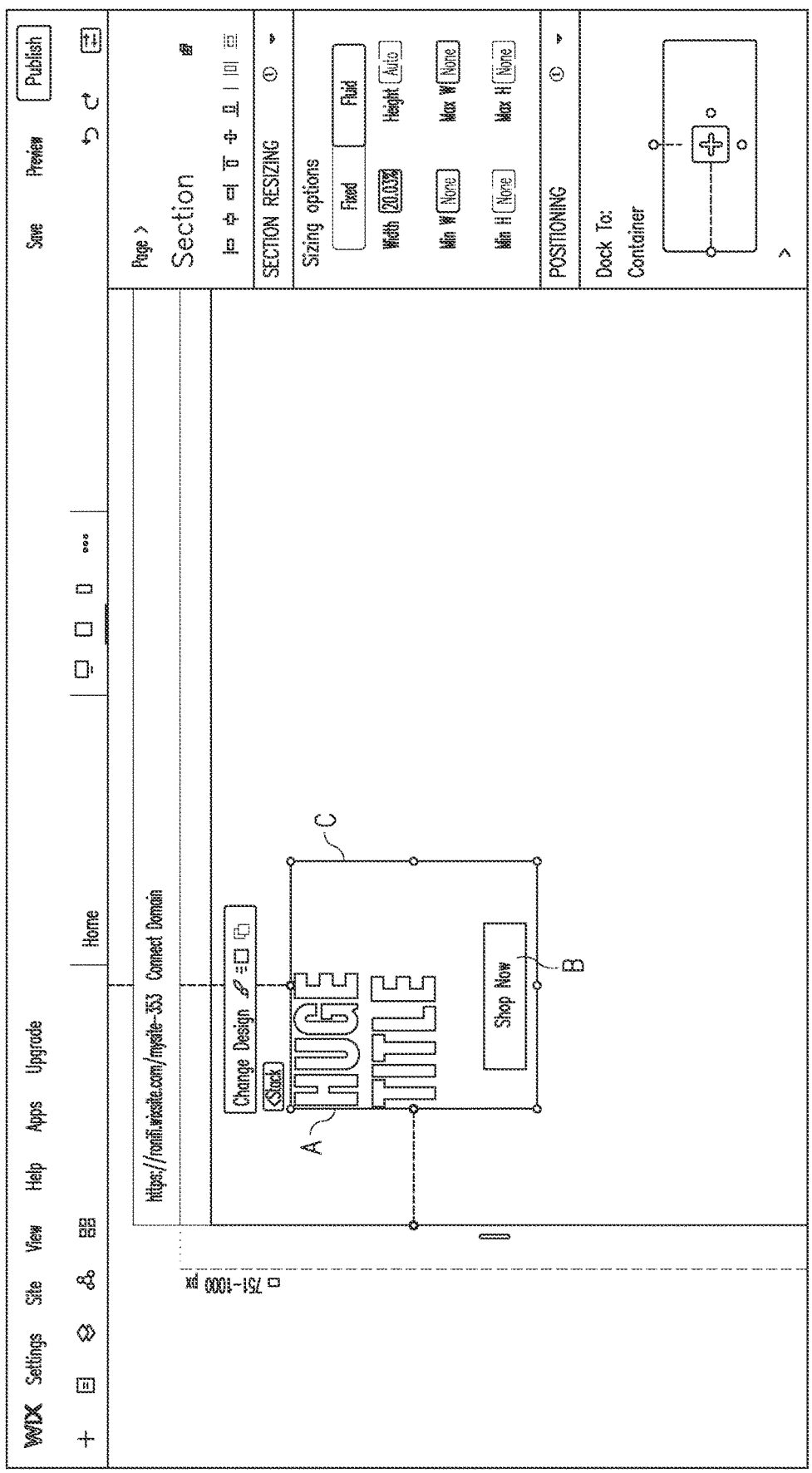

Reference is now made to FIGS. 19A and 19B which illustrate a scene involving a scenario recommendation. FIG. 19A illustrates a case in which a text box [A] is made narrower, and the text "HUGE TITLE" is broken into two lines, overlapping with the button [B] below it. In such a case, next move suggester 31041 (using ML/AI engine 350) may offer the user to enclose the two fields (the text field [A] and the button [B]) with a stack container [C], as illustrated in FIG. 19B.

Next move suggester 31041 may make this as an offer to the user, or directly implement the suggestion and request confirmation from the user. This could be as simple as allowing the user to use the regular "undo" function to cancel the suggested change. Such feedback may be fed directly into a next move suggester model used by ML/AI engine 350 as additional training material.

It will be appreciated that the next move suggester model may base its forecast on an analysis of multiple sources of information, such as analysis of the users' actions and editing history, environment, context (as discussed herein above), desired purpose, the component the user is about to place and other available information.

In particular, the next move suggester model may be trained with the actions performed by the current users and other users on similar sites (e.g. with the same underlying template family or other criteria) or using similar editing sequences.

Next move suggester 31041 may further use segmentation analysis (e.g. based on users and sites) to detect relevant user clusters (e.g. users with similar site editing characteristics).

Next move suggester 31041 may also function as a "design center", performing a general review of the site design and predicting the best layout elements to use for this design (suggesting or auto-creating them).

For both the "next move" mode and the "design center" mode, next move suggester 31041 may recommend (or auto-apply/create) additional layout and formatting elements which are not regular components such as a stack, auto docking (per element, per layout, per breakpoint, including recalculating grid-area), adding gridlines, a flexbox (added as a standalone element or as part of a stack) and pinned elements.

Furthermore, it may be possible to achieve similar visual results (for a specific desired outcome) using different techniques or combinations sets of techniques from above. Next move suggester 31041 may consider multiple ways to perform a given task ("next task" or otherwise), taking into account the quality of generated layout/page (post-change). This may include the quality of the different variants of the layout across all breakpoint ranges (including uniformity between the various breakpoint ranges).

It may also take into account performance and efficiency since different designs may differ in their performance and efficiency. For example, system 200 typically maximizes the use of declarative CSS which is executed directly in the browser's rendering engine (which is quicker and more efficient than the JavaScript code execution). Thus, next move suggester 31041 may select solutions that optimize CSS use as part of the rating of possible solutions.

Thus next move suggester 31041 may provide (recommend, or auto-execute) a single follow-up action, a set of follow-up actions, or a retrieved or generated explanation of what to do next (which could be via text, video, game or game setting, animation, simulation of the suggested action(s) results or voice explanation). It can also provide any combination of such actions or explanations, or provide feedback to the user via other means.

The processes described herein above are based on the user creating an initial layout (typically for the widest configuration, e.g. a desktop one) and then manually adjusting the layout and the components for various narrower configurations for the different breakpoint ranges.

In an alternative embodiment, responsive editor 310 may support the user in the process. The user designs the desktop version (for example) and next move suggester 31041 suggests or rearranges the layout in other breakpoint ranges on its own.

This may be done using rule engine 340 (such as the one described in U.S. Pat. No. 10,176,154) or by using a machine learning based model via ML/AI engine 350 (trained using a rule-based system, explicitly generated data and user feedback as described in more detail herein below). Next move suggester 31041 may also be trained based on the gathered editing history for multiple users of the responsive editor in general, i.e. how users adapt given layouts to given breakpoint ranges.

It will be appreciated that the site adaptation for multiple breakpoint ranges may include replacing some components with fluid versions of these components (including the transfer of contained data and setting from the regular to the fluid component).

It will further be appreciated that layout understanding and component grouping is a basic building block for system 200, as they are used in multiple tasks related to site analysis and site conversion (e.g. static to responsive and static to mobile).

Component grouper 31031 may convert a site description (e.g. in data description languages such as XML or JSON) to a hierarchical set of group definitions. It will be appreciated that component grouper 31031 may utilize a component grouping model such as described in. US Publication No. 2020/0380060.

Figure 20A:
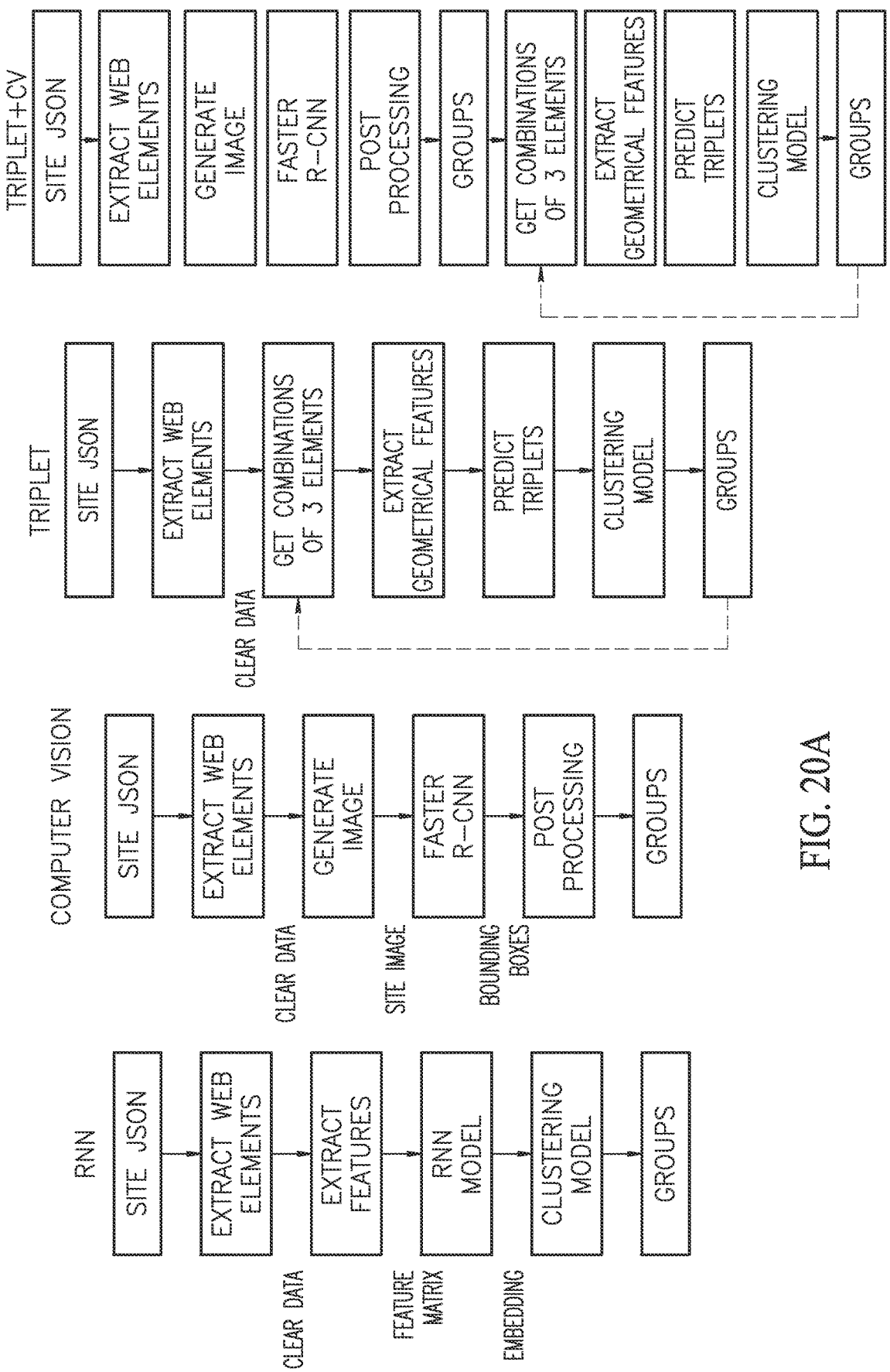
FIGS. 20A-20B are schematic illustrations of the use of multiple machine learning models used by the ML/AI engine of FIG. 4; constructed and operative in accordance with an embodiment of the present invention.
Figure 20B:
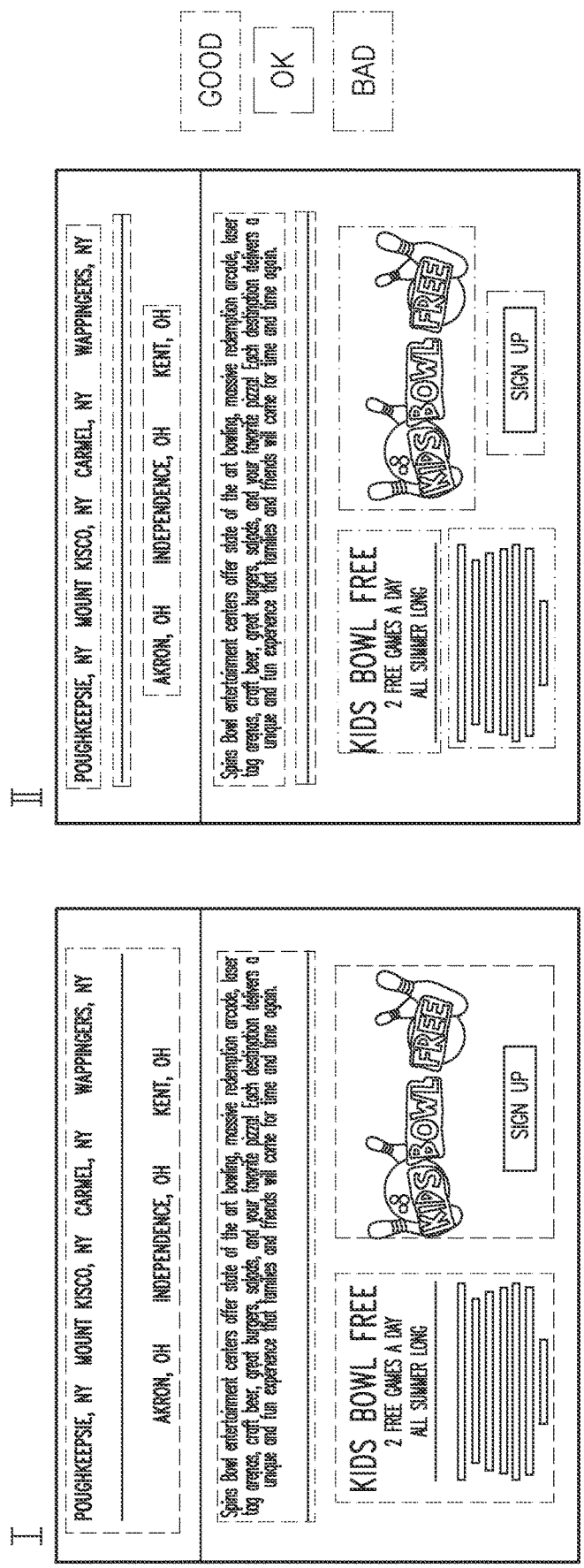

The component grouping model may typically use one or more underlying models such as those illustrated in FIG. 20A to which reference is now made, including RNN based, computer vision based, triplet based and combined triplet+ computer vision. ML/AI engine 350 may combine multiple such models and may grade them according to multiple criteria (including a comparison to known ground truth results from manual grouping analysis, consistency and user feedback) to determine the best one to use for a given population or categories of site it is operating on. FIG. 20B to which reference is now made, illustrates an example of the results of the model (II) vs. the manually labeled page (I), ground truth information.

This information may be used directly by WBS-world elements of the system (e.g. layout suggestions) as well as by layout handler 31022.

It will be further appreciated the elements of system 200 may require the ability to rate pages, page subsets (sections and other element collections) and layouts based on their quality. Layout quality ratings may be used by multiple elements of system 200, such as next move suggester 31041.

It will be appreciated that a number of techniques are known in the art for quality rating such as that described in explanation to layout quality rater 47 as described in U.S. Pat. No. 9,747,258. ML/AI engine 350 may use ML techniques and feedback to train a model to provide quality rating. It will be appreciated that layout quality may be a matter of personal tastes and preferences. Thus, an embodiment of system 200 may combine the results from a generic model (trained for all users) with a model that was trained for the specific user.

Once the editing process has finished, responsive editor 310 may save any changes within CMS 50.

As discussed here in above, responsive editing module 300 provides full WYSIWYG editing and previewer 3105 provides the ability to preview the site for arbitrary widths in a continuous manner as is illustrated in FIGS. 7A to 7F back to which reference is now made. It will be appreciated that responsive editor 310 may also provide a general preview to the entire page during the editing process. Thus previewer 3105 may allow the user to preview specific components (and containers) at the various breakpoints simultaneously as illustrated in FIG. 7G back to which reference is now made.

It will be appreciated that the editing of complex hierarchical structures with multi-level constraints includes many cases in which different constraints clash with each other and have to be resolved. Thus, the docking constraints of two different components may clash to some extent. Similarly, the constraints of a container may clash with that of its contained components.

Furthermore, system 200 uses an ML/AI engine 350 (e.g. as described in more detail herein below) whose actions and recommendations are opaque to some extent, and not directly based on a predefined set of rules.

Thus, explainer and suggester 3104 may provide an explanation to the user (similar to on-line-help) as to why system 200 gives a given action or gave a specific recommendation. Such a module may be based on techniques from the realm of explainable artificial intelligence.

As discussed herein above, CSS generator 320 may map the features of the responsive, fluid, dynamic layout design into declarative CSS, minimizing the use of JavaScript code. This provides performance and interaction benefits, as much of the site's dynamic and responsive functionality is performed through declarative CSS code, directly by the browser rendering engine.

The use of CSS generator 320 further minimizes the use of JavaScript (JS) code so to provide better time-to-load and time-to-interactive values for the site. Since browsers typically load JS code at a later stage and may wait for the entire JS code to be loaded before starting JS execution.

Thus, system 200 may, for example, implement a Stack object using HTML FlexBox, and may implement grids using a CSS grid etc.

As discussed herein above, system 200 may implement dynamic layout and fluid components into website pages. Applicant has realized that the functionality of system 200 may also be applied to non-responsive sites by implementing fluid display (i.e. continuous layout change for display viewport changes), and/or adding layout variants for different breakpoint ranges to an existing (typically desktop) site layout. This may involve converting an absolute layout to a stretchable one. The generated stretchable layout may be stretchable in both dimensions. The below discussion focuses on horizontal axis changes. Thus, system 200 may also modify the layout of the original site (e.g. adding responsive supporting elements such as stacks and layouters), and may also replace elements or components with their responsive or fluid counterparts.

Applicant has further realized that this application may improve the performance of dynamic layout through the use of pre-processing which enables browser integration into the on-line dynamic layout process. Mesh applier 330 may convert the site to a representation which allows some of the dynamic layout processing to occur inside the browser rendering engine (i.e. as part of the rendering and on-going browser-user interaction) rather than being implemented "above" the browser engine.

As discussed herein above a layout may incorporate fluid components whose size and attributes may be affected by their parents (e.g. by parent changes or viewport width changes) or by various triggers. In order to implement functionality using breakpoint ranges, layout elements (components, z-order, anchors etc. are held in a smart mesh form, a grid-like format in which cells (or merged cells) of the grid represent components. The representation is created recursively at the container level, i.e. each container has its own mesh.

Also as discussed herein above, when sending the page to the browser (or otherwise rendering the page such as on the server), the smart mesh is converted to a specific format which may be directly rendered by the browser.

The discussion below is focused on an embodiment of system which uses a target form based on the CSS grid feature (as defined in the CSS grid standard). This form is declarative in nature, and allows the browser to handle a substantial part of the dynamic layout related interactions and processing without involving any higher level code (such as JS code). Other embodiments are possible as further discussed in more detail herein below.

As discussed herein above, system 200 may implement dynamic layout processing during editing (e.g. reflecting the editing changes made by the user) as well as during runtime. System 200 may use different mechanisms in either case, as the requirements may be different between the cases. A third use scenario may be a preview or simulation mode, a run-time view of the web page functional inside the editing environment, which may still behave differently from the regular run-time view.

As discussed herein above, dynamic layout involves the moving and resizing of components on the screen based on dynamic layout triggers. It will be appreciated that all references above to content change may include formatting changes to the content as well.

It will be appreciated that the triggers (as described herein above) may be divided into multiple classes such as browser engine handled (BEH) triggers, which may be handled internally by the browser (e.g., based on generated declarative definitions), JavaScript-handled (JSH) triggers which may be handled by JS code associated with the page or the components in it and grid-regeneration based (GRB) triggers which may require the supporting grid structure to be updated, typically leading to full or partial page re-rendering.

The classes may not be mutually exclusive, e.g. some triggers may be handled differently depending on their exact parameters and the page changes they represent.

Thus mesh applier 330 may provide a rendering platform for system 200. It may require components to be adapted to it and in particular, adapted components should not require JS to run before they are visible to the user (so to improve the overall time-to-visibility of the web page).

System 200 may also support adapters for use with components which have not been adapted to such a system. Such adapters may use a number of techniques to speed up loading of the page, such as hiding the component in the initial page view and only showing it when ready for display (e.g., in particular for "below the fold" parts of the page).

Other adapters may involve using a pre-loader display, using pre-generated screen capture of the component display, which may be generated (for example) during publishing, site activation or based on forecasting of the user's movement within the site, or using an alternative (simplified, partial or simulated) version of the component as a placeholder.

Mesh applier 330 may convert page component structures into a mesh form which is implemented by CSS generator 320 using CSS grid definitions on the initial runtime rendering. This way, the browser implements the page's dynamic layout functionality during runtime in the browser's own rendering engine (based on declarative CSS definitions) rather than using JS code executing in the JS engine to perform dynamic layout functionality.

It will be appreciated that responsive editor 310 may also implement the same rendering framework provided by mesh applier 330 (which may be applied to the displayed page stage as well as the added editor UI). Alternatively, responsive editor 310 may use a procedural absolute layout based framework for rendering. Responsive editor 310 may also combine the two. Previewer 3105 may typically use the mesh applier for rendering (e.g. to provide better performance as well as greater compatibility with the actual run-time behavior of the page). It will be appreciated that this runtime behavior may also be provided by runtime server 20 as well.

It will be further appreciated that mesh applier 330 may pre-generate the CSS-grid for the browser on the first rendering of the page, which may be client-side rendering, server-side rendering or combined. As discussed herein above, this may be done recursively at the container level such that each container may have its own grid definitions.

Some components and containers may lend themselves to handling via other methods. For example repeaters and other list-type components may be managed and rendered via conversion to CSS Flexbox (which may be better adapted to handling of 1-dimensional collections such as lists compared to the two dimensional grid). Such alternative handling may be integrated into mesh applier 330, or may be performed in parallel to it.

It will also be appreciated that the CSS-grid adapted page allows the browser to respond to and handle most (but possibly not all) of the triggers listed above internally (i.e. these are BEH triggers). The browser may thus adapt the page as required based on the declarative CSS-grid information without requiring grid modification, page re-loading or re-rendering. Such BEH triggers may include, for example:

Changes that affect component content (including content, formatting and other changes) from multiple sources (such as database information updates, content editing by user, user interactions and other sources).

Changes to the screen/window/viewport size including display rotation related changes.

Width changes which cross a pre-defined breakpoint boundary. Such changes may be supported through use of CSS media queries and by having the page/container definition include the multiple layout options (depending on matching the width to the available breakpoint ranges).

Changes resulting from components pushing other components.

It will be appreciated that other changes and triggers may require the grid to be modified/regenerated and the page to be re-rendered and/or re-loaded. Such changes may include, for example, concurrent editing changes which involve changing component positions or container-component parent relationships (e.g. move a component from one container to another).

It should be noted that the distinction between BEH triggers, JSH triggers and GRB triggers may be quite fine, for example, concurrent editing changes which modify component's content may be handled without re-rendering, whereas changes to a component's position may require re-rendering.

System 200 may further implement incremental page update and re-rendering, in which only a part of the page which is modified would be updated and require re-rendering.

As discussed herein above, CSS generator 320 typically generates the CSS grid definition just before rendering (be it client or server based rendering). In particular, the generated grid (and the component relationships and anchors it represents) may depend on the current content of the fields (which may determine the size of the specific fields), as well as the attributes (and display width in particular) of the current client device.

However, when receiving updates directly from mesh applier 330 (as is illustrated in FIG. 4. Back to which reference is now made), CSS generator 320 may pre-generate multiple versions of the CSS grid pre-adapter to specific platform/browser version combinations, and may further adapt them (with updated values) just before rendering.

It will be appreciated that the discussed embodiment uses the CSS grid standard. Alternative embodiments may be based on different web browser standards or capabilities especially these providing declarative layout management in CSS.

It will be appreciated that the use of declarative CSS elements rather than JS elements for the bulk of the page design improves performance as browsers typically load, render and display HTML and CSS before loading all JS code. Thus, in accordance with a preferred embodiment of the present invention, the loaded page would be mostly interactive once the HTML and the CSS are loaded reducing the page's "time to interactive" measure. It will be appreciated that this is the measurement of the time that it takes until the page is interactive, i.e., interactive elements (such as buttons) work and perform their function. This is opposed to the "time to viewing" measure which measures how quickly that page starts displaying even if any interactions do not work.

Furthermore, when working with mesh applier 330, CSS generator 320 may re-use grid styles in multiple places corresponding to the re-use of components. Thus, if CSS generator 320 generates a grid representation of a given complex component, it would be able to send the definition just once and the definition could automatically be re-used in multiple instances of the complex component. This applies, for example, to component groups/composite components (which are used repeatedly), as well as lists-based components such as repeaters.

It will be appreciated that the conversion into a CSS grid may resolve issues related to bugs in implementation and inconsistencies between different implementations of CSS grid (e.g. by generating a version adapted to the specific implementation used). CSS generator 320 may further handle cases in which the standard and correct behavior of CSS grid (even when correctly implemented) does not provide proper support for dynamic layout or does not properly implement the required anchor types, including by adding relevant JS code to compensate for any such issue or missing capabilities.

Based on a page analysis (as described in more detail herein below), mesh applier 330 may employ an intermediate mesh format or internal data structure. This may entail converting the WBS component definitions and page data structures into a mesh format (mesh grid) or data structure, and generating the CSS grid definitions from this intermediate format/data structure. It will be appreciated that the smart mesh structure is really used to define a site (with responsiveness and fluidity) declaratively. CSS generator 320 may also directly generate the CSS grid definitions directly from the WBS page definitions. Mesh applier 330 may further generate the additional JS code needed to implement the JSH triggers described herein above. CSS generator 320 may apply or adapt the mesh layout format as a data storage format i.e. "on save", as a deployment format i.e. "on publish" or dynamically generate it on access i.e. "on load".

It will also be appreciated that in addition to the JSH triggers mentioned above, some functionality of the generated page may have to be implemented in JS anyway. For example, to get a picture of a specific size for a given modified layout requires JS to place a server call to get an image resized to the exact size from the server. This cannot typically be done by CSS.

Figure 21:
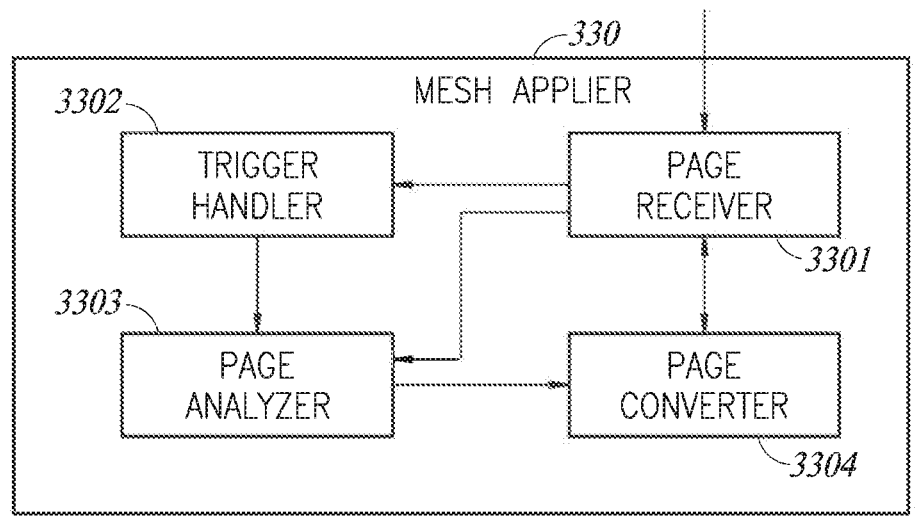
FIG. 21 is a schematic illustration of the elements of the mesh applier of FIG. 4; constructed and operative in accordance with an embodiment of the present invention.

Reference is now made to FIG. 21 which illustrates the elements of mesh applier 330. Mesh applier 330 may further comprise a page receiver 3301, a trigger handler 3302, a page analyzer 3303 and a page converter 3304.

Page receiver 3301 may receive an incoming page from WBS editor 30 or alternatively may receive a site imported by WBS 2 without responsive fluid components or defined breakpoints and trigger handler 3302 may recognize the type of incoming trigger class (BEH, JSH, GRB as discussed herein above).

Page analyzer 3303 may analyze the received page to determine its composition and best handling method. The analysis may include dividing the page hierarchy into elements, determining inter-element relationships (such as the docking of elements inside their containers and the creation of applicable implicit anchors) and the possible grouping of page elements into larger groups when relevant such as identifying a text component and an image component as a "image+caption" pair which should be handled and moved together whenever possible.

Page analyzer 3303 may also perform preliminary analysis on how to handle future triggers of all categories (BEH, JSH and GRB triggers).

Page analyzer 3303 may take into account not just the basic geometrical properties of the page and its components (size, position, overlaps, proximity, layers etc.) but also other WBS attributes and available information (editing history, extended WBS component attributes etc.) as stored in CMS 50.

Page analyzer 3303 may use grouping analysis technologies as defined in pre-processor 201 and super-node creator 230 in U.S. patent Ser. No. 14/483,981. These elements may determine component connections (possibly including analysis of content, editing history or other component relationships). This could be used, for example, to detect a cluster of components which look better when staying together.

Page analyzer 3303 may further use AL/ML engine 350 to support such page analysis and component group recognition. It will be appreciated that the page analysis may be recursive, i.e. performed at the page level as well as for containers in the page.

It will be further appreciated that the analysis may be performed (fully or partially) in an earlier stage, e.g. during editing or publishing. Thus, mesh applier 330 may detect component relationships (and may generate implicit anchors) during editing or publishing and not just at the page serving stage. This may allow system 200 to provide information to the user during editing (for example) about inferred (implicit) anchors, and allow the user to edit or otherwise provide feedback, instructions and hints for the creation or attributes of such anchors. Such feedback may be used, for example, to modify the implicit anchor definition or provide feedback for ML/AI engine 350.

Page analyzer 3303 may also be run online (e.g. during page running/viewing). For example, changes to components during run-time may necessitate re-analyzing the page and resulting changes to it (possibly requiring full or partial re-generation and page re-loading). This may apply to concurrent changes (e.g. these made by another user while the page is running) as well as changes performed within the page (e.g. due to associated code modifying the page or in cases in which end-users may modify the page such as a blog system which allows users comments to be added).

Page converter 3304 may use the output of page analyzer 3303 to convert the incoming page accordingly.

Page converter 3304 may generate a CSS grid definition for the page implementing the handling of BEH triggers. The created grid may convert object frames into cells or sets of joined cells which are attached to splitters (as described below). The created grid may employ additional techniques to support further dynamic layout processing, such as the extra rows and wedges described below.

The converted page may also contain additional code and elements, such as JS code and relevant embedded data required to handle explicit anchors and other trigger types.

Figure 22:
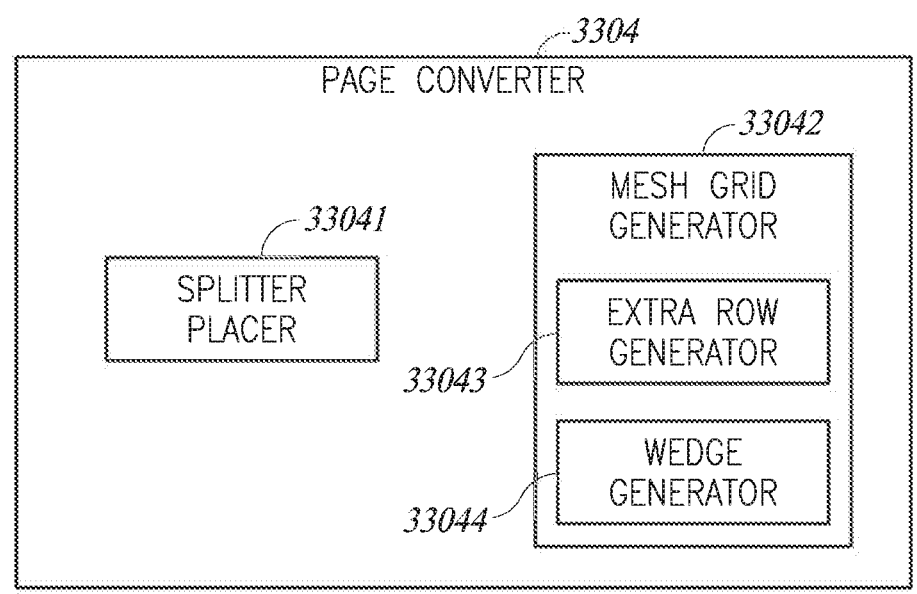
FIG. 22 is a schematic illustration of the elements of the page converter of FIG. 21; constructed and operative in accordance with an embodiment of the present invention.

Reference is now made to FIG. 22 which illustrates the sub elements of page converter 3304. Page converter 3304 may further comprise a splitter placer 33041 and a mesh grid generator 33042.

Splitter placer 33041 may replace implicit dynamic layout anchors using horizontal splitters creating a grid. It will be appreciated that the splitters are per container and not per screen so that each container is represented by a grid (each container has its own grid). The description herein below focuses on horizontal splitters but vertical ones may also be implemented.

It will be appreciated that instead of component-to-component implicit anchors, page converter 3304 may anchor components to the grid. This may allow for a more efficient execution by CSS generator 320.

It will be appreciated that a splitter is a virtual line which may be used to anchor components in a layout. Components anchored by a splitter may push and pull it and other components anchored to the same splitter may be affected by the resulting splitter movement. There may be multiple splitters defined for a single page or container. Splitters are typically implemented using a declarative CSS mechanism so that no JS is required.

A splitter may also affect only some of the components, as some of the components may reside in merged grid cells which are not affected by changes to some of the splitters. In a typical arrangement, component A will only push component B if B starts after A ends. Also, a component's height is only changed by its content. For containers this includes being affected by the contained components.

Figure 23:
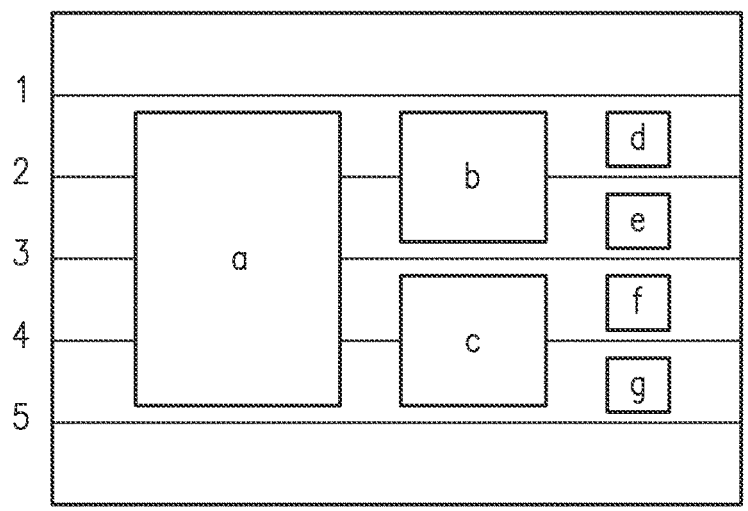
FIG. 23 is a schematic illustration of the relationship between components and splitters; constructed and operative in accordance with an embodiment of the present invention.

Reference is now made to FIG. 23 which illustrates the relationship between components and splitters showing components [a]-[g] and splitters 1-5. As can be seen, component [a] is only affected by changes to splitter 1, and its height is controlled by its content and not by other components.

Component [b] is pushed by splitter 1.

Component [c] is pushed by splitters 1 and 3.

As for components [d,e,f,g], each component is pushed by all rows that are "above" them.

It will be appreciated that enlarging or reducing any component (or wedges as discussed in more detail herein below) up or down may move the line in the grid. The component positions may thus be modified based on splitter moving.

The same may apply to component sizes as well in some cases, as a component inside a grid cell may be anchored to multiple sides (e.g. top and bottom of grid cell) and may grow/shrink as the cell size changes. Splitter placer 33041 may implement such anchors as automatic or as explicit ones.

Figure 24A:
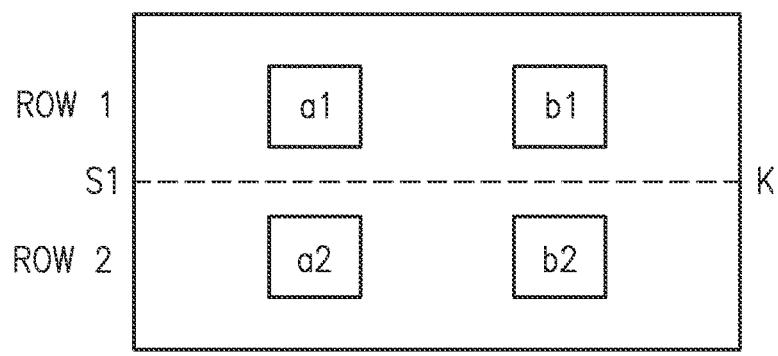
FIGS. 24A-24B are schematic illustrations of the isolation of pushing relationships between components; constructed and operative in accordance with an embodiment of the present invention.
Figure 24B:
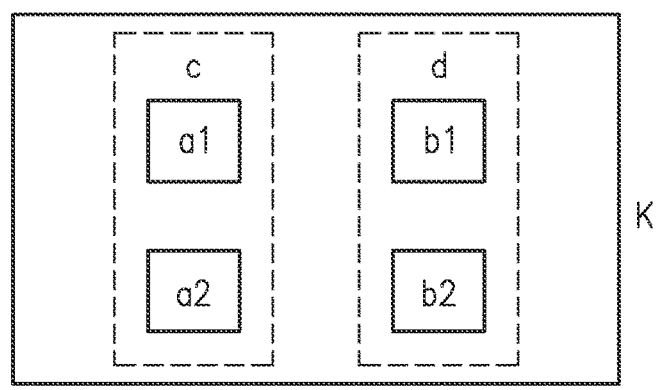

Splitter placer 33041 may also allow the user to do this by pushing relationships between component "columns" as is illustrated in FIGS. 24A and 24B to which reference is now made. FIG. 24A illustrates a situation in which component a1 is above component a2 and component b1 is above b2 (with the 4 components aligned in two rows). The user would like component a1 to push component a2 and for component b1 to push b2 (when they grow) but does not want component a1 to push component b2 or for component a2 to push component b1.

If splitter placer 33041 places a single splitter S1 passing between row 1 and row 2, component a1 growing downwards would also push component b2. To prevent this, splitter placer 33041 may construct two invisible boxes/groups (each having its own grid) as shown in FIG. 24B with [c] wrapping components a1/a2 and [d] wrapping components b1/b2. Both boxes are contained in the enclosing frame K. This way, there are separate pushing relationships between components a1 and a2, and between components b1 and b2.

It will be appreciated that once page analyzer 3303 has analyzed the page and page converter 3304 has generated the CSS grid definitions underlying the page, the page can be rendered and displayed. It will be appreciated that page analyzer 3303 and page converter 3304 may also function during other stages and may not necessarily require rendering. Mesh applier 330 may now respond to various events and triggers. These may include the various trigger types described above BEH, JSH and GRB.

BEH triggers (and resulting component size/position changes) are handled by the browser, based on the browser-implemented rules which govern the behavior of CSS grids under page changes.

Figure 25:
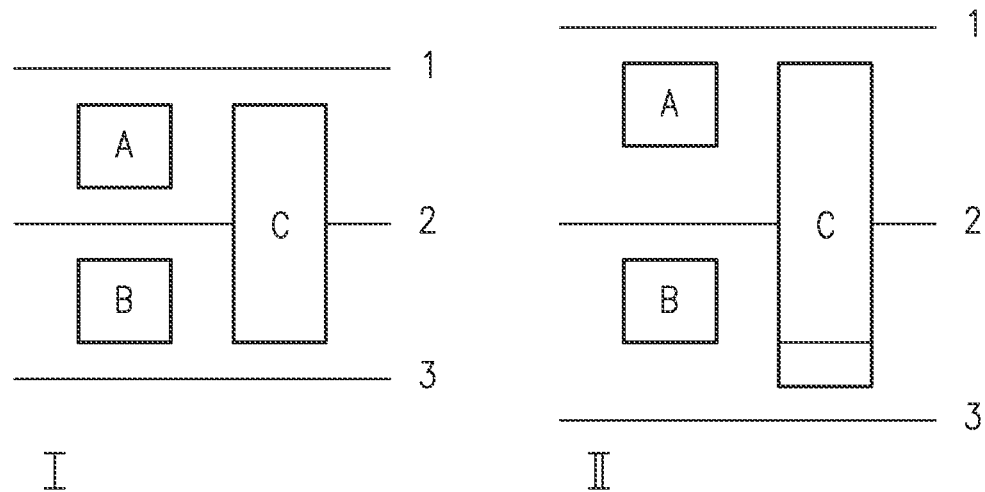
FIG. 25 is a schematic illustration of the application of CSS grid rules to splitters and components; constructed and operative in accordance with an embodiment of the present invention.

Reference is now made to FIG. 25 which illustrates the application of CSS grid rules to splitters and components. FIG. 25 illustrates an arrangement with 3 components (A, B and C) with scenario I showing their initial state. In scenario II, component C is enlarged downwards. Under the default CSS grid rules, component C pushes splitter #3 down, and the increase in size is divided equally between the $1^{St}$ and $2^{nd}$ grid rows (thus moving splitter 2 down by half the amount) and thus moving component B downwards. Mesh grid generator 33042 may recalculate the grid. It will be appreciated that the entire operation may be performed within the browser engine without requiring higher-level JS code involvement.

Other trigger types are also not resolved within the browser engine. JSH triggers require JS code to run which may modify elements of the page (e.g. by modifying the DOM structure) and a follow up page recalculation. The JS code may be WBS-level (e.g., part of the WBS client code) or part of specific page-associated JS code (e.g., page-related functionality).

Some changes (such as changes to the page component hierarchy) may trigger a GRB trigger, requiring grid regeneration (complete or partial) by mesh grid generator 33042 and a re-rendering of the page by CSS generator 320.

It will be appreciated that as the definition of CS S grid is a W3 standard, its behavior is uniform between platforms/browsers/versions. Thus mesh grid generator 33042 may compensate for any bugs and implementation quirks, or any difference that may develop in the future.

As discussed herein above, page analyzer 3303 may perform its analysis based on geometrical properties (size, position, overlaps, proximity, layers) as well as available WBS 2 attributes and other available information stored in CMS 50. This analysis determines the structure and layout of the elements and the implicit anchors/relationships between them (similar to the gateway condition referred to in U.S. Pat. No. 10,185,703). It will be appreciated that based on this analysis, mesh applier 330 may create a smart mesh which is used to create relationships (such as "A pushes B") between components.

It will be appreciated that this smart mesh can be implemented at a number of levels. For example, a limited "pushing rows" implementation may use a CSS grid with a single column per container with multiple rows providing the pushing behavior. A more comprehensive implementation may use a CSS grid having multiple columns.

Figure 26:
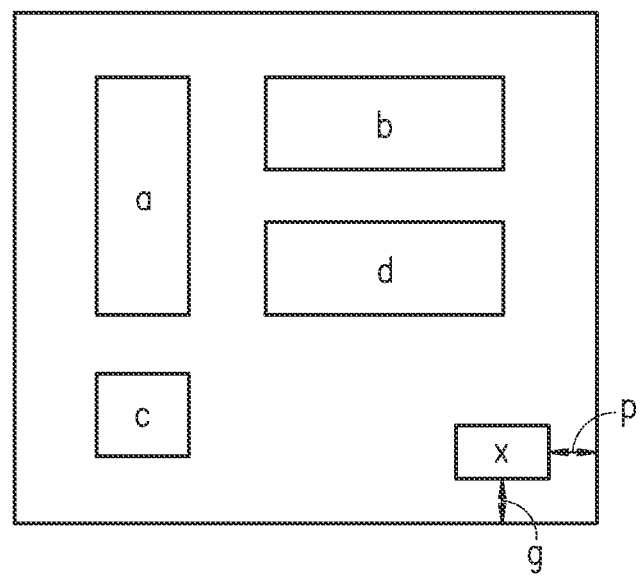
FIG. 26 is a schematic illustration of component distances and the resulting docking effect; constructed and operative in accordance with an embodiment of the present invention.

Reference is now made to FIG. 26 which illustrates an example of component distances and the resulting docking effect. As is illustrated, component [x] is at the bottom right corner, and is sufficiently far from the other components [a-d]. Page analyzer 3303 may determine (based on its analysis) that [x] is intended to be aligned to the bottom right of the containing frame, and should have the implicit anchors [p] and [q]. This effect (known as "docking") may be part of the analysis performed by edit handler 3102 as described herein above, or may be part of a later analysis (e.g. during publishing or during page loading).

Figure 27:
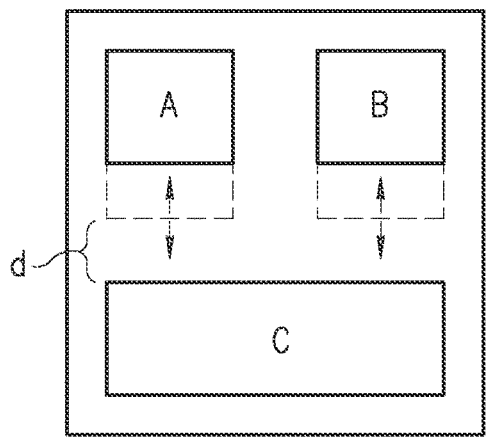
FIGS. 27 and 28 are schematic illustrations of handling a pushing scenario between components using anchors; constructed and operative in accordance with an embodiment of the present invention.

Reference is now made to FIG. 27 which illustrates another pushing scenario.

Components [A] and [B] are above [C]. If either component [A] or [B] grows down to a sufficiently small distance [d] from component [C], they would push component [C] down. This is referenced herein as the activation of an implicit anchor.

Figure 28:
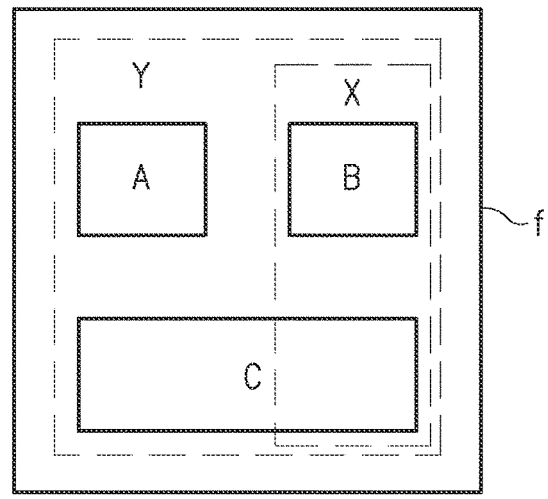

The user may want to cancel/override the B-C implicit anchor (e.g. by providing such an instruction via responsive editor 310) while leaving the A-C implicit anchor intact. To implement this (as is shown in FIG. 28 to which reference is now made), mesh grid generator 33042 may put components [A] and [C] inside a transparent container [y] and component [B] into a separate transparent container [x]. Both [x] and [y] may reside in parallel within the frame [f] and are siblings in the component tree (although their areas overlap). Thus, when component [B] grows it does not affect component[C].

Regarding overlap of components, mesh grid generator 33042 may employ an implicit z-order arrangement in which components are held in arrays and are always ordered. This order is then used when rendering the HTML. Thus, the later an element appears in the HTML the higher is the z-order of the element (when siblings overlap).

Mesh grid generator 33042 may also place multiple components into a single grid cell in the generated grid, and may use a number of mechanisms to control their order, placement and alignment inside the cell.

In particular, grid CSS allows the specification of coordinates for each element in its containing cell as multiple components can be assigned to each cell (e.g. using fixed positioned components). Grid CSS further allows specifying guidance on the alignment and docking of each component (e.g., how a component is aligned in the cell). This allows for overlapping components, with the z-order being defined according to the DOM order (i.e. the order of the objects in the original file text). Mesh grid generator 33042 may also use the CSS z-index attribute for this purpose.

As noted above, mesh grid generator 33042 may also use alternative layout methods or other mechanisms for component placement and cell content management (such as using Flex Box layout for list or repeater type components).

Mesh grid generator 33042 may optimize layout behavior by balancing the granularity of the grid and the placement of multiple elements in single grid cells. It may divide into more or less cells so to optimize behavior for a specific arrangement/layout. This may depend on specific browser/platform/version performance characteristics (e.g. mesh grid generator 33042 may create different grid combinations for different browsers).

Figure 29A:
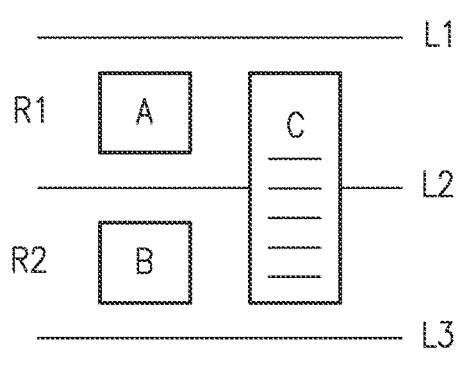
FIGS. 29A-29C are schematic illustrations of the use of extra lines to maintain element layout; constructed and operative in accordance with an embodiment of the present invention.
Figure 29B:
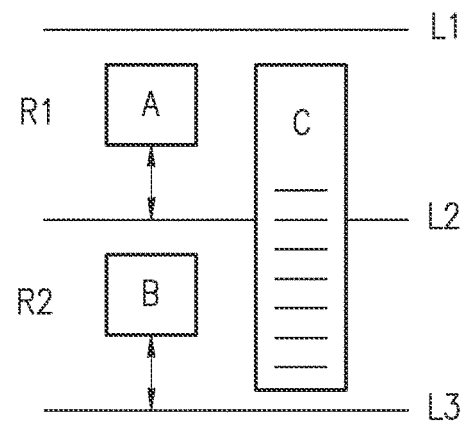
Figure 29C:
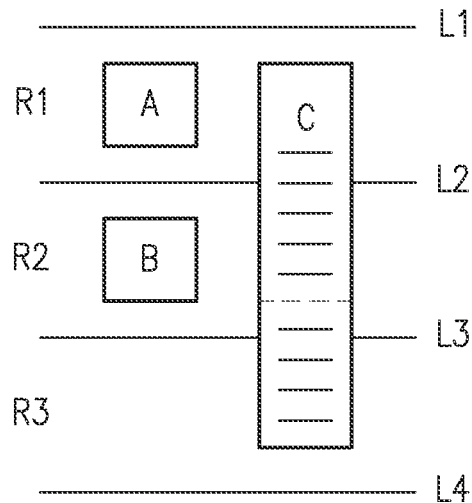

Reference is now made to FIGS. 29A-C which illustrate the use of extra lines to maintain an element layout. As is illustrated in FIG. 29A, component [A] is placed in grid row R1 and component [B] in grid row R2. Component [C] stretches over both rows (R1 and R2).

When a component spans over more than 1 row, and the component grows, the grid implementation needs to decide what to do with the extra space across all the rows that this component is spanning over. (When all components belong to exactly 1 row (no row spanning) the problem does not arise.

In this example, when component [C] grows down (e.g. due to its text content increasing in size), it pushes the line L3 down (the bottom line of grid row R2). The regular behavior for a CSS grid would be to increase both rows R1 and R2 equally in size, making [A] and [B] occupy only part of their respective rows (as shown in FIG. 29B), thereby destroying the visual layout.

Extra row generator 33043 may resolve this (as shown in FIG. 29C) by adding an invisible extra row R3. Component [C] is made to extend to row R3, so that when [C] expands, it only increases the size of R3 without affecting R1 and R2.

It will be appreciated that even with this extra line defined, the default behavior of the grid would be to divide the added space between the 3 rows (R1, R2 and R3). To prevent this, and make sure that the additional space goes to R1 and R2 only, mesh grid generator 33042 generates a grid in which the "regular" rows (R1 and R2 in this case) are defined as "min-content" rows, and the added row (R3) is defined as a "1fr" (fractional) row.

Extra row generator 33043 may implement a standard grid space handling algorithm that selects the rows with the least amount of elements in them. The extra space is then divided evenly between these selected rows. Thus extra row generator 33043 may generate "extra rows" ensuring that there is always exactly one (extra) row that will receive the extra space, and the design is preserved.

It will be appreciated that these extra rows are created in advance based on the user's specification of the expected dynamic layout behavior in responsive editor 310. This specification may be considered as a "reverse anchor" specifying what the component's expanding downwards does not do.

Figure 30:
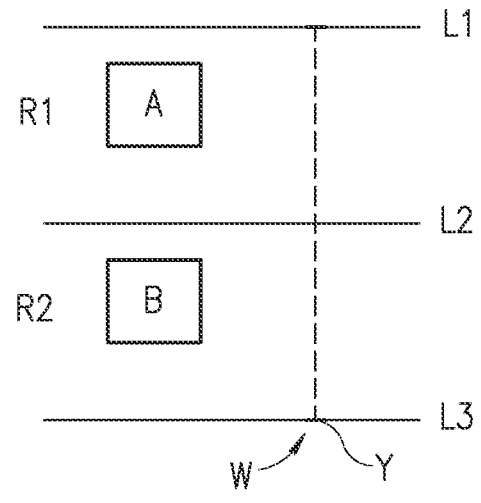
FIG. 30 is a schematic illustration of the use of a wedge to maintain a component layout; constructed and operative in accordance with an embodiment of the present invention.

It will be appreciated that the conversion to grid may also employ wedge elements as illustrated in FIG. 30 to which reference is now made. This is the use of invisible "wedge objects" which hold specific splitters in place, thereby maintaining a minimal Y value for a given row.

Wedge generator 33044 may implement a wedge element using a DIV element with a static height (e.g. 500px) and zero width (0px) so to make the wedge element invisible.

As is shown in FIG. 30, splitter L3 is "held in place" at a pre-specified Y value by wedge object [W]. Component [B] can now grow downwards until it reaches the L3 line. When component [B] reaches L3, it may start pushing L3 downwards (moving it lower than the end of the wedge [W]). If component [B] shrinks back, L3 would go back up until it reaches the wedge [W] and would stop there. Thus, the wedge [W] keeps row R2 at a certain minimal size.

Wedge generator 33044 essentially forms a soft anchor (e.g. between component [B]'s bottom and L3) so that L3 doesn't move up above a certain point.

In an embodiment of mesh applier 330 implemented in CSS grid, the internal CSS grid mechanisms may not provide sufficient support for some explicit anchor types.

In some cases, anchors and "short anchors" in particular are used in the context of creating a group of elements. For example, the user may group a set of elements which together form a product description, such as components displaying the product name, description picture and price. The user may anchor all of them together so to preserve their combined layout and move them together when edited.

Such an arrangement may be detected (e.g., by page analyzer 3303 possibly using hints inserted into responsive editor 310 or earlier at the template level). The components arrangement may then be converted into an explicitly defined group, which may be implemented using a lightweight container. Such a group container would still have an internal grid to layout its children so it behaves similar to nesting real containers. A group may typically be regarded as a single component and may be implemented so that its constituent components do not "decompose".

Figure 31:
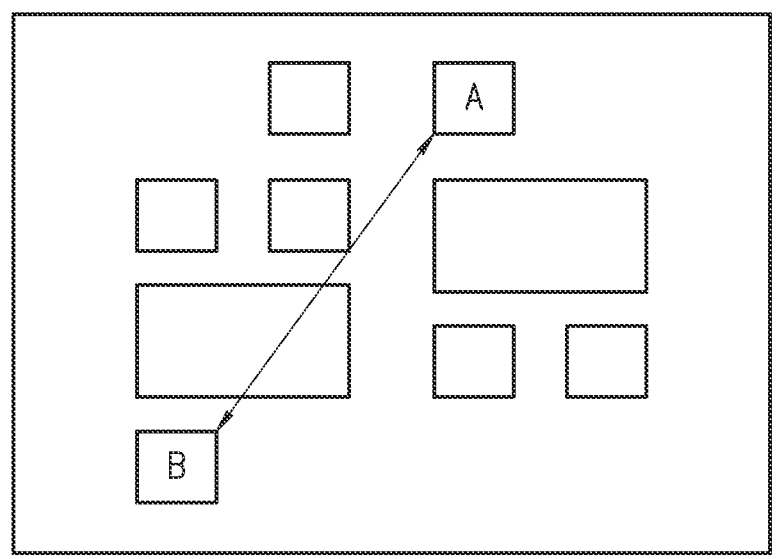
FIG. 31 is a schematic illustration of the use of an explicit component between distant components; constructed and operative in accordance with an embodiment of the present invention.

Reference is now made to FIG. 31, which illustrates a long distance anchor AB which cannot be typically implemented using CSS grid and the mesh grid structure. In this scenario mesh applier 330 may complement what can be done in CSS grid by follow-up loading of the relevant JS code. The JS code can measure the page elements and implement the additional interactions. The JS code may listen to field and layout changes (e.g., via JS onChange( ) or similar mechanism) and explicitly modify anchor target(s).

Thus the use of fluid components and mesh grids, together with the use of specialized elements such as layouters, wedges and splitter may enable a WBS to incorporate smart CSS generation at the access, edit, save, publish stages of website creation and editing. This smart CSS may enable rendering at the browser level without requiring general runtime compiling providing better page loading and processing time. Furthermore, the system may include additional elements to interface with different browsers, including elements such as browser add-ons or plug-ins, browser extensions, polyfills or other elements intended to extend or enhance browser functionality.

Thus the use of fluid components and mesh grids, together with the use of specialized elements such as layouters, wedges and splitter may enable a WBS to incorporate smart CSS generation at the access, edit, save, publish stages of website creation and editing. This smart CSS may enable rendering at the browser level without requiring general runtime compiling providing better page loading and processing time.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type, such as a client/server system, mobile computing devices, smart appliances, cloud computing units or similar electronic computing devices that manipulate and/or transform data within the computing system's registers and/or memories into other data within the computing system's memories, registers or other such information storage, transmission or display devices.

Embodiments of the present invention may include apparatus for performing the operations herein. This apparatus may be specially constructed for the desired purposes, or it may comprise a computing device or system typically having at least one processor and at least one memory, selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus. The computer readable storage medium may also be implemented in cloud storage.

Some general purpose computers may comprise at least one communication element to enable communication with a data network and/or a mobile communications network.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A website building system (WBS) for creating websites, the WBS comprising:
    a processor; and
    a responsive editing module running on said processor to convert a website page displayed on a current viewport having a layout of fluid and non-fluid components, into a mesh grid structure and to provide editing and rendering for said mesh grid structure according to breakpoint ranges, said responsive editing module comprising:
        a responsive editor to receive at least one incoming trigger and dimensions of an updated viewport, and to generate an updated layout comprising fluid and non-fluid components for display on said updated viewport; and
        at least one AI/ML engine to use AI (artificial intelligence) and ML (machine learning) techniques to automatically adapt said layout to fit said breakpoint ranges for said responsive editor according to at least one incoming trigger and at least one machine learning feedback module.

2. The WBS according to claim 1 wherein said at least one AI/ML engine is further trained using at least one of: website component information, business information and editing history of said website.

3. The WBS according to claim 1 wherein said ML/AI engine analyzes layout definitions during editing and saving to detect user intent and converts said user intent into a declarative set of rules.

4. The WBS according to claim 1 wherein said AI/ML engine translates drag and drop designs into full CSS (cascading style sheets).

5. The system according to claim 1 and further comprising:
    a rule engine to provide layout decisions for said layout according to dynamic layout rules and responsive editing rules associated with said at least one incoming trigger;
    a mesh applier to convert said layout into said mesh grid structure; and
    a CSS (cascading style sheet) generator to map the features of said mesh grid structure into a CSS for said updated viewport.

6. The WBS according to claim 1 wherein said at least one incoming trigger is at least one of: a user edit, a system modification, a change in user property, a user/device interaction change, concurrent editing by a second user, system procedural change and a user environmental change.

7. The WBS according to claim 1 wherein said responsive editor further comprises:
    an edit receiver to receive said at least one incoming trigger;
    an edit handler to define changes to said fluid and non-fluid components of said layout according to said at least one incoming trigger and dimensions of said-updated viewport; and
    a previewer to enable a user to preview layouts at different breakpoints within a breakpoint range for said updated viewport.

8. The WBS according to claim 7 and further comprising an explainer and suggester to provide an explanation to said user for a given action by said edit handler and to offer said user a solution or suggestion for an edit according to said ML/AI engine.

9. A method, the method comprising:
    converting a website page displayed on a current viewport having a layout of fluid and non-fluid components, into a mesh grid structure; and
    providing editing and rendering for said mesh grid structure according to breakpoint ranges, said converting and providing comprising:
        receiving at least one incoming trigger and dimensions of an updated viewport;
        generating an updated layout comprising fluid and non-fluid components for display on said updated viewport; and
        using AI (artificial intelligence) and ML (machine learning) techniques to automatically adapt said layout to fit said breakpoint ranges for said generating an updated layout according to at least one incoming trigger and at least one machine learning feedback module.

10. The method according to claim 9 wherein said using AI and ML techniques comprises training using at least one of: website component information, business information and editing history of said website.

11. The method according to claim 9 wherein said using AI and ML techniques analyzes layout definitions during editing and saving to detect user intent and converts said user intent into a declarative set of rules.

12. The method according to claim 9 wherein said using AI and ML techniques translates drag and drop designs into full CSS (cascading style sheets).

13. The method according to claim 9 and further comprising:
    providing layout decisions for said layout according to dynamic layout rules and responsive editing rules associated with said at least one incoming trigger;
    converting said layout into said mesh grid structure; and
    mapping the features of said mesh grid structure into a CSS (cascading style sheet) for said updated viewport.

14. The method according to claim 9 wherein said at least one incoming trigger is at least one of: a user edit, a system modification, a change in user property, a user/device interaction change, concurrent editing by a second user, system procedural change and a user environmental change.

15. The method according to claim 9 wherein said receiving and generating further comprises:
 defining changes to said fluid and non-fluid components of said layout according to said at least one incoming trigger and dimensions of said updated viewport; and
 enabling a user to preview layouts at different breakpoints within a breakpoint range for said updated viewport.

16. The method according to claim 15 and further comprising:
 providing an explanation to said user for a given action by defining changes; and
 offering said user a solution or suggestion for an edit according to said using AI and ML techniques.

* * * * *